(12) United States Patent
Shiflett et al.

(10) Patent No.: US 8,715,521 B2
(45) Date of Patent: *May 6, 2014

(54) ABSORPTION CYCLE UTILIZING IONIC LIQUID AS WORKING FLUID

(75) Inventors: Mark Brandon Shiflett, New Castle, DE (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 937 days.

This patent is subject to a terminal disclaimer.

(21) Appl. No.: 11/346,028

(22) Filed: Feb. 2, 2006

(65) Prior Publication Data

US 2006/0197053 A1  Sep. 7, 2006

Related U.S. Application Data

(60) Provisional application No. 60/650,330, filed on Feb. 4, 2005.

(51) Int. Cl.
*C09K 5/00* (2006.01)
*C09K 5/04* (2006.01)

(52) U.S. Cl.
USPC ............................................. 252/67; 252/69

(58) Field of Classification Search
USPC ................... 62/6, 94; 374/10; 252/67, 69
See application file for complete search history.

(56) References Cited

U.S. PATENT DOCUMENTS

| | | | |
|---|---|---|---|
| 3,041,853 A | 7/1962 | Harwich | |
| 4,031,712 A * | 6/1977 | Costello | 62/483 |
| 4,337,625 A | 7/1982 | Wilkinson | |
| 4,388,812 A | 6/1983 | Clark | |
| 4,614,605 A | 9/1986 | Erickson | |
| 4,810,403 A | 3/1989 | Bivens | |
| 5,709,092 A * | 1/1998 | Shiflett | 252/67 |
| 5,950,451 A | 9/1999 | Kim | |
| 6,155,057 A | 12/2000 | Angell et al. | |
| 6,207,071 B1 * | 3/2001 | Takigawa et al. | 252/68 |
| 6,339,182 B1 | 1/2002 | Munson | |
| 6,500,358 B2 | 12/2002 | Singh | |
| 6,531,441 B1 * | 3/2003 | Minor et al. | 510/408 |
| 6,579,343 B2 | 6/2003 | Brennecke | |
| 6,843,934 B2 | 1/2005 | Bement | |
| 6,900,313 B2 * | 5/2005 | Wasserscheid et al. | 544/59 |
| 7,153,974 B2 | 12/2006 | Schmidt | |
| 7,208,605 B2 * | 4/2007 | Davis, Jr. | 548/110 |
| 7,410,586 B2 | 8/2008 | Beste | |
| 7,708,903 B2 | 5/2010 | Sievert et al. | |
| 7,709,635 B2 | 5/2010 | Davis, Jr. | |
| 7,722,771 B2 | 5/2010 | Chordia | |
| 7,744,838 B2 | 6/2010 | Davis | |
| 8,069,687 B2 | 12/2011 | Jork | |
| 2004/0035293 A1 | 2/2004 | Davis | |
| 2004/0133058 A1 | 7/2004 | Arlt | |
| 2005/0196671 A1 | 9/2005 | Paonessa | |
| 2005/0196676 A1 | 9/2005 | Singh | |
| 2006/0226072 A1 | 10/2006 | Wyse | |
| 2006/0251961 A1 | 11/2006 | Olbert et al. | |
| 2006/0272934 A1 | 12/2006 | Beste | |
| 2007/0019708 A1 | 1/2007 | Shiflett | |
| 2007/0027038 A1 | 2/2007 | Kamimura | |
| 2007/0080052 A1 | 4/2007 | Beste | |
| 2007/0089449 A1 | 4/2007 | Gurin | |
| 2007/0131535 A1 | 6/2007 | Shiflett | |
| 2007/0142646 A1 | 6/2007 | Maase | |
| 2007/0144186 A1 | 6/2007 | Shiflett | |
| 2007/0295478 A1 | 12/2007 | Shiflett | |
| 2008/0028777 A1 | 2/2008 | Boesmann et al. | |
| 2008/0111099 A1 | 5/2008 | Singh | |
| 2008/0111100 A1 | 5/2008 | Thomas | |
| 2008/0112866 A1 | 5/2008 | Davis | |
| 2008/0153697 A1 | 6/2008 | Shiflett | |
| 2008/0293978 A1 | 11/2008 | Shiflett | |
| 2009/0131728 A1 | 5/2009 | Shiflett | |
| 2010/0095703 A1 | 4/2010 | Jork | |
| 2010/0132384 A1 | 6/2010 | Shiflett | |
| 2010/0144994 A1 | 6/2010 | Shiflett | |
| 2010/0145073 A1 | 6/2010 | Foo | |
| 2010/0145074 A1 | 6/2010 | Foo | |
| 2010/0152465 A1 | 6/2010 | Davis | |
| 2010/0155660 A1 | 6/2010 | Shiflett | |

(Continued)

FOREIGN PATENT DOCUMENTS

| | | | | |
|---|---|---|---|---|
| DE | 3623680 A1 | | 1/1988 | |
| JP | 2006037826 | | 2/2006 | |
| KR | 2004/0017506 | * | 2/2004 | ........................ 17/38 |
| KR | 2004-0017506 | | 2/2004 | |
| WO | 2005007657 | | 1/2005 | |
| WO | WO 2005/113702 A1 | | 12/2005 | |

OTHER PUBLICATIONS

M.B. Shiflet et. al., Solubilities and Diffusivities of Carbon Dioxide in Ionic Liquids: {bmim}{PG6} and {bmim}{BF4}, Ind. Eng. Chem. Res., 2005, pp. 4453-4464, vol. 44.
R.C. Reid et. al., The Properties of Gases & Liquids, 4th Ed., 1987, McGraw-Hill, New York (Book Not Included).
A. Yokozeki, Refrigerants of Ammonia and N-Butane Mixtures, Proc. Intl., 2004, pp. 20-24, vol. 3.
W.F. Stoecker et. al.. Refrigeration and Air Conditioning, 1982, pp. 328-350, McGraw-Hill, New York (Book Not Included).
Proceeding of the 11th Canadian Hydrogen Conference, 2001, pp. 633-642 (Book Not Included).
A. Yokozeki, Intl. Time-Dependent Behavior of Gas Absoprtion in Lubreicant Oil, J. Refrigeration, 2002, pp. 695-704, vol. 22.
W.F. Stoecker et. al., Absorption Refrigeration, Refrigeration and Air Conditioning, 1982, pp. 328-350, Chapter 17.

(Continued)

*Primary Examiner* — Monique Peets

(57) ABSTRACT

The present invention relates to an absorption cycle comprising a refrigerant pair comprising at least one refrigerant and at least one ionic liquid. The present invention also provides an absorption cycle that utilizes fluorocarbon gases in fluorinated ionic liquids. The present invention also provides a method of cooling using an absorption cycle comprising a refrigerant pair comprising at least one refrigerant and at least one ionic liquid. The present invention also provides a method of heating using an absorption cycle comprising a refrigerant pair comprising at least one refrigerant and at least one ionic liquid.

57 Claims, 10 Drawing Sheets

(56) References Cited

U.S. PATENT DOCUMENTS

| | | |
|---|---|---|
| 2010/0200799 A1 | 8/2010 | Mouli |
| 2010/0228035 A1 | 9/2010 | Davis |
| 2011/0088418 A1 | 4/2011 | Kontomaris |
| 2011/0203301 A1 | 8/2011 | Foo |
| 2011/0296993 A1 | 12/2011 | Foo |
| 2013/0061612 A1 | 3/2013 | Shiflett |

OTHER PUBLICATIONS

F.E. Pinkerton et. al., High-Pressure Gravimetric Measurement of Hydrogen Capacity in Vapor-Grown Carbon Nanofibers and Related Materials, Proceedings of the 11$^{th}$ Canadian Hydrogen Conference, 2001, pp. 633-642.

D.H. Han et. al., Method Separate Gas Mixture Imidazolium Based Ion Liquid, 2004, XP-002383336.

B. Wu et. al., Novel Ionic Liquid Thermal Storage for Solar Thermal Electric Power Systems, Proceedings of Solar Forum , Solar Energy: The Power of Choose, 2001, XP-002341969.

International Search Report Dated Jun. 13, 2006, International Application No. PCT/US2006/004230, International Filing Date: Feb. 3, 2006.

D.C. Erickson et. al., Heat-Activated Dual-Function Absorption Cycle, ASHRAE Trans., 2004, pp. 515-524, vol. 110.

B.J. Eiseman, Why Refrigerant 22 Should Be Favored for Absorption Refrigeration, ASHRAE J., 1959, pp. 45-50, vol. 64 ASHRAE Journal , 1959, p. 1, vol. 45.

S.V.R. Mastrangelo, Solubility of Some Chlorofluorohydrocarbons in Tetraethylene Glyco Dimethyl Ether, ASHRAE Journal, 1959, pp. 64-68, vol. 1.

Y. Nezu et. al., Thermodynamic Properties of Working-Fluid Pairs With R-134A for Absorption Refrigeration System, Natural Working Fluids, 2002, pp. 446-454.

IIR Gustav Lorentzen Conf. 5, China, Sep. 17-20, 2002, pp. 446-453 (Book Not Included).

M. Fatouh et. al., Comparison of R22-Absorbent Pairs for Absorption Cooling Based on P-T-X Data, Renewable Energy, 1993, pp. 31-37, vol. 3.

M.S. Bhatt et. al., Thermodynamic Modelling of Absorption-Resorption Heating Cycles With Some New Working Pairs, Heat Recovery System & CHP, 1992, pp. 225-233, vol. 12.

Ness et. al., Classical Thermodynamics of Nonelectrolyte Solutions With Applications to Phase Equilibria, 1982, Mc-Graw-Hill, New York (Book Not Included).

A Yokozeki, Compressor Performance Analyses of Refrigerants (R22 and R407C) With Various Lubricants in a Heat Pump, Proc. Intl. Compressor Eng. Conf. at Purdue, 1994, pp. 335-340, vol. 1.

A. Yokozeki, Solubility of Refrigerants in Various Lubricants, Intl. J. Thermophys., 2001, pp. 1057-1071, vol. 22.

A. Yokozeki, Theoretical Performances of Various Refrigerant-Absorbent Pairs in a Vapor-Absorption Refrigeration Cycle by the Use of Equations of State, Applied Energy, 2005, pp. 383-399, vol. 80.

Intl. Patent Applic. No. PCT/US2009/49869, Jul. 8, 2009, Shiflett.

Helene Olivier, et al., Nonaqueous Room-Temperature Ionic Liquids: A New Class of Solvents for Catalytic Organic Reactions, Catalysis of Organic Reactions, 1996, pp. 249-263, vol. 68, France.

Thomas Welton, Room-Temperature Ionic Liquids. Solvents for Synthesis and Catalysis, Chem. Rev. 1999, vol. 99, pp. 2071-2083.

Michael Freemantle, Designer Solvents: Ionic Liquids may Boost Clean Technology Development, Chemical and Engineering News, Mar. 30, 1998, pp. 32-37.

Kenneth R. Seddon, Ionic Liquids for Clean Technology, J. Chem. Tech. Biotechnol. 1997, vol. 68, pp. 351-356.

Charles M. Gordon et al., Ionic Liquid Crystals: Hexafluorophosphate Salts, Journal of Materials Chemistry, 1998, vol. 8, pp. 2627-2636.

John E. Enderby, Ionic Liquids: Recent Progress and Remaining Problems, J. Phys.: Condens. Matter vol. 5, 1993, pp. B99-B106, United Kingdom.

Rogers et al., "Ionic Liquids—Solvents of the Future?", Science, vol. 302, 2003, pp. 792-793.

Holbrey, Reichert, Reddy and Rogers; Heat Capacities of Ionic Liquids and their Application as Thermal Fluids; ACS Symposium Series (Ionic Liquids as Green Solvents) pp. 121-133; Aug. 26, 2003; ACS, Washington D.C.

K. Stephan; History of absorption heat pumps and working pair developments in Europe (XP002570536); Intl. Journal of Refrigeration, pp. 160-166; 1983: Butterworth & Co., London.

\* cited by examiner

Figure 1 A schematic diagram of a simple absorption refrigeration cycle.

Solubility of difluoromethane (HFC-32) in 1-butyl-3-methylimidazolium hexafluorophosphate ([bmim][PF$_6$])

Solubility of pentafluoroethane (HFC-125) in 1-butyl-3-methylimidazolium hexafluorophosphate ([bmim][PF$_6$])

Solubility of 1,1,1-trifluoroethane (HFC-143a) in 1-butyl-3-methylimidazolium hexafluorophosphate ([bmim][PF$_6$])

Solubility of 1,1-difluoroethane (HFC-152a) in 1-butyl-3-methylimidazolium hexafluorophosphate ([bmim][PF$_6$])

Figure 7  Solubility of difluoromethane (HFC-32) in 1-butyl-3-methylimidazolium tetrafluoroborate ([bmim][BF$_4$])

Isotherm Comparison of Difluoromethane (HFC-32) and Imidazolium based Ionic Liquids at 25 °C P/P₀ versus mole fraction

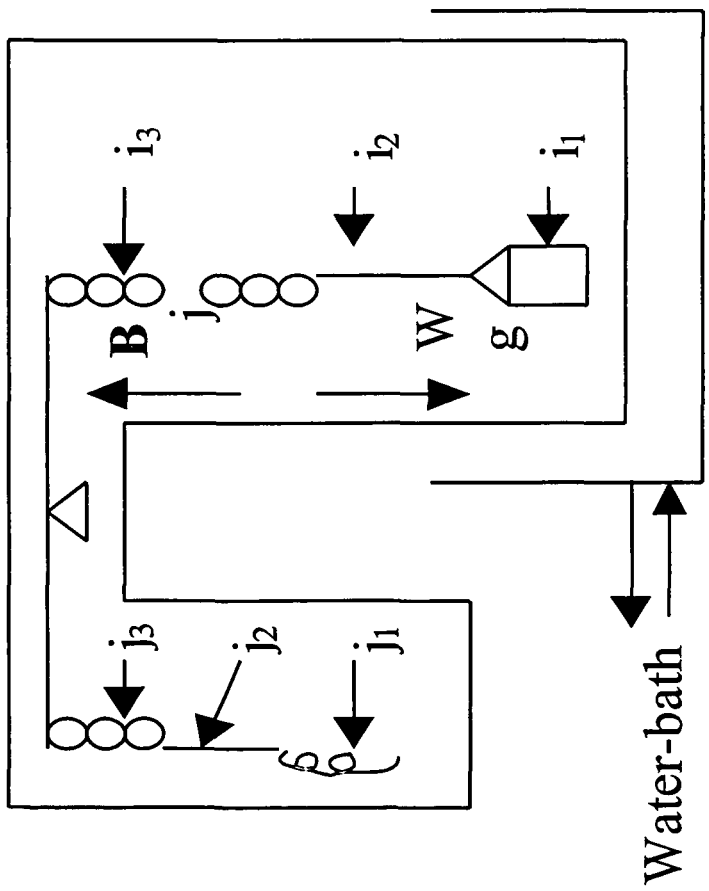
Figure 10 A schematic diagram of the gravimetric microbalance

ABSORPTION CYCLE UTILIZING IONIC LIQUID AS WORKING FLUID

This application claims the benefit of U.S. Provisional Application No. 60/650,330, filed Feb. 4, 2005, which is incorporated in its entirety as a part hereof for all purposes.

TECHNICAL FIELD

The present invention relates to the execution of an absorption refrigeration cycle by use of a refrigerant pair comprising at least one refrigerant and at least one ionic liquid.

BACKGROUND

As a new type of solvent with immeasurable vapor pressure, room-temperature ionic liquids are being used for chemical separation and unique reaction media. Solvent phase behavior is an important factor in the attractiveness of using ionic liquids in these applications as well as in new applications such as absorption cooling or heating.

The absorption refrigeration cycle has been in use in various forms for more than 100 years. Although the vapor compression cycle is now used for most air-conditioning and refrigerating applications, the well-known refrigerant-absorber systems ($H_2O$/LiBr and $NH_3$/$H_2O$) are still being used for certain applications, particularly in the field of industrial applications or large-scale water chiller systems. Recently, more attention has been directed toward recovery of waste heat using the $NH_3$/$H_2O$ system (Erickson, D. C., et al (ASHRAE Trans., 2004, 110). Inherent drawbacks to using LiBr and $NH_3$ as refrigerants include the corrosiveness of LiBr and the toxicity and flammability of $NH_3$. In the late 1950s, there were proposals of new refrigerant-absorbent pairs for the absorption cycle using fluoroalkane refrigerants with organic absorbents (Eiseman, B. J. [ASHRAE J., 1959, 1:45]; Mastrangelo, S. V. R. [ASHRAE J., 1959, 1:64]). Such studies continue actively even at the present time, especially among academic institutions (Nezu, Y., et al. [Natural Working Fluids 2002, IIR Gustav Lorentzen Conf. 5$^{th}$, China, Sep. 17-20, 2002, 446-453]; Fatouh, M. and Murthy, S. S. [Renewable Energy, 1993, 3:31-37]; Bhatt, M. S., et al. [Heat Recovery System & CHP, 1992, 12:225-233]).

Although WO 05/113,702 discloses the use of ionic liquids in absorption refrigeration applications, a need still remains for refrigeration pairs that are characterized by a well-balanced set of properties.

SUMMARY

One embodiment of this invention is a composition comprising a refrigerant pair comprising at least one refrigerant selected from the group consisting of hydrofluorocarbon, hydrochlorofluorocarbon, chlorofluorocarbon, fluorocarbon, $N_2$, $O_2$, $CO_2$, $NH_3$, Ar, $H_2$, $H_2O$ and non-fluorinated hydrocarbon selected from the group consisting of $C_1$ to $C_4$ straight-chain, branched or cyclic alkanes and $C_1$ to $C_4$ straight-chain, branched or cyclic alkenes; and at least one ionic liquid. The ionic liquid may comprise a cation selected from the group consisting of pyridinium, pyridazinium, pyrimidinium, pyrazinium, imidazolium, pyrazolium, thiazolium, oxazolium and triazolium, and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion. The cation and/or the anion may be fluorinated. Fluorinated anions may be selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

Another embodiment of this invention is a composition comprising at least one hydrofluorocarbon, hydrochlorofluorocarbon, chlorofluorocarbon or fluorocarbon selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), chlorodifluoromethane (HCFC-22), dichlorodifluoromethane (CFC-12, perfluoromethane (FC-14) and perfluoroethane (FC-116); and at least one ionic liquid. The ionic liquid may be comprised of a cation selected from the group consisting of pyridinium, pyridazinium, pyrimidinium, pyrazinium, imidazolium, pyrazolium, thiazolium, oxazolium and triazolium and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion, said composition comprising from about 0.05 to about 99.95 mole percent of the hydrofluorocarbon, hydrochlorofluorocarbon, chlorofluorocarbon or fluorocarbon over a temperature range from the triple point temperature to the critical point temperature of the refrigerant at a pressure from vacuum to the critical pressure of the refrigerant.

A further embodiment of this invention is a process for cooling or heating an object or space by executing an absorption refrigeration cycle using one or more refrigerants and/or one or more ionic liquids.

Yet another embodiment of this invention is an apparatus for executing an absorption refrigeration cycle that comprises any of the compositions disclosed herein, and/or performs any of the processes disclosed herein.

BRIEF DESCRIPTION OF THE DRAWINGS

FIG. 10 shows a schematic diagram of the gravimetric microbalance used for measuring gas absorption in the ionic liquids.

DETAILED DESCRIPTION

Figure 1:
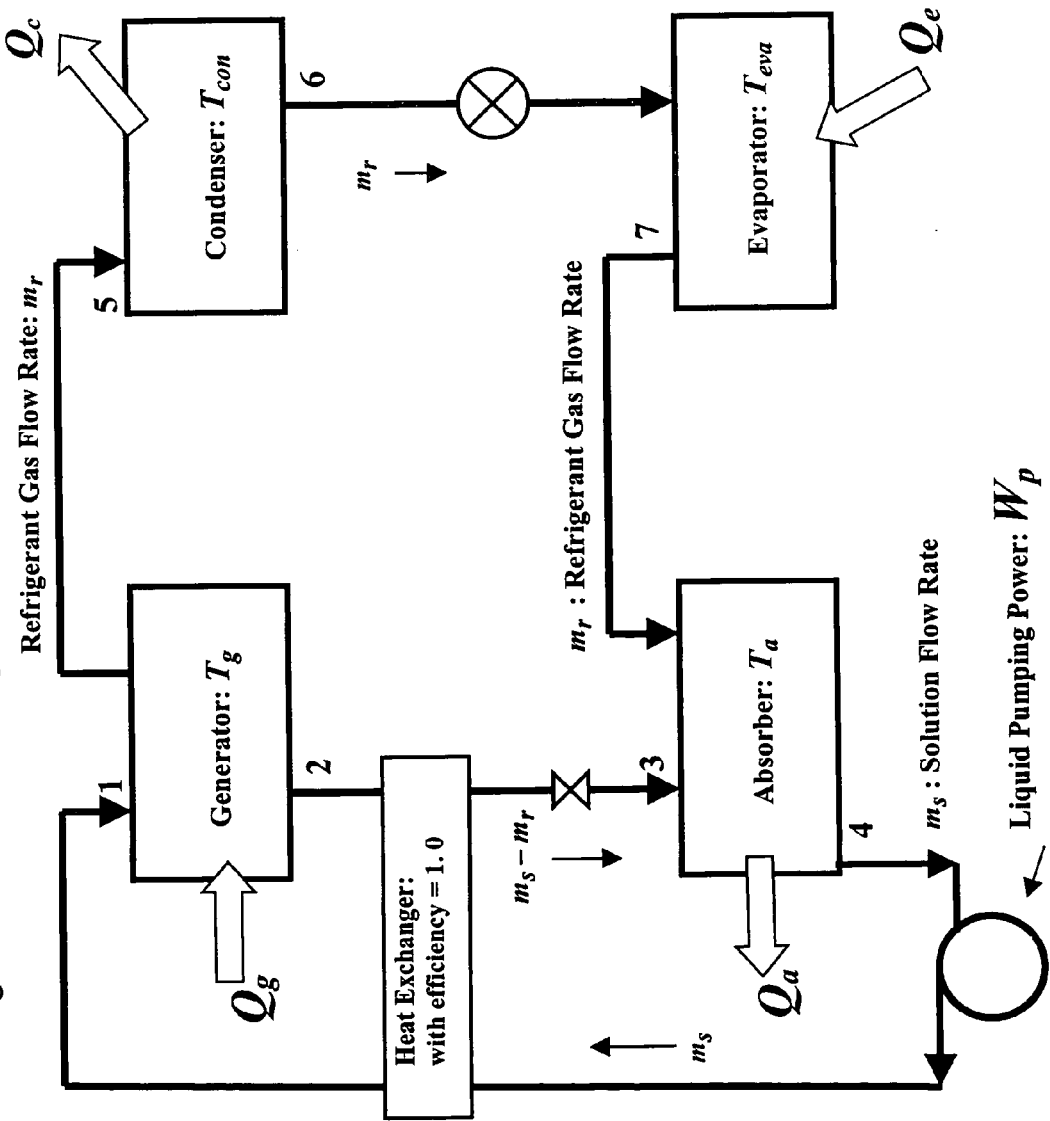
FIG. 1 shows a schematic diagram of a simple absorption refrigeration cycle.
Figure 2:
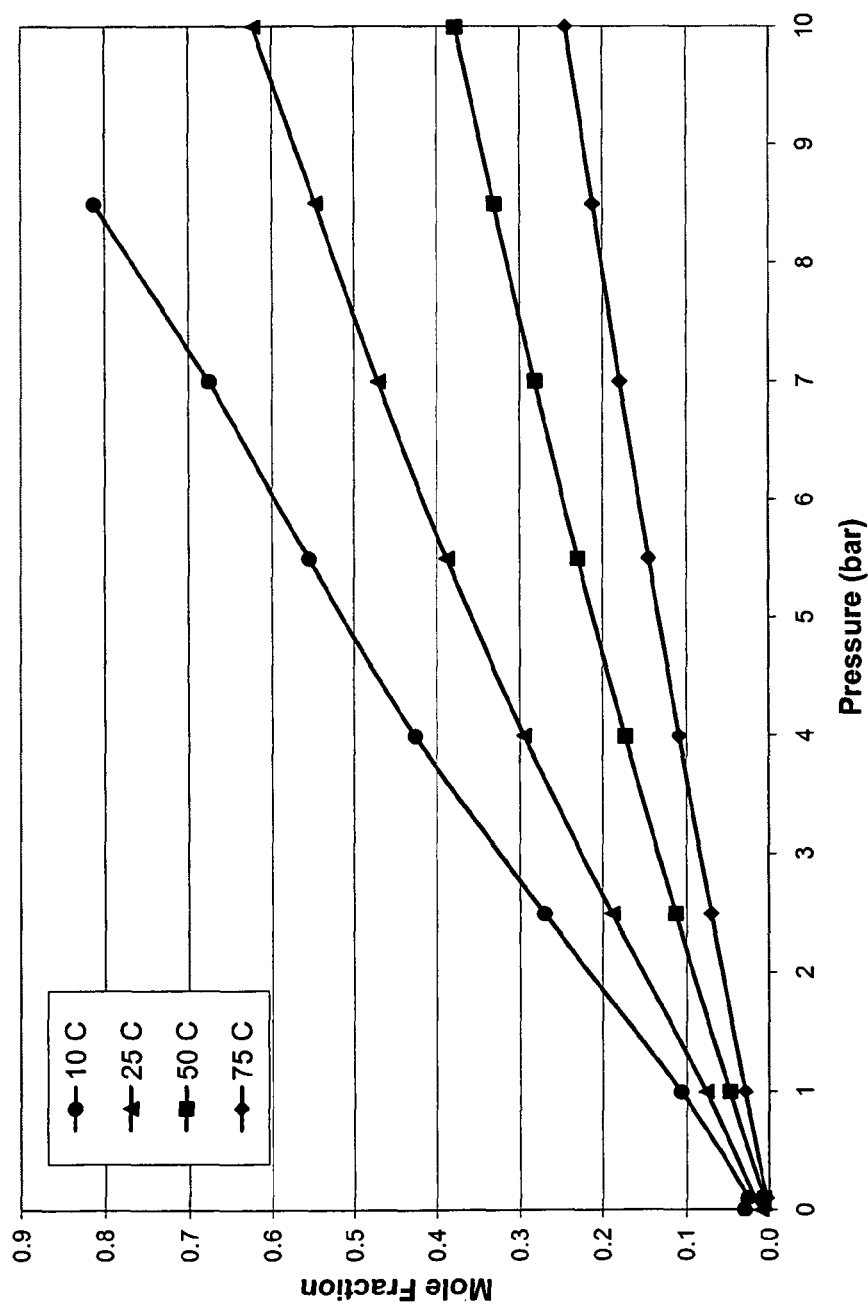
FIG. 2 shows measured isothermal solubility data (in mole fraction) of the system HFC-32+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 3:
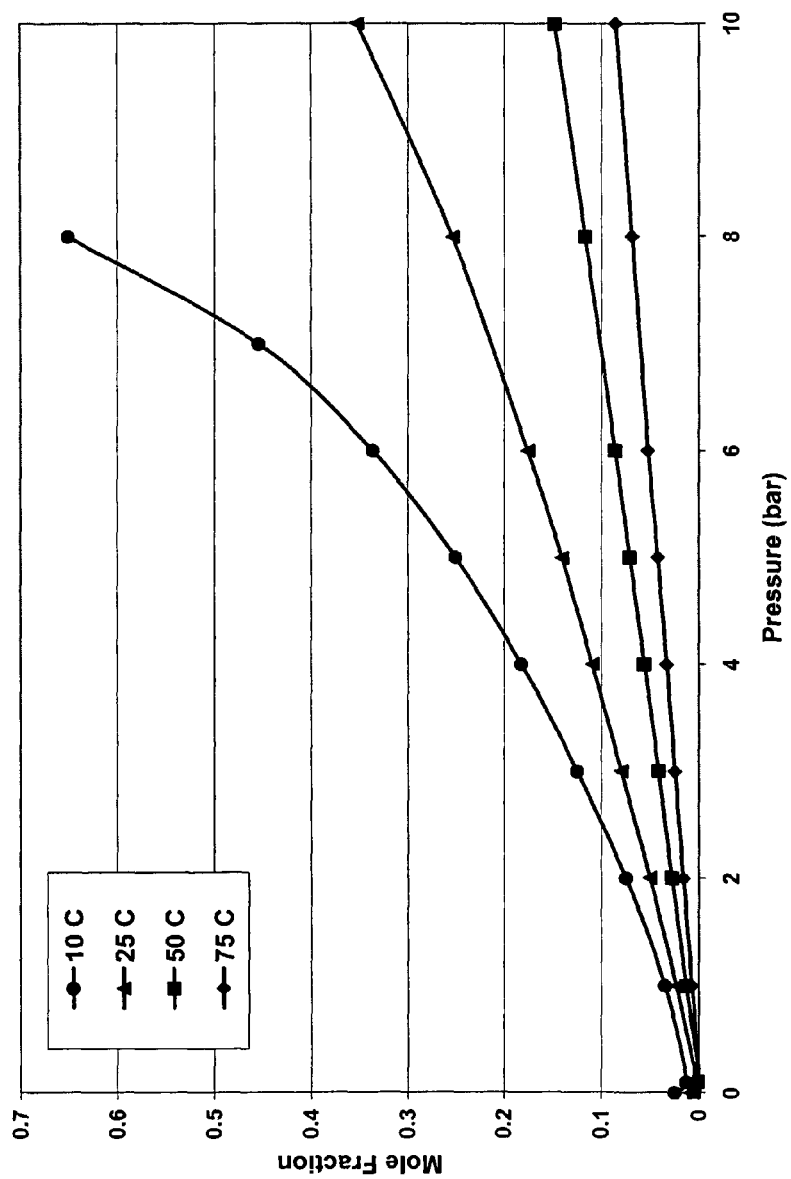
FIG. 3 shows measured isothermal solubility data (in mole fraction) of the system HFC-125+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 4:
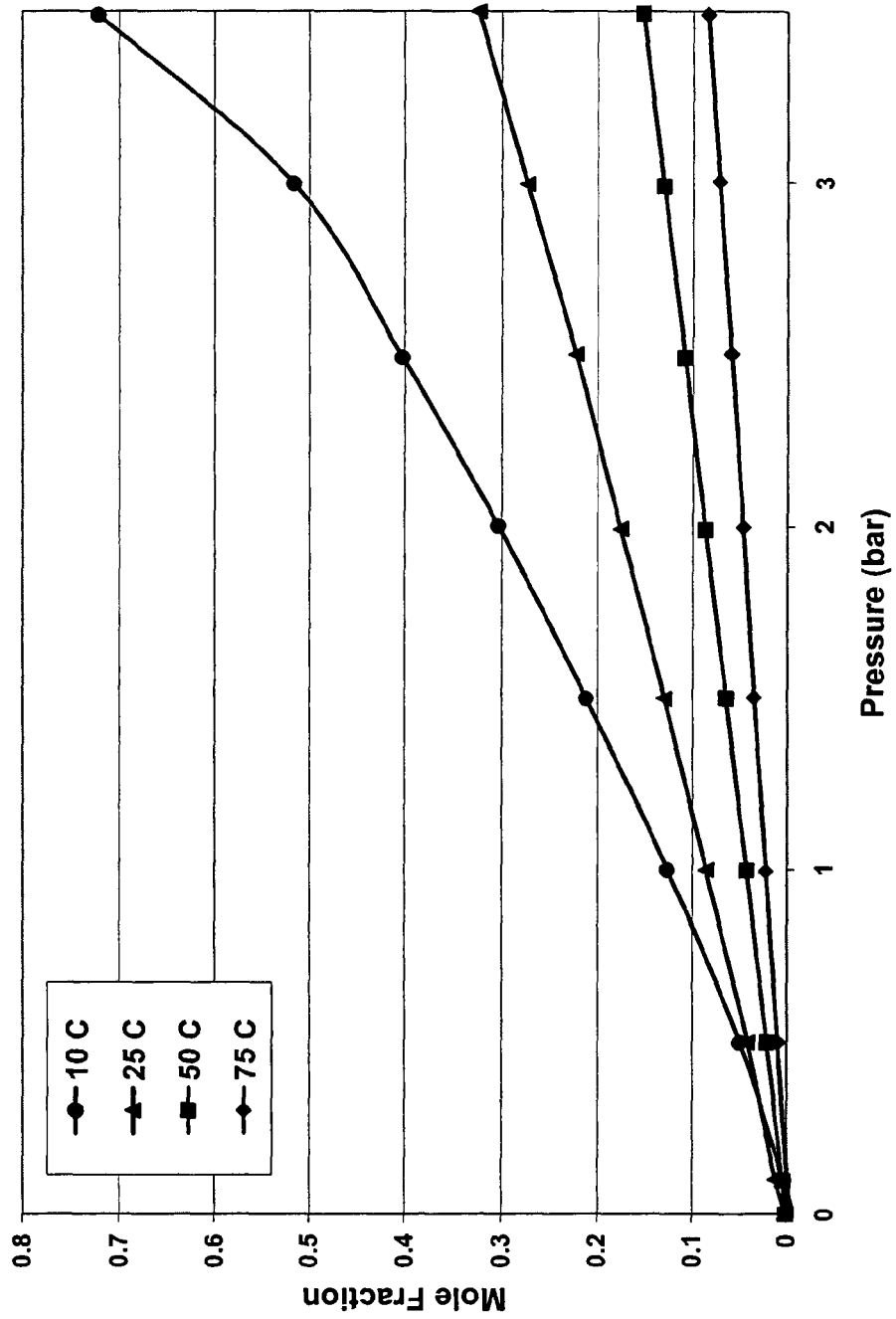
FIG. 4 shows measured isothermal solubility data (in mole fraction) of the system HFC-134a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 5:
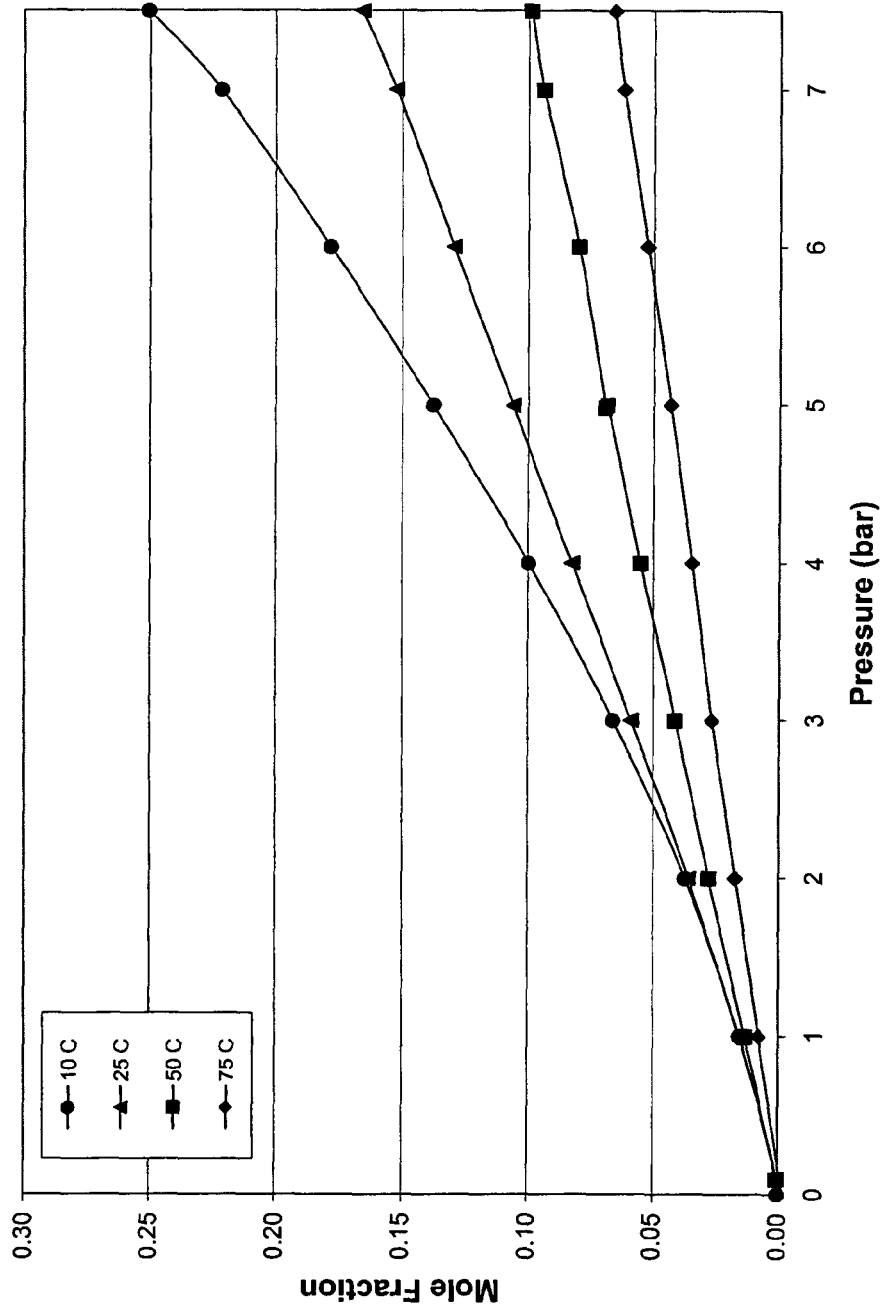
FIG. 5 shows measured isothermal solubility data (in mole fraction) of the system HFC-143a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 6:
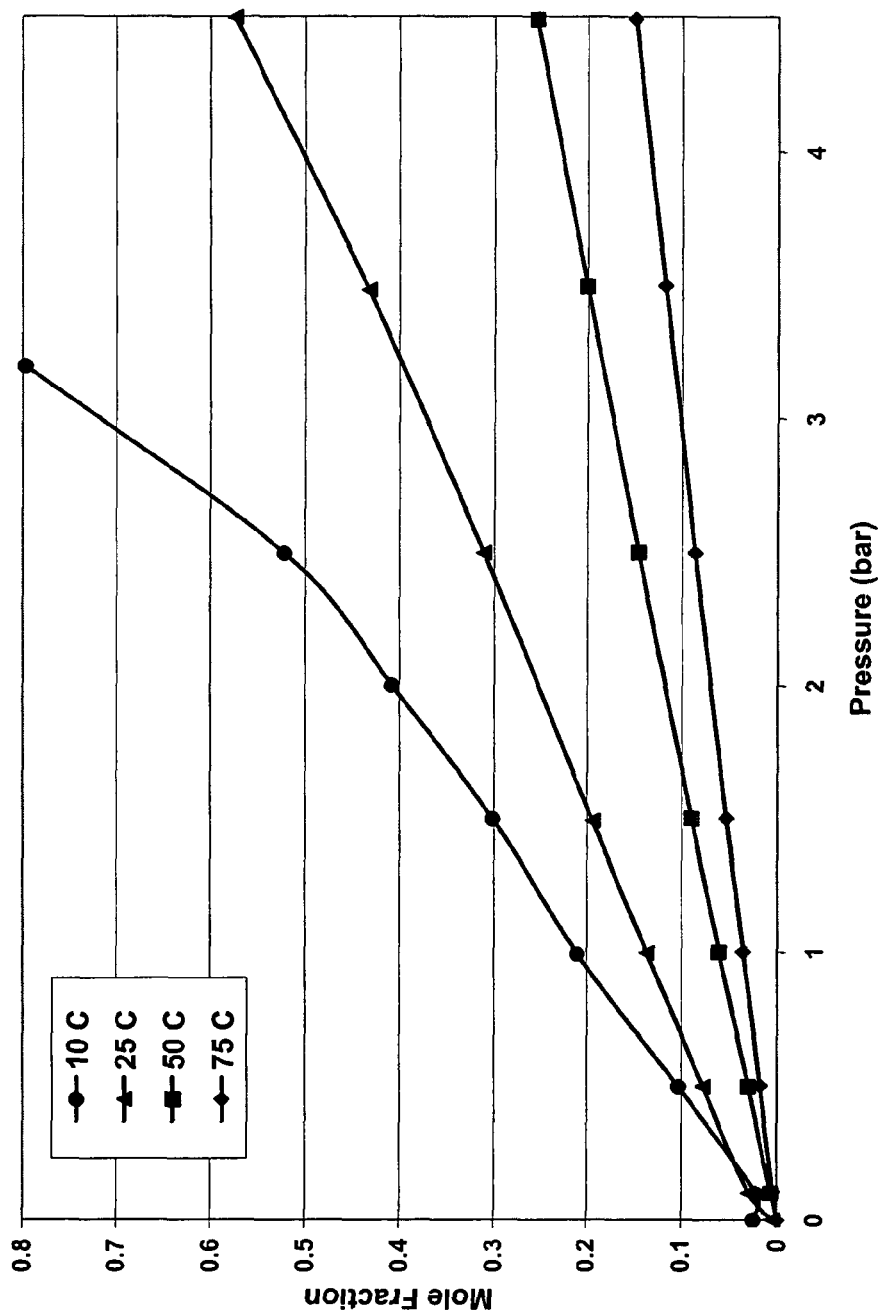
FIG. 6 shows measured isothermal solubility data (in mole fraction) of the system HFC-152a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.

The present invention relates to the discovery that refrigerants are soluble in ionic liquids. The invention provides refrigerant pairs comprising refrigerants and ionic liquids, wherein the refrigerant exhibits good solubility and diffusivity in the ionic liquid. The refrigerant/ionic liquid pairs are useful in absorption cooling and heating systems. The invention also provides for the execution of absorption cycles utilizing refrigerant/ionic liquid pairs. The invention also provides a process for cooling or heating utilizing refrigerant/ionic liquid pairs.

In this disclosure, definitions are provided for various terms as set forth in the following list and elsewhere below:

The term "ionic liquid" means an organic salt that is fluid at or below about 100° C.

The term "fluorinated ionic liquid" means an ionic liquid having at least one fluorine on either the cation or the anion. A "fluorinated cation" or "fluorinated anion" is a cation or anion, respectively, having at least one fluorine.

The terms "refrigerant pair" and "refrigerant/ionic liquid pair" are used interchangeably and refer to a pair or mixture comprising both a refrigerant and an ionic liquid. A "refrigerant pair composition" is a composition comprising a refrigerant pair. A "mixed refrigerant" is a refrigerant composition comprising at least two refrigerants.

A "refrigerant" is a substance such as a fluorocarbon (FC), hydrofluorocarbon (HFC), chlorofluorocarbon (CFC), hydrochlorofluorocarbon (HCFC), or ammonia, alkanes, alkenes, aromatics, carbon dioxide, or other gas such as hydrogen, oxygen, nitrogen, and argon that, when it changes phase from liquid to vapor (evaporates), it removes heat from the surroundings, and when it changes phase from vapor to liquid (condenses), it adds heat to the surroundings.

The term "fluorinated refrigerant" or "fluorine-containing refrigerant" refers to a fluorocarbon, hydrofluorocarbon, chlorofluorocarbon, or hydrochlorofluorocarbon.

The term "vacuum" refers to pressures less than 1 bar but greater than $10^{-4}$ bar for practical use in absorption cycles.

The term "alkane" refers to a saturated hydrocarbon having the general formula $C_nH_{2n+2}$ that may be straight chain, branched or cyclic. A cyclic compound requires a minimum of three carbons.

The term "alkene" refers to an unsaturated hydrocarbon that contains one or more C═C double bonds that may be straight chain, branched or cyclic. An alkene requires a minimum of two carbons. A cyclic compound requires a minimum of three carbons.

The term "aromatic" refers to benzene and compounds that resemble benzene in chemical behavior.

A "heteroatom" is an atom other than carbon in the structure of an alkanyl, alkenyl, cyclic or aromatic compound.

"Heteroaryl" refers to an alkyl group having a heteroatom.

An "azeotropic" or "constant boiling" mixture of two or more refrigerants is a mixture wherein the composition of the vapor and liquid phases are substantially the same at a temperature and pressure encountered in a cooling or heating cycle. Included in the definition of a constant boiling mixture is a "near-azeotropic" mixture, which, as described in U.S. Pat. No. 4,810,403, maintains a substantially constant vapor pressure even after evaporative losses, thereby exhibiting constant boiling behavior.

As a new type of solvent with immeasurable vapor pressure, room-temperature ionic liquids are used herein for absorption cooling or heating. In the present invention, the solubility and diffusivity of fluorinated refrigerants, and other gases such as carbon dioxide, ammonia and non-fluorinated hydrocarbons, in various ionic liquids, determined for example using a gravimetric microbalance, indicates their usefulness for absorption cooling or heating.

The present invention provides refrigerant pair compositions for use in absorption refrigeration cycles. Although referred to as absorption refrigeration cycles, absorption cycles can be used for cooling, or for generating heat, depending on the application. One member of the refrigerant pair comprises at least one refrigerant selected from the group consisting of hydrofluorocarbon, hydrochlorofluorocarbon, chlorofluorocarbon, fluorocarbon, nitrogen (N$_2$), oxygen (O$_2$), carbon dioxide (CO$_2$), ammonia (NH$_3$), argon (Ar), hydrogen (H$_2$), water (H$_2$O), and non-fluorinated hydrocarbon, wherein the non-fluorinated hydrocarbon is selected from the group consisting of C$_1$ to C$_4$ straight-chain, branched or cyclic alkanes and C$_1$ to C$_4$ straight-chain, branched or cyclic alkenes. The second member of the refrigerant pair comprises at least one ionic liquid, which is used as an absorbent.

Hydrofluorocarbon refrigerants include compounds having any combination of hydrogen and fluorine with carbon and include compounds with carbon-carbon double bonds with boiling points below 0° C. Examples of hydrofluorocarbon refrigerants useful for the invention include difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) and fluoroethane (HFC-161). In one embodiment of the invention, the hydrofluorocarbon refrigerants are selected from the group consisting of difluoromethane (HFC-32), pentafluoroethane (HFC-125), 1,1,1,2-tetrafluoroethane (HFC-134a), 1,1,1-trifluoroethane (HFC-143a) and 1,1-difluoroethane (HFC-152a).

Chlorofluorocarbon refrigerants include compounds having any combination of chlorine and fluorine with carbon and include compounds with carbon-carbon double bonds with boiling points below 0° C. An example of a chlorofluorocarbon refrigerant useful for the invention is dichlorodifluoromethane (CFC-12).

Hydrochlorofluorocarbon refrigerants include compounds with any combination of hydrogen, chlorine and fluorine with carbon and include compounds with carbon-carbon double bonds with boiling points below 0° C. An example of a hydrochlorofluorocarbon refrigerant useful for the invention includes chlorodifluoromethane (HCFC-22).

Fluorocarbon refrigerants include compounds with any combination of fluorine and carbon and include compounds with carbon-carbon double bonds with boiling points below 0° C. Examples of fluorocarbon refrigerants useful for the invention include perfluoromethane (FC-14) and perfluoroethane (FC-116).

Non-fluorinated hydrocarbon refrigerants useful for the invention include methane, ethane, ethylene, propane, cyclopropane, propylene, butane, and isobutane.

Mixtures of refrigerants are also useful for achieving proper boiling temperature or pressure appropriate for absorption equipment. In particular, mixtures which form azeotropes or constant boiling mixtures are preferred because minimal to no fractionation of the mixture will occur if the refrigerant leaks from the absorption cooling system. Azeotropic or constant boiling compositions of difluoromethane (HFC-32), pentafluoroethane (HFC-125), and 1,1,1,2-tetrafluoroethane (HFC-134a) suitable for use as refrigerants herein are described, for example, in U.S. Pat. No. 5,709,092.

The ionic liquid used in this invention can, in principle, be any ionic liquid that absorbs the refrigerant gas, however ionic liquids that have minimal absorption of the refrigerant gas will be less effective as absorption cycle working fluids. Ideally, high absorption and diffusivity are desired to achieve a high-energy efficiency cycle. Ionic liquids may be synthesized, or obtained commercially from several companies such as Merck (Darmstadt, Germany) or BASF (Mount Olive, N.J.). A cation or anion of an ionic liquid of the invention can, in principle, be any cation or anion such that the cation and anion together form an organic salt that is liquid at or below about 100° C.

In one embodiment of the invention, ionic liquids have cations selected from the following Formulae:

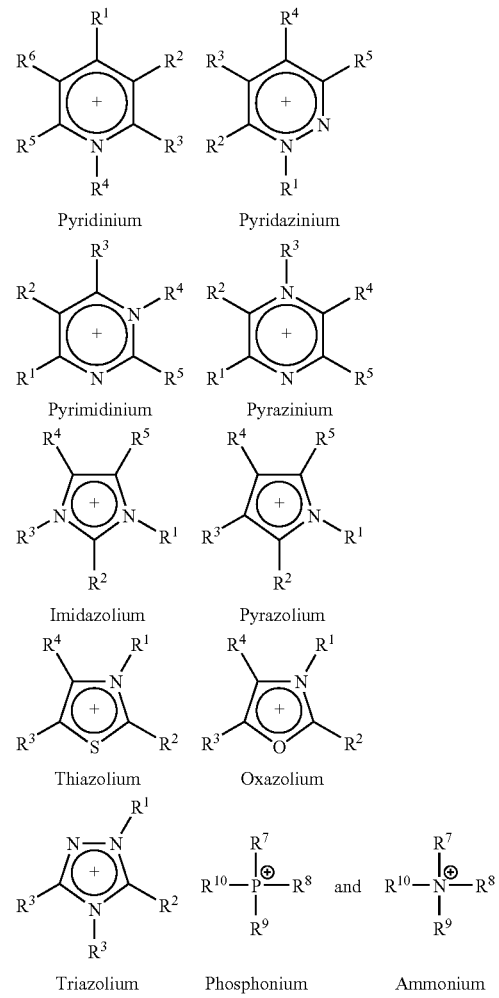

wherein R$_1$, R$_2$, R$_3$, R$_4$, R$_5$ and R$_6$ are independently selected from the group consisting of:
(i) H
(ii) F
(iii) CH$_3$, C$_2$H$_5$, or C$_3$ to C$_{12}$ straight-chain, branched or cyclic alkane or alkene, optionally substituted with Cl$^-$, Br$^-$, F$^-$, I$^-$, OH$^-$, NH$_2^-$ or SH$^-$;
(iv) CH$_3$, C$_2$H$_5$, or C$_3$ to C$_{12}$ straight-chain, branched or cyclic alkane or alkene comprising one to three heteroatoms selected from the group consisting of O, N, Si and S, and optionally substituted with Cl$^-$, Br$^-$, F$^-$, I$^-$, OH$^-$, NH$_2^-$ or SH$^-$;
(v) C$_6$ to C$_{20}$ unsubstituted aryl or heteroaryl, wherein one to three heteroatoms are independently selected from the group consisting of O, N, Si and S;
(vi) C$_6$ to C$_{20}$ substituted aryl or heteroaryl, wherein one to three heteroatoms are independently selected from the group consisting of O, N, Si and S; and one to three substituents are independently selected from the group consisting of 1) CH$_3$, C$_2$H$_5$, or C$_3$ to C$_{12}$ straight-chain, branched or cyclic alkane or alkene, optionally substituted with Cl$^-$, Br$^-$, F$^-$, I$^-$, OH$^-$, NH$_2^-$ or SH$^-$, 2) OH$^-$, 3) NH$^{2-}$ and 4) SH$^-$; and wherein optionally at least two of $R_1$, $R_2$, $R_3$, $R_4$, $R_5$ and $R_6$ can together form a cyclic or bicyclic alkanyl or alkenyl group.

In another embodiment, ionic liquids of the invention may comprise fluorinated cations wherein at least one of $R_1$, $R_2$, $R_3$, $R_4$, $R_5$ and $R_6$ comprises $F^-$.

In one embodiment of the invention, ionic liquids have anions selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion. Fluorinated anions of the invention include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

In another embodiment, ionic liquids may comprise a cation selected from the group consisting of pyridinium, pyridazinium, pyrimidinium, pyrazinium, imidazolium, pyrazolium, thiazolium, oxazolium and triazolium as defined above and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion. In yet another embodiment, ionic liquids may comprise a cation selected from the group consisting of pyridinium, pyridazinium, pyrimidinium, pyrazinium, imidazolium, pyrazolium, thiazolium, oxazolium and triazolium as defined above and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

In still another embodiment, ionic liquids may comprise a cation selected from the group consisting of pyridinium, pyridazinium, pyrimidinium, pyrazinium, imidazolium, pyrazolium, thiazolium, oxazolium and triazolium as defined above, wherein at least one of $R_1$, $R_2$, $R_3$, $R_4$, $R_5$ and $R_6$ comprises $F^-$, and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion. In still another embodiment, ionic liquids may comprise a cation selected from the group consisting of pyridinium, pyridazinium, pyrimidinium, pyrazinium, imidazolium, pyrazolium, thiazolium, oxazolium and triazolium as defined above, wherein at least one of $R_1$, $R_2$, $R_3$, $R_4$, $R_5$ and $R_6$ comprises $F^-$, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

In still another embodiment, ionic liquids of the invention may comprise imidazolium as the cation and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$; 1-butyl-3-methylimidazolium as the cation and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$; 1-butyl-3-methylimidazolium as the cation and $[BF_4]^-$ or $[PF_6]^-$ as the anion; 1-propyl-2,3-dimethylimidazolium as the cation and $[(CF_3SO_2)_2N]^-$, $[(CF_3SO_2)_3C]^-$ as the anion; or 1,3-dioctylimidazolium or 1-octyl-3-methylimidazolium as the cation and $[I]^-$ as the anion.

Mixtures of ionic liquids are also useful for achieving a desirable level of absorption behavior, in particular if a mixed refrigerant is used in combination with absorption equipment.

The invention also provides compositions comprising at least one hydrofluorocarbon, hydrochlorofluorocarbon, chlorofluorocarbon or fluorocarbon selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), chlorodifluoromethane (HCFC-22), dichlorodifluoromethane (CFC-12), perfluoromethane (FC-14) and perfluoroethane (FC-116); and at least one ionic liquid, said ionic liquid comprised of a cation selected from the group consisting of pyridinium, pyridazinium, pyrimidinium, pyrazinium, imidazolium, pyrazolium, thiazolium, oxazolium and triazolium, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$; wherein said compositions may be used as refrigerant pairs.

Refrigerant pairs of the invention may have the following composition. Compositions comprising at least one refrigerant and at least one ionic liquid may comprise from about 0.05 to about 99.95 mole percent of a refrigerant over a temperature range from the triple point temperature to the critical point temperature of the refrigerant at a pressure from vacuum to the critical pressure of the refrigerant. In another embodiment, compositions comprising at least one refrigerant and at least one ionic liquid may comprise from about 0.1 to about 99.9 mole percent of a refrigerant over a temperature range from the triple point temperature to the critical point temperature of the refrigerant at a pressure from vacuum to the critical pressure of the refrigerant.

For example, compositions comprising HFC-32 and ionic liquids may comprise from about 0.1 to about 99.9 mole percent of HFC-32 over a temperature range from −136.8 to 78.1° C. at a pressure from vacuum to 57.8 bar. Compositions comprising HFC-125 and ionic liquids may comprise from about 0.1 to about 99.9 mole percent of HFC-125 over a temperature range from −100.6 to 66° C. at a pressure from vacuum to 36.2 bar. Compositions comprising HFC-134 and ionic liquids may comprise from about 0.1 to about 99.9 mole percent of HFC-134 over a temperature range from −100.0 to 119.1° C. at a pressure from vacuum to 46.4 bar. Compositions comprising HFC-134a and ionic liquids may comprise from about 0.1 to about 99.9 mole percent of HFC-134a over a temperature range from −103.3 to 101° C. at a pressure from vacuum to 40.6 bar. Compositions comprising HFC-143a and ionic liquids may comprise from about 0.1 to about 99.9 mole percent of HFC-143a over a temperature range from −111.8 to 72.7° C. at a pressure from vacuum to 37.6 bar. Compositions comprising HFC-152a and ionic liquids may comprise from about 0.1 to about 99.9 mole percent of HFC-152a over a temperature range from −118.6 to 113.3° C. at a pressure from vacuum to 45.2 bar.

Additional examples of refrigerants useful in compositions comprising from about 0.1 to 99 mole percent refrigerant in at least one ionic liquid are shown in the following table, along with the triple point temperature, critical point temperature and critical point pressure of the refrigerant:

| Refrigerant | Triple Point Temperature (° C.) | Critical Point Temperature (° C.) | Critical Point Pressure (bar) |
|---|---|---|---|
| Perfluoromethane (FC-14) | −183.6 | −45.6 | 37.5 |
| Perfluoroethane (FC-116) | −97.2 | 19.9 | 30.5 |
| Perfluoropropane (FC-218) | −160.2 | 72.0 | 26.7 |
| Dichlorodifluoromethane (CFC-12) | −157.1 | 112.0 | 41.4 |
| Hydrochlorodifluoromethane (HCFC-22) | −157.4 | 96.1 | 49.9 |
| Fluoromethane (HFC-41) | −143.3 | 44.1 | 59.0 |
| 1,1,1,3,3,3-hexafluoropropane (HFC-236fa) | −93.6 | 124.9 | 32.0 |
| 1,1,1,2,3,3,3-heptafluoropropane (HFC-227ea) | −126.8 | 101.7 | 29.3 |
| Carbon Dioxide | −56.6 | 30.9 | 73.7 |
| Ammonia | −77.6 | 132.3 | 113.3 |
| Nitrogen | −210.0 | −147.0 | 33.9 |
| Oxygen | −218.8 | −118.6 | 50.4 |
| Hydrogen | −259.2 | −240.0 | 13.2 |
| Argon | −189.3 | −122.5 | 46.0 |
| Methane | −182.5 | −82.6 | 46.0 |
| Ethane | −182.8 | 32.2 | 48.7 |
| Ethylene | −169.4 | 9.3 | 50.4 |
| Propane | −187.7 | 96.7 | 42.4 |
| Propylene | −185.2 | 92.4 | 46.6 |
| Cyclopropane | 0.0 | 124.7 | 54.9 |
| Butane | −138.3 | 152.0 | 37.9 |
| Isobutane | −159.6 | 134.7 | 36.4 |
| H$_2$O | 0.0 | 374 | 220 |

The compositions of the invention may be prepared by any convenient method, including mixing or combining the desired amounts in an appropriate container, or in a device that executes an absorption refrigeration cycle.

Additives, such as lubricants, corrosion inhibitors, stabilizers, dyes, and other appropriate materials may be added to the compositions of the invention for a variety of purposes provided they do not have an adverse influence on the composition, for their intended applications.

The refrigerant pair compositions are useful in the execution of an absorption refrigeration cycle. A schematic diagram for a simple absorption cycle as applicable in this invention is shown in FIG. 1. The system is composed of condenser and evaporator units with an expansion valve similar to equipment used in an ordinary vapor compression cycle, but an absorber-generator solution circuit replaces the compressor. The circuit maybe composed of an absorber, a generator, a heat exchanger, a pressure control device and a pump for circulating the solution.

In order to evaluate the performance in an absorption cycle of a refrigerant and/or an absorbent, thermodynamic property charts such as temperature-pressure-concentration (TPX) and enthalpy-temperature (HT) diagrams are used. These charts correspond to the familiar PH (pressure-enthalpy) or TS (temperature-entropy) diagram in the vapor compression cycle analysis. However, the use of these charts is adapted to the particular case of an absorption cycle since vapor compression uses a compressor, where the compression process is theoretically a single isentropic path, while the absorption cycle employs the so-called generator-absorber solution circuit, and several thermodynamic processes are involved.

The PH or TS diagram in the vapor compression cycle is constructed using equations of state (EOS), and the cycle performance and all thermodynamic properties can be calculated. The thermodynamic charts for the absorption cycle are usually made by empirical correlation equations, which are fitted to experimental solubility and heat capacity data for solution properties, while the vapor phase properties are calculated with the refrigerant EOS. Sometimes, the solubility data are correlated using theoretical solution (often called "activity") models (Nezu, Y., supra; Fatouh, M. and Murthy, S. S. [Renewable Energy, 1993, 3:31-37]; Bhatt, M. S., et al [Heat Recovery System & CHP, 1992, 12:225-233]; Ness, H. C. V. and Abbott, M. M. [Classical Thermodynamics of Non-electrolyte Solutions with Applications to Phase Equilibria, 1982, McGraw-Hill, New York]). However, such models are limited in their use to temperatures well below the refrigerant critical temperature, and modeling solutions at high generator temperatures may become invalid. The combined use of empirical fitting equations or partially correct equations with the gas phase EOS may not always be completely consistent. Thus, it is desirable to model the absorption cycle process with thermodynamically sound EOS. By the use of EOS, even above the critical temperature of refrigerants, thermodynamic properties can be correctly calculated.

Although modeling refrigerant mixtures with EOS is familiar, refrigerant and non-volatile compound mixtures are traditionally treated with empirical correlation models by air conditioning and refrigeration engineers: e.g., refrigerant-lubricant oil solubility. One of the difficult problems in using EOS for such mixtures is determining how to set up EOS parameters for non-volatile compounds without much information about the critical parameters and vapor pressure data. We have overcome this problem, however, and have successfully applied EOS models to refrigerant-lubricant oil solubility data, as more fully described in Yokozeki, A. [Proc. Intl. Compressor Eng. Conf. at Purdue, 1994, 1:335-340]; Yokozeki, A. [Intl. J. Thermophys., 2001, 22:1057-1071]; and Yokozeki, A. [Applied Energy, 2005, 80:383-399]. Similar EOS models can therefore be used herein to calculate all thermodynamic properties consistently for use as an indicator of the utility of the refrigerants and ionic liquids disclosed herein as new absorption cycle fluid pairs.

A generic Redlich-Kwong (RK) type of cubic equations of state (EOS) (Shiflett, M. B. and Yokozeki, A. [Ind. Eng. Chem. Res. 2005, 44:4453-4464]) is employed herein, which is written in the following form:

$$P = \frac{RT}{\tilde{V} - b} - \frac{a(T)}{\tilde{V}(\tilde{V} + b)} \quad (1)$$

$$a(T) = 0.427480 \frac{R^2 T_c^2}{P_c} \alpha(T) \quad (2)$$

$$b = 0.08664 \frac{RT_c}{P_c} \quad (3)$$

The temperature-dependent part of the a parameter in the EOS for pure compounds is modeled by the following empirical form (Yokozeki, A. [Intl. J. Thermophys., 2001, 22:1057-1071]; Yokozeki, A. [Applied Energy, 2005, 80:383-399]; Shiflett, M. B. and Yokozeki, A. [Ind. Eng. Chem. Res. 2005, 44:4453-4464]):

$$\alpha(T) = \sum_{k=0}^{\leq 3} \beta_k \left(\frac{T_c}{T} - \frac{T}{T_c}\right)^k. \quad (4)$$

The coefficients, $\beta_k$, are determined so as to reproduce the vapor pressure of each pure compound.

For absorbents, however, usually no vapor pressure data are available, or vapor pressures are practically zero at application temperatures, and furthermore, no data for the critical parameters ($T_c$ and $P_c$) exist. The critical parameters of absorbents can be estimated by methods such as those described, for example, in (Reid, R. C., et al. [The Properties of Gases & Liquids, 4$^{th}$ Ed., 1987, McGraw-Hill, New York]). Using a method based on Reid et al, estimates of critical parameters for high boiling-point compounds are sufficient for correlating solubility (PTx) data. On the other hand, the temperature-dependent part of the a parameter for absorbents is significantly important when we try to correlate the PTx data of refrigerant-absorbent mixtures, although the vapor pressure of absorbents is essentially zero at the temperature of interest. Here, $\alpha(T)$ for an absorbent is modeled by only two terms in eq 4, as applied for the case of refrigerant-lubricant oil mixtures (Yokozeki, A. [Int. J. Thermophys., 2001, 22:1057-1071]).

$$k_{ij} = \frac{l_{ij}l_{ji}(x_i+x_j)}{l_{ji}x_i+l_{ij}x_j} \text{ where } k_{ii} = 0 \quad (5)$$

$$\alpha(T) = 1 + \beta_1\left(\frac{T_c}{T} - \frac{T}{T_c}\right) \quad (6)$$

The coefficient $\beta_1$ in eq 6 will be treated as an adjustable fitting parameter.

Then, the a and b parameters for general N-component mixtures are modeled in terms of binary interaction parameters (Yokozeki, A. [Applied Energy, 2005, 80:383-399]; Shiflett, M. B. and Yokozeki, A. [Ind. Eng. Chem. Res., 2005, 44:4453-4464]), which may be regarded as a modified van der Waals-Berthelot mixing formula.

$$a(T) = \sum_{i,j=1}^{N} \sqrt{a_i a_j}\,(1 - f(T)k_{ij})x_i x_j, \quad (7)$$

$$a_i = 0.427480 \frac{R^2 T_{ci}^2}{P_{ci}} \alpha_i(T)$$

$$f(T) = 1 + \tau_{ij}/T, \quad (8)$$

where $\tau_{ij} = \tau_{ji}$, and $\tau_{ii} = 0$ $$b = \frac{1}{2}\sum_{i,j=1}^{N}(b_i + b_j)(1 - m_{ij})x_i x_j, \quad (9)$$

$$b_i = 0.08664 \frac{RT_{ci}}{P_{ci}}, \text{ where } m_{ij} = m_{ji}, m_{ii} = 0$$

$T_{ci}$: critical temperature of i-th species.
$P_{ci}$: critical pressure of i-th species.
$x_i$: mole fraction of i-th species.

In the present model, there are four binary interaction parameters: $l_{ij}$, $l_{ji}$, $m_{ij}$, and $\tau_{ij}$ for each binary pair. It should be noted that when $l_{ij}=l_{ji}$ in eq 5 and $\tau_{ij}=0$ in eq 8, eq 7 becomes the ordinary quadratic-mixing rule for the a parameter. The present EOS model has been successfully applied for highly non-symmetric (with respect to polarity and size) mixtures such as various refrigerant/oil mixtures (Yokozeki, A. [Intl. J. Thermophys., 2001, 22:1057-1071]) and ammonia/butane mixtures (Yokozeki, A. [Refrigerants of ammonia and n-butane mixtures, Proc. Intl. Congress of Refrigeration, Washington, D.C.]; Equilibrium™, 2004, 3:20-24).

For phase equilibrium (solubility) calculations, the fugacity coefficient $\phi_i$ for each compound is needed and derived for the present mixing rule:

$$\ln\phi_i = -\ln\frac{PV}{RT}\left(1 - \frac{b}{V}\right) + \frac{b'_i}{V - b} - \quad (10)$$
$$\frac{ab'_i}{bRT(V+b)} + \frac{a}{bRT}\left(\frac{a'_i}{a} - \frac{b'_i}{b} + 1\right)\ln\frac{V}{V+b},$$

where (11)

$b'_i$ and $a'_i$ are given by:

$$b'_i = \sum_{j=1}^{N}(b_i + b_j)(1 - m_{ij})x_j - b$$

$$a'_i = 2\sum_{j=1}^{N} \sqrt{a_i a_j}\, x_j\left\{1 - k_{ij} - \frac{x_i x_j(l_{ji} - l_{ij})(1 + \tau_{ij}/T)}{(l_{ji}x_i + l_{ij}x_j)^2}\right\}. \quad (12)$$

A thermodynamically derived function relevant to the present study is an enthalpy (H), which is given, in a general form:

$$H = \int \sum_{i=1}^{N} C_{pi}^0 x_i dT + \left(\frac{a}{b} - \frac{T}{b}\frac{da}{dT}\right)\ln\frac{V}{V+b} + RT\left(\frac{PV}{RT} - 1\right) - \quad (13)$$
$$\frac{RT^2}{V-b}\frac{db}{dT} + \frac{a}{b}\frac{db}{dT}\left[\frac{1}{V+b} - \frac{1}{b}\ln\left(1 + \frac{b}{V}\right)\right] + C,$$

where C is an arbitrary constant, which can be any value of our choice but must be the same constant for any component mixtures within the system in question. The ideal-gas heat capacity for each compound $C_{pi}^{\circ}$ in eq 13 is modeled with a polynomial form:

$$C_p^0 = C_0 + C_1 T + C_2 T^2 + C_3 T^3. \quad (14)$$

A schematic diagram for the equipment in a simple absorption refrigeration cycle system suitable for use herein is shown in FIG. 1. The system is composed of a condenser unit and an evaporator unit with an expansion valve similar to an ordinary vapor compression cycle, but the compressor unit is here replaced by an absorber-generator solution circuit, which has a vapor absorber, a gas generator, a heat exchanger, a pressure control (reducing) valve and a solution liquid pump.

Theoretical cycle performances for the absorption refrigeration cycle shown in FIG. 1 are modeled as follows. The overall energy balance gives:

$$Q_g + Q_e + W_p = Q_c + Q_a \quad (15)$$

From the material balance in the absorber or generator, we have:

$$m_r x_a = (m_s - m_r)x_g, \quad (16)$$

and this provides a mass-flow-rate ratio, f, as defined by:

$$f \equiv \frac{m_s}{m_r} = \frac{x_g}{x_g - x_a}, \quad (17)$$

where x is a mass fraction of an absorbent in solution, the subscripts a and g stand for the absorber and generator solutions, and $m_r$ and $m_s$ are mass flow rates of gaseous refrigerant and absorber-exit solution (or solution pumping rate), respectively. This flow-rate ratio f is an important parameter to characterize the system performance.

When we assume a heat transfer efficiency of unity in the heat exchanger unit, the energy balance equation becomes:

$$Q_h \equiv (H_2-H_3)(m_s-m_r) = (H_1-H_4)m_s - W_p, \quad (18)$$

where H is an enthalpy, the subscript numbers (1, 2, 3, and 4) correspond to the locations shown in FIG. 1. From eq 18, the generator-inlet enthalpy, $H_1$, can be obtained:

$$H_1 = H_4 + (H_2-H_3)(1-1/f) + W_p/m_r. \quad (19)$$

From the energy balance around the generator, the generator heat input, $Q_g$, is given by, $$Q_g = H_5 m_r + H_2(m_s-m_r) - H_1 m_s. \quad (20)$$

By eliminating $H_1$ from this equation with eq 19, eq 20 can be written as:

$$Q_g/m_r = H_5 - H_4 f + H_3(f-1) - W_p/m_r. \quad (21)$$

Similarly, the heat rejection in the absorber, $Q_a$, is given by, $$Q_a/m_r = H_3(f-1) + H_7 - H_4 f. \quad (22)$$

Condenser and evaporator heats per unit mass flow, respectively, are:

$$Q_c/m_r = H_5 - H_6 \quad (23)$$

$$Q_e/m_r = H_7 - H_6. \quad (24)$$

Then, the system performance is defined by a heat ratio, $\eta$, (output power divided by input power):

$$\eta = \frac{Q_e}{Q_g + W_P}.$$

However, the solution pumping power, $W_p$, is usually much smaller than $Q_g$, and it is customary to use a COP (coefficient of performance) defined as:

$$COP = \frac{Q_e}{Q_g}. \quad (25)$$

This can be expressed in terms of H and f:

$$COP = \frac{H_7 - H_6}{H_5 + H_3(f-1) - H_4 f}. \quad (26)$$

Enthalpies at all locations and solubility in the absorber and generator units are calculated in a thermodynamically consistent way by use of the present EOS model discussed above.

EOS parameters must be established. The pure component EOS constants for refrigerants in the present study are based on methods such as those described, for example, in Yokozeki, A. [Intl. J. Thermophys., 2001, 22:1057-1071]; and Yokozeki, A. [Refrigerants of ammonia and n-butane mixtures, Proc. Intl. Congress of Refrigeration, Washington, D.C.]; Equilibrium™, 2004, 3:20-24, and are listed in Example 1, Table 1. For selected absorbents, the critical parameters have been estimated from group contribution methods such as those described, for example, in Reid, R. C., et al [The Properties of Gases & Liquids, 4$^{th}$ Ed., 1987, McGraw-Hill, New York], and are also shown in Example 1, Table 1. The accuracy in critical parameters for these high boiling-point materials is of less importance for correlating solubility data (Yokozeki, A. [Intl. J. Thermophys., 2001, 22:1057-1071]). However, the $\beta_1$ parameter in eq 6, as mentioned earlier, is of greater importance, and will be treated as an adjustable parameter in the analysis of binary solubility data.

In order to calculate thermal properties with EOS, the ideal gas heat capacity for each pure compound is needed as a function of temperature: see eq 14. The coefficients for eq 14 are listed in Example 1, Table 2, where those for absorbents have been all estimated from group contribution methods (Reid, R. C., et al [The Properties of Gases & Liquids, 4$^{th}$ Ed., 1987, McGraw-Hill, New York]).

Solubility (VLE: vapor-liquid equilibrium) data of fluorocarbon/ionic liquid binary mixtures is analyzed next in order to determine the EOS parameters for mixtures. The four binary interaction parameters, $l_{ij}$, $l_{ji}$, $m_{ij}$, and $\tau_{ij}$, and the absorbent $\beta_1$ parameter for each binary pair have been determined by non-linear least squares analyses with an object function of relative pressure differences. The results for selected binary mixtures are shown in Example 1, Table 3.

Using the EOS parameters for the present refrigerant/absorbent pairs, any thermodynamic properties for these mixtures can be calculated in a thermodynamically consistent way.

The performance of an absorption refrigeration cycle may be based on a simple, typical cycle as shown in FIG. 1, and the present theoretical model. Here, the pumping power $W_p$ is neglected, since it is usually insignificant with respect to other thermal powers. In addition, several assumptions are made, which are not explicitly stated:

(1) There is no pressure drop in connecting lines.
(2) The refrigerant expansion process from the condenser to the evaporator is iso-enthalpic, as usually done in vapor compression cycle calculations. The condition at Point 7 in FIG. 1 (exit of evaporator) is a pure refrigerant dew point with $T=T_{eva}$.
(3) The condition at Point 6 is a refrigerant bubble point and there is no subcooled liquid. The condition at Point 5 (inlet to condenser) is a superheated state of a pure refrigerant with $P=P_{con}$ and $T=T_g$.
(4) Pressures in the condenser and the generator ($P_{con}$ and $P_g$) are the same, and similarly evaporator and absorber pressures ($P_{eva}$ and $P_a$) are equal.
(5) The condition at Point 3 (solution inlet to the absorber) is a solution's bubble point specified with the absorber pressure ($P_a$) and a solution concentration of the generator ($x_g$).
(6) Temperatures in the generator ($T_g$), absorber ($T_a$), condenser ($T_{con}$), and evaporator ($T_{eva}$) are specified as a given cycle condition.
(7) The refrigerant gas flow rate ($m_r$) is set to be 1 kg·s$^{-1}$, without loss of generality, and the insignificant absorbent vapor is neglected.

The first step of cycle calculations is to obtain $P_{eva}$ and $P_{con}$ as saturated vapor pressures of a pure refrigerant at given temperatures using methods such as a Bubble-Point P routine as described, for example, in Ness, H. C. V. and Abbott, M. M. [Classical Thermodynamics of Nonelectrolyte Solutions with Applications to Phase Equilibria, 1982, McGraw-Hill, New York]. Then, using methods such as a TP (Temperature-Pressure) Flash routine as described, for example, in Ness, H. C. V. and Abbott, M. M., supra) absorbent compositions, $x_g$ and $x_a$, in the generator and absorber units are calculated. This provides f (flow rate ratio) in eq 17. The thermodynamic properties at Point 3 are determined from the assumption (5) using methods such as a Bubble-Point T routine as described, for example, in Ness, H. C. V. and Abbott, M. M., supra. The enthalpy at Point 1 is obtained from eq 19. Enthalpies at all other points are calculated with known T, P, and compositions. Thus, the necessary quantities for the performance evaluation can be obtained using the listed equations. Cycle performances for the present binary systems are summarized in Example 1, Table 4 with selected thermodynamic quantities, where the specified temperatures for the cycle condition are: $T_g/T_{con}/T_d/T_{eva}$=100/40/30/10° C., and $m_r$=1 kg·s$^{-1}$.

The well-known refrigerant-absorbent pairs, $NH_3/H_2O$ and $H_2O/LiBr$, have also been calculated and are shown in Example 1, Table 4 for comparison. In the case of $NH_3/H_2O$, the absorbent $H_2O$ has a non-negligible vapor pressure at the generator exit, and in practical applications a rectifier (distillation) unit is required in order to separate the refrigerant from absorbent water. In the present study, we have neglected such an effect and an extra power requirement. Thus, the calculated COP is over estimated for the present performance comparison. For $H_2O/LiBr$, we have not developed the EOS model. Instead, we have employed empirical correlation diagrams for the thermodynamic properties (see, for example, Stoecker, W. F. and Jones, J. W. [Refrigeration and Air Conditioning, 1982, McGraw-Hill, New York, pages 328-350]): temperature-pressure-concentration diagram and enthalpy-temperature diagram.

Although cycle calculations for an absorption refrigeration cycle may be obtained in a manner that is relatively simple and straightforward, particularly by the use of the present EOS, understanding the results requires a different approach from that used in the case of an ordinary vapor compression cycle. In the latter case, a high pressure/temperature refrigerant gas is produced by a vapor compressor, where the thermodynamic process is theoretically a single isentropic step: inlet and exit enthalpies of the compressor are sufficient for describing the compressor work. In the absorption cycle, however, the process generating the corresponding high pressure/temperature gas is complicated by the fact that enthalpies at several different locations as well as refrigerant-absorbent solubility differences at the absorber and generator units (related to the f value) must be known, as seen in eqs. 17, 21 and 22.

The condenser and evaporator performance is the same for both cycles at given temperatures, and may be understood based on the latent heat of vaporization (or condensation). In general, the refrigerating effect is the latent heat at the evaporator, which increases with an increase in the temperature difference between $T_c$ and $T_{eva}$. Thus, at a given $T_{eva}$, the latent heat is larger for a refrigerant with a higher $T_c$. In addition, the molar latent heat (J/mol) is generally not so much different among refrigerants at their boiling point (or far away from $T_c$), while the specific latent heat (J/kg) can be significantly different due to a large difference in molar masses. These factors can explain large differences in the calculated refrigerating power $Q_e$ among refrigerants in Example 1, Table 4.

A useful absorbent is, in general, a compound that has high solubility for a refrigerant and also a very high boiling point relative to the refrigerant. As an example, the systems used herein include HFC-32+[bmim][PF$_6$], HFC-32+[bmim][BF$_4$], HFC-134+[bmim][PF$_6$], HFC-134a+[bmim][PF$_6$], HFC-152a+[bmim][PF$_6$] and HFC-125+[bmim][PF$_6$], which have COP/f values of 0.385/7.35, 0.330/6.41, 0.348/4.38, 0.254/10.66, 0.300/13.27, and 0.128/16.49, respectively (see Example 1, Table 4). The solubility curves for these refrigerant pairs are shown in FIGS. 2 to 8 at constant T of 10, 25, 50, and 75° C. Indeed, the good solubility at the absorbent-rich side, which is indicative of concave-upward or near linear vapor pressures, corresponds to good performance.

Based on COP/f, the refrigerant+ionic liquid pairs can be ranked in order of preference for replacing $H_2O/LiBr$ and $NH_3/H_2O$. Ideally the COP is high and f factor is low. Based on this criteria, the most preferred candidates are HFC-32+[bmim][PF$_6$], HFC-32+[bmim][BF$_4$], HFC-32+[emim][BEI], HFC-32+[pmpy][BMeI], HFC-32+[dmpim][TMeM], HFC-32+[emim][BMeI], HFC-134+[bmim][PF$_6$]. HFC-32 and HFC-134 are the preferred refrigerants to combine with fluorinated ionic liquids.

HFCs in general are preferred as the refrigerants for use herein because they have no ozone depletion potential and low global warming potential. In particular, CFCs and HCFCs can deplete the ozone, and FCs have higher global warming potential. Among the HFCs, 134, 134a and 125 are all non-flammable, and those HFCs that are flammable (32, 143a, 152a and 161) can be mixed with nonflammable HFCs to make a nonflammable mixture. As noted above, among the HFCs, 32 and 134 will be most preferred because they have the highest COP based on Table 4, and 134 will be most preferred because it is also non-flammable.

The compositions of this invention comprise refrigerant pairs that may include at least one refrigerant selected from the group consisting of hydrofluorocarbon, hydrochlorofluorocarbon, chlorofluorocarbon, fluorocarbon, $NH_3$, $CO_2$, $N_2$, $O_2$, $H_2$, Ar, $H_2O$, and non-fluorinated hydrocarbon selected from the group consisting of $C_1$ to $C_4$ straight-chain, branched or cyclic alkanes and $C_1$ to $C_4$ straight-chain, branched or cyclic alkenes; and at least one ionic liquid. The ionic liquid may comprise a cation selected from the group consisting of pyridinium, pyridazinium, pyrimidinium, pyrazinium, imidazolium, pyrazolium, thiazolium, oxazolium and triazolium, and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, and any fluorinated anion. The cation and/or the anion may be fluorinated. Fluorinated anions may be selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, [CF$_3$CO$_2$]$^-$, and F$^-$.

The compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, Ar, $H_2O$, methane, ethane, propane, cyclopropane, propylene, butane, isobutane, isobutene and at least one ionic liquid. In another embodiment, the compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, Ar, $H_2O$, methane, ethane, propane, cyclopropane, propylene, butane, isobutane, and at least one ionic liquid having at least one fluorine. In still another embodiment, the compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, Ar, $H_2O$, methane, ethane, propane, cyclopropane, propylene, butane, isobutane, and at least one ionic liquid having a cation selected from the group consisting of pyridinium, pyridazinium, pyrimidinium, pyrazinium, imidazolium, pyrazolium, thiazolium, oxazolium and triazolium as defined above.

In still another embodiment, the compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, $H_2O$, Ar, methane, ethane, propane, cyclopropane, propylene, butane, isobutane, and at least one ionic liquid having a cation selected from the group consisting of pyridinium, pyridazinium, pyrimidinium, pyrazinium, imidazolium, pyrazolium, thiazolium, oxazolium and triazolium as defined above, wherein at least one of $R_1$, $R_2$, $R_3$, $R_4$, $R_5$, and $R_6$ comprises F$^-$. Anions of the ionic liquid may be selected from the group consisting of [CH$_3$CO$_2$]$^-$, [HSO$_4$]$^-$,

[CH$_3$OSO$_3$]$^-$, [CF$_3$SO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [CuCl$_2$]$^-$, Cl$^-$, Br$^-$, I$^-$, and any fluorinated anion. In still another embodiment, the compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, isobutane, and at least one ionic liquid having a fluorinated anion. The fluorinated anion may be selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, [CF$_3$CO$_2$]$^-$, and F$^-$.

The compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, isobutane, and at least one ionic liquid having an imidazolium cation or a fluorinated imidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, and [CF$_3$CO$_2$]$^-$.

The compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, isobutane and at least one ionic liquid having a 1-butyl-3-methylimidazolium cation or a fluorinated 1-butyl-3-methylimidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, and [CF$_3$CO$_2$]$^-$. The compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, isobutane, and at least one ionic liquid having a 1-propyl-2,3-dimethylimidazolium cation or a fluorinated 1-propyl-2,3-dimethylimidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, and [CF$_3$CO$_2$]$^-$. The compositions of this invention comprise refrigerant pairs that may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, isobutane and at least one ionic liquid having a 1,3-dioctylimidazolium or 1-octyl-3-methylimidazolium cation or a fluorinated 1,3-dioctylimidazolium or 1-octyl-3-methylimidazolium cation and an anion selected from the group consisting of [I]$^-$.

This invention also provides a process for cooling an object or a space by (a) absorbing, with an ionic liquid, the vapor of a refrigerant selected from the group consisting of a hydrofluorocarbon, a hydrochlorofluorocarbon, a chlorofluorocarbon, a fluorocarbon, N2, O2, CO2, NH3, Ar, H2, H2O, and a non-fluorinated hydrocarbon to form a mixture of both constituents, wherein the non-fluorinated hydrocarbon is selected from the group consisting of C1 to C4 straight-chain, branched or cyclic alkanes and C1 to C4 straight-chain, branched or cyclic alkenes; (b) heating the mixture to separate refrigerant, in vapor form, from the ionic liquid; (c) condensing the refrigerant vapor under pressure to a liquid; (d) reducing the pressure of the liquid refrigerant, and evaporating the refrigerant to form refrigerant vapor, in proximity to the object or space to be cooled; and (e) re-absorbing the refrigerant vapor with an ionic liquid.

This invention also provides a process for heating an object or a space by (a) absorbing, with an ionic liquid, the vapor of a refrigerant selected from the group consisting of a hydrofluorocarbon, a hydrochlorofluorocarbon, a chlorofluorocarbon, a fluorocarbon, N2, O2, CO2, NH3, Ar, H2, H2O, and a non-fluorinated hydrocarbon to form a mixture of both constituents, wherein the non-fluorinated hydrocarbon is selected from the group consisting of C1 to C4 straight-chain, branched or cyclic alkanes and C1 to C4 straight-chain, branched or cyclic alkenes; (b) heating the mixture to separate refrigerant, in vapor form, from the ionic liquid; (c) condensing the refrigerant vapor under pressure to a liquid in proximity to the object or space to be heated; (d) reducing the pressure of the liquid refrigerant, and evaporating refrigerant to form refrigerant vapor; and (e) re-absorbing the refrigerant vapor with an ionic liquid.

This invention also provides a process for cooling an object or a space in an apparatus that executes an absorption refrigeration cycle by (a) forming in an absorber a mixture of a refrigerant and an ionic liquid, where the refrigerant is selected from the group consisting of a hydrofluorocarbon, a hydrochlorofluorocarbon, a chlorofluorocarbon, a fluorocarbon, N2, O2, CO2, NH3, Ar, H2, H2O, and a non-fluorinated hydrocarbon to form a mixture of both constituents, wherein the non-fluorinated hydrocarbon is selected from the group consisting of C1 to C4 straight-chain, branched or cyclic alkanes and C1 to C4 straight-chain, branched or cyclic alkenes; (b) passing the mixture to a generator where the mixture is heated to separate refrigerant, in vapor form, from the ionic liquid; (c) passing the refrigerant vapor to a condenser where the vapor is condensed under pressure to a liquid; (d) passing the liquid refrigerant to an evaporator where the liquid is evaporated under reduced pressure, to form refrigerant vapor, in proximity to the object or space to be cooled; and (e) passing the refrigerant vapor to the absorber.

This invention also provides a process for heating an object or a space in an apparatus that executes an absorption refrigeration cycle by (a) forming in an absorber a mixture of a refrigerant and an ionic liquid, where the refrigerant is selected from the group consisting of a hydrofluorocarbon, a hydrochlorofluorocarbon, a chlorofluorocarbon, a fluorocarbon, N2, O2, CO2, NH3, Ar, H2, H2O, and a non-fluorinated hydrocarbon to form a mixture of both constituents, wherein the non-fluorinated hydrocarbon is selected from the group consisting of C1 to C4 straight-chain, branched or cyclic alkanes and C1 to C4 straight-chain, branched or cyclic alkenes; (b) passing the mixture to a generator where the mixture is heated to separate refrigerant, in vapor form, from the ionic liquid; (c) passing the refrigerant vapor to a condenser where the vapor is condensed under pressure to a liquid in proximity to the object or space to be heated; (d) passing the liquid refrigerant to an evaporator where the liquid is evaporated under reduced pressure, to form refrigerant vapor; and (e) passing the refrigerant vapor to the absorber.

In any process as described above, the ionic liquid separated from refrigerant in step (b) may be recirculated for use in step (e).

The present invention also provides an apparatus for adjusting temperature that executes an absorption cycle as described herein to cool or heat an object or space. The apparatus may include components such as an absorber-generator solution circuit, which replaces a compressor, where the circuit maybe composed of an absorber, a generator, a heat exchanger, a pressure control device and a pump for circulating the solution; and the apparatus also is composed of condenser and evaporator units with an expansion valve similar to equipment used in an ordinary vapor compression cycle. The apparatus hereof is capable of executing an absorption refrigeration cycle using any one or more of the refrigerants described herein and/or any one or more of the ionic liquids described herein. The apparatus hereof is capable of executing any one or more of the processes as described herein. An apparatus of this invention may be deployed for use in or as a refrigerator, an air conditioner, an ice machine, an industrial cooling system, a heater or heat pump.

The following examples are presented to illustrate the advantages of the present invention and to assist one of ordinary skill in making and using the same. These examples are not intended in any way to limit the scope of the disclosure or the appended claims.

General Methods and Materials

1-Butyl-3-methylimidazolium hexafluorophosphate ([bmim][PF$_6$], C$_8$H$_{15}$N$_2$F$_6$P, with a molecular weight of 284 g mol$^{-1}$, Lot and filling code, 1055432 31304010), 1-butyl-3-methylimidazolium tetrafluoroborate ([bmim][BF$_4$], C$_8$H$_{15}$N$_2$F$_4$B, with a molecular weight of 226 g mol$^{-1}$, Lot and Filling Code, 1080045 11304079), 1,2-dimethyl-3-propylimidazolium tris(trifluoromethylsulfonyl)methide ([dmpim][tTFMSmethide] or [dmpim][TMeM], C$_{12}$H$_{15}$N$_2$F$_9$O$_6$S$_3$, with a molecular weight of 550 g mol$^{-1}$, Lot code 439706), and 1,2-dimethyl-3-propylimidazolium bis(trifluoromethylsulfonyl)imide ([dmpim][bTFMSimide] or [dmpim][BMeI], C$_{10}$H$_{15}$N$_3$F$_6$O$_4$S$_2$, with a molecular weight of 419 g mol$^{-1}$, Lot code 439391), 3-methyl-1-propyl pyridinium bis(trifluoromethylsulfonyl)imide ([pmpy][BMeI] with a molecular weight of 416.4 g mol$^{-1}$), 1-ethyl-3-methylimidazolium bis(pentafluoroethylsulfonyl)imide ([emim][BEI] with a molecular weight of 491.32 g mol$^{-1}$), 1-ethyl-3-methylimidazolium bis(trifluoromethylsulfonyl)imide ([emim][BMeI] with a molecular weight of 391.31 g mol$^{-1}$), 1-ethyl-3-methylimidazolium hexafluorophosphate [emim][PF$_6$], 1-butyl-3-methylpyridinium bis(trifluoromethylsulfonyl)imide [bmpy][BMeI], 1-butyl-3-methylimidazolium acetate, 1-butyl-3-methylimidazolium methyl sulfonate and 1-butyl-3-methylimidazolium thiocyanate were each obtained from Fluka Chemika with a purity of >96 to 97% each.

Chlorodifluoromethane (HCFC-22, CHClF$_2$, with a molecular weight of 86.47 g mol$^{-1}$), difluoromethane (HFC-32, CH$_2$F$_2$, with a molecular weight of 52.02 g mol$^{-1}$), pentafluoroethane (HFC-125, C$_2$HF$_5$, with a molecular weight of 120.02 g mol$^{-1}$), 1,1,2,2-tetrafluoroethane (HFC-134, C$_2$H$_2$F$_4$, with a molecular weight of 102.03 g mol$^{-1}$), 1,1,1,2-tetrafluoroethane (HFC-134a, C$_2$H$_2$F$_4$, with a molecular weight of 102.03 g mol$^{-1}$), 1,1,1-trifluoroethane (HFC-143a, C$_2$H$_3$F$_3$, with a molecular weight of 82.04 g mol$^{-1}$), and 1,1-difluoroethane (HFC-152a, C$_2$H$_4$F$_2$, with a molecular weight of 66.05 g mol$^{-1}$), and HFC-134 were obtained from DuPont Fluorochemicals (Wilmington, Del.), with a minimum purity of 99.99%. A molecular sieve trap was installed to remove trace amounts of water from the gases and each of the ionic liquids tested were degassed prior to making solubility measurements.

Examples 2-6 and FIGS. 2-6 show solubility and diffusivity results for several hydrofluorocarbons (HFC-32, HFC-125, HFC-134a, HFC-143a, and HFC-152a) in one ionic liquid, [bmim][PF$_6$], at 10, 25, 50, and 75° C.

Figure 7:
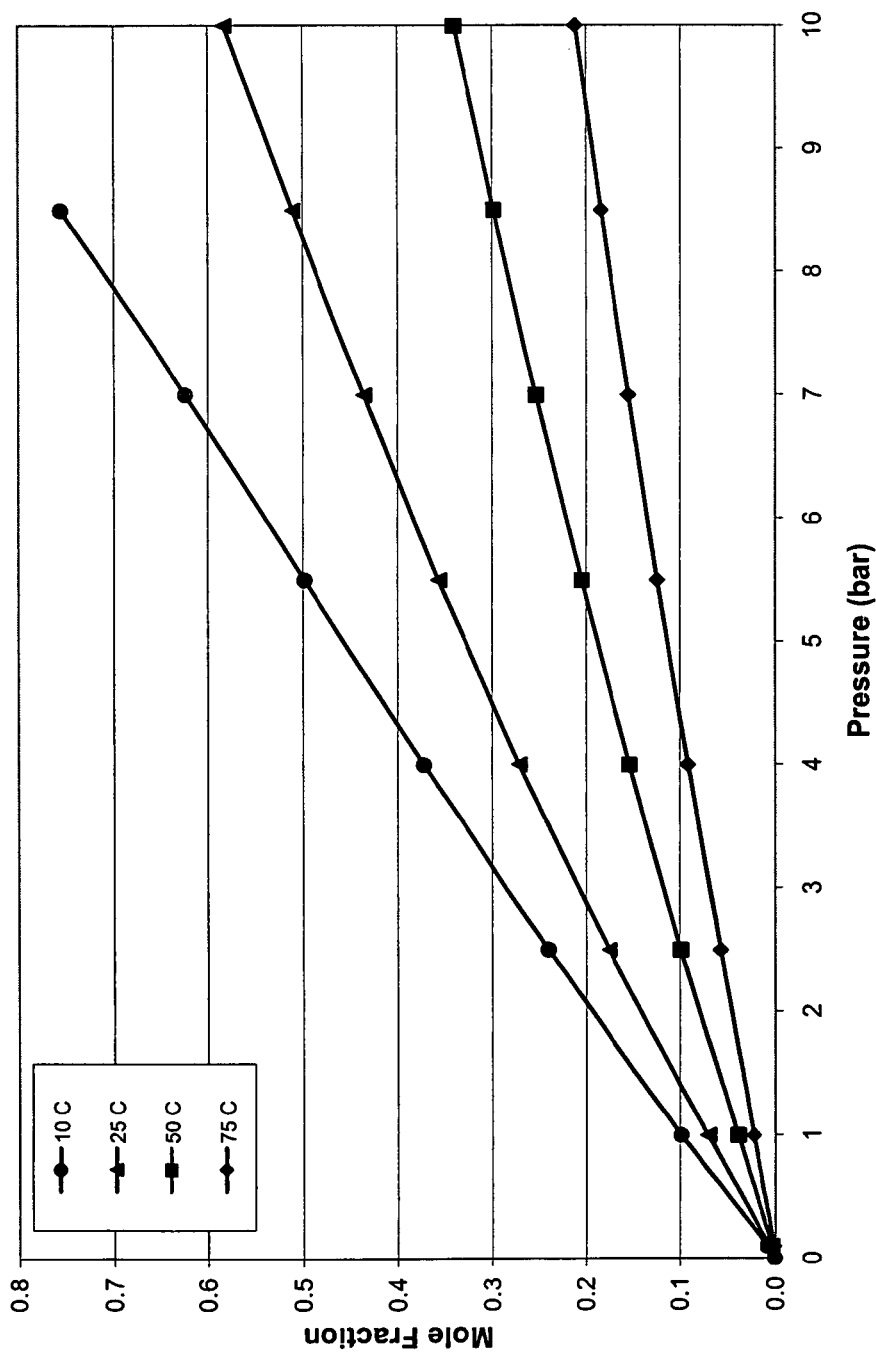
FIG. 7 shows measured isothermal solubility data (in mole fraction) of the system HFC-32+[bmim][BF$_4$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.

Examples 7-11 and FIG. 7 show solubility and diffusivity results for HFC-32 in several additional ionic liquids ([bmim][BF$_4$], [omim][I], [doim[I], [dmpim][tTFMSmethide], and [dmpim][bTFMSimide]).

Examples 12 and 13 provide a method for preparation of 1,3-dioctylimidazolium iodide [ooim][I] and a method for preparation of 1-methyl-3-dioctylimidazolium iodide [ooim][I].

Example 14 provides a description of the components in the gravimetric microbalance.

Examples 15-41 show solubility results for various refrigerants in ionic liquids.

The following nomenclature and abbreviations are used:
$a_i$=generic RK EOS parameter of the i-th species (m$^6$·MPa·mol$^{-2}$)
$b_i$=generic RK EOS parameter of i-th species (m$^3$·mol$^{-1}$)
C=concentration (mol·m$^{-3}$)
$C_b$=buoyancy force (N)
$C_f$=correction factor (kg)
$C_{pi}^0$=ideal gas heat capacity of i-th species (J·mol$^{-1}$·K$^{-1}$)
$C_0$=initial concentration (mol·m$^{-3}$)
$C_s$=saturation concentration (mol·m$^{-3}$)
<C>=space-averaged concentration (mol·m$^{-3}$)
COP=coefficient of performance
D=diffusion constant (m$^2$·s$^{-1}$)
g=gravitational acceleration (9.80665 m·s$^{-2}$)
f=mass flow rate ratio
f(T)=temperature dependent term of binary interaction parameter, 1+$\tau_{ij}$/T
$H_i$=enthalpy at point i (J·kg$^{-1}$)
$k_{ij}$, $k_{ji}$, $l_{ij}$, $l_{ji}$=binary interaction parameters
L=length (m)
$m_a$=mass absorbed (kg)
$m_i$=mass of i-th species on sample side of balance (kg)
$m_j$=mass of j-th species on counterweight side of balance (kg)
$m_{ij}$=binary interaction parameter
$m_s$=mass flow rate of solution (kg·sec$^{-1}$)
$m_r$=mass flow rate of refrigerant (kg·sec$^{-1}$)
$m_{IL}$=mass of ionic liquid sample (kg)
MW$_i$=molecular weight of i-th species (kg·mol$^{-1}$)
N=n-th number component
P=pressure (MPa)
$P_{ci}$=critical pressure of i-th species (MPa)
$P_0$=initial pressure (MPa)
$Q_i$=heat (kW)
R=gas constant (8.31434 m$^3$·Pa·mol$^{-1}$·K$^{-1}$)
t=time (s)
$T_{ci}$=critical temperature of i-th species (K)
$T_i$=temperature of i-th species (K)
$T_j$=temperature of j-th species (K)
$T_s$=temperature of sample (K)
$V_i$=volume of i-th species (m$^3$)
$V_{IL}$=volume of ionic liquid (m$^3$)
$V_m$=liquid sample volume (m$^3$)
$\tilde{V}_g$=molar volume of gas (m$^3$·mol$^{-1}$)
$\tilde{V}_i$=molar volume of i-th species (m$^3$·mol$^{-1}$)
$\tilde{V}_{IL}$=molar volume of ionic liquid (m$^3$·mol$^{-1}$)
$\tilde{V}_m$=molar volume of mixture (m$^3$·mol$^{-1}$)
$\tilde{V}_0$=initial molar volume (m$^3$·mol$^{-1}$)
$\Delta\tilde{V}$=change in molar volume (m$^3$·mol$^{-1}$)
$W_i$=work (kW)
$x_i$=mole fraction of i-th species
z=depth (m)
$\alpha$=EOS temperature dependence parameter
$\beta_k$=coefficient of temperature dependence parameter
$\alpha_n$=eigenvalue (m$^{-1}$)
$\rho_g$=density of gas (kg·m$^{-3}$)
$\rho_i$=density of i-th component on sample side of balance (kg·m$^{-3}$)
$\rho_j$=density of j-th component on counter weight side of balance (kg·m$^{-3}$)
$\rho_{air}$=density of air (kg·m$^{-3}$)
$\rho_s$=density of sample (kg·m$^{-3}$)
$\eta$=heat ratio, output power divided by input power
$\tau_{ij}$=binary interaction parameter (K) for temperature dependence term, f(T)

Units
Pa≡Pascal
MPa≡Mega Pascal
mol≡mole
m≡meter
cm≡centimeter kW=kilowatt
K=Kelvin
N=Newton
J=Joule
kJ=kilojoule
kg=kilogram
mg=milligram
μg=microgram
T=temperature
P=pressure
mbar=millibar
min=minute
° C.=degrees centigrade
sec=second In the following description, (A)-(D) provide syntheses for anions of ionic liquids that are useful for the invention, and (E)-(U) provide syntheses for ionic liquids useful for the invention.

Preparation of Anions Not Generally Available Commercially (A) Synthesis of potassium 1,1,2,2-tetrafluoroethanesulfonate (TFES-K) ([HCF$_2$CF$_2$SO$_3$]$^-$): (A) Synthesis of potassium 1,1,2,2-tetrafluoroethanesulfonate (TFES-K)

A 1-gallon Hastelloy® C276 reaction vessel was charged with a solution of potassium sulfite hydrate (176 g, 1.0 mol), potassium metabisulfite (610 g, 2.8 mol) and deionized water (2000 ml). The pH of this solution was 5.8. The vessel was cooled to 18 degrees C., evacuated to 0.10 MPa, and purged with nitrogen. The evacuate/purge cycle was repeated two more times. To the vessel was then added tetrafluoroethylene (TFE, 66 g), and it was heated to 100 degrees C. at which time the inside pressure was 1.14 MPa. The reaction temperature was increased to 125 degrees C. and kept there for 3 h. As the TFE pressure decreased due to the reaction, more TFE was added in small aliquots (20-30 g each) to maintain operating pressure roughly between 1.14 and 1.48 MPa. Once 500 g (5.0 mol) of TFE had been fed after the initial 66 g precharge, the vessel was vented and cooled to 25 degrees C. The pH of the clear light yellow reaction solution was 10-11. This solution was buffered to pH 7 through the addition of potassium metabisulfite (16 g).

The water was removed in vacuo on a rotary evaporator to produce a wet solid. The solid was then placed in a freeze dryer (Virtis Freezemobile 35xl; Gardiner, N.Y.) for 72 hr to reduce the water content to approximately 1.5 wt % (1387 g crude material). The theoretical mass of total solids was 1351 g. The mass balance was very close to ideal and the isolated solid had slightly higher mass due to moisture. This added freeze drying step had the advantage of producing a free-flowing white powder whereas treatment in a vacuum oven resulted in a soapy solid cake that was very difficult to remove and had to be chipped and broken out of the flask. The crude TFES-K can be further purified and isolated by extraction with reagent grade acetone, filtration, and drying.

$^{19}$F NMR (D$_2$O) δ −122.0 (dt, J$_{FH}$=6 Hz, J$_{FF}$=6 Hz, 2F); −136.1 (dt, J$_{FH}$=53 Hz, 2F).
$^1$H NMR (D$_2$O) δ 6.4 (tt, J$_{FH}$=53 Hz, J$_{FH}$=6 Hz, 1H).
% Water by Karl-Fisher titration: 580 ppm.
Analytical calculation for C$_2$HO$_3$F$_4$SK: C, 10.9: H, 0.5: N, 0.0 Experimental results: C, 11.1: H, 0.7: N, 0.2.
Mp (DSC): 242 degrees C.
TGA (air): 10% wt. loss @ 367 degrees C., 50% wt. loss @ 375 degrees C.
TGA (N$_2$): 10% wt. loss @ 363 degrees C., 50% wt. loss @ 375 degrees C.

(B) Synthesis of potassium-1,1,2-trifluoro-2-(perfluoroethoxy)ethanesulfonate (TPES-K)

A 1-gallon Hastelloy® C276 reaction vessel was charged with a solution of potassium sulfite hydrate (88 g, 0.56 mol), potassium metabisulfite (340 g, 1.53 mol) and deionized water (2000 ml). The vessel was cooled to 7 degrees C., evacuated to 0.05 MPa, and purged with nitrogen. The evacuate/purge cycle was repeated two more times. To the vessel was then added perfluoro(ethylvinyl ether) (PEVE, 600 g, 2.78 mol), and it was heated to 125 degrees C. at which time the inside pressure was 2.31 MPa. The reaction temperature was maintained at 125 degrees C. for 10 hr. The pressure dropped to 0.26 MPa at which point the vessel was vented and cooled to 25 degrees C. The crude reaction product was a white crystalline precipitate with a colorless aqueous layer (pH=7) above it.

The $^{19}$F NMR spectrum of the white solid showed pure desired product, while the spectrum of the aqueous layer showed a small but detectable amount of a fluorinated impurity. The desired isomer is less soluble in water so it precipitated in isomerically pure form. The product slurry was suction filtered through a fritted glass funnel, and the wet cake was dried in a vacuum oven (60 degrees C., 0.01 MPa) for 48 hr. The product was obtained as off-white crystals (904 g, 97% yield).

$^{19}$F NMR (D$_2$O) δ −86.5 (s, 3F); −89.2, −91.3 (subsplit ABq, J$_{FF}$=147 Hz, 2F); −119.3, −121.2 (subsplit ABq, J$_{FF}$=258 Hz, 2F); −144.3 (dm, J$_{FH}$=53 Hz, 1F).
$^1$H NMR (D$_2$O) δ 6.7 (dm, J$_{FH}$=53 Hz, 1H).
Mp (DSC) 263 degrees C.
Analytical calculation for C$_4$HO$_4$F$_8$SK: C, 14.3: H, 0.3 Experimental results: C, 14.1: H, 0.3.
TGA (air): 10% wt. loss @ 359 degrees C., 50% wt. loss @ 367 degrees C.
TGA (N$_2$): 10% wt. loss @ 362 degrees C., 50% wt. loss @ 374 degrees C.

(C) Synthesis of potassium-1,1,2-trifluoro-2-(trifluoromethoxy)ethanesulfonate (TTES-K)

A 1-gallon Hastelloy® C276 reaction vessel was charged with a solution of potassium sulfite hydrate (114 g, 0.72 mol), potassium metabisulfite (440 g, 1.98 mol) and deionized water (2000 ml). The pH of this solution was 5.8. The vessel was cooled to −35 degrees C., evacuated to 0.08 MPa, and purged with nitrogen. The evacuate/purge cycle was repeated two more times. To the vessel was then added perfluoro(methylvinyl ether) (PMVE, 600 g, 3.61 mol) and it was heated to 125 degrees C. at which time the inside pressure was 3.29 MPa. The reaction temperature was maintained at 125 degrees C. for 6 hr. The pressure dropped to 0.27 MPa at which point the vessel was vented and cooled to 25 degrees C. Once cooled, a white crystalline precipitate of the desired product formed leaving a colorless clear aqueous solution above it (pH=7).

The $^{19}$F NMR spectrum of the white solid showed pure desired product, while the spectrum of the aqueous layer showed a small but detectable amount of a fluorinated impurity. The solution was suction filtered through a fritted glass funnel for 6 hr to remove most of the water. The wet cake was then dried in a vacuum oven at 0.01 MPa and 50 degrees C. for 48 h. This gave 854 g (83% yield) of a white powder. The final product was isomerically pure (by $^{19}$F and $^1$H NMR) since the undesired isomer remained in the water during filtration.

$^{19}$F NMR (D$_2$O) δ −59.9 (d, J$_{FH}$=4 Hz, 3F); −119.6, −120.2 (subsplit ABq, J=260 Hz, 2F); −144.9 (dm, J$_{FH}$=53 Hz, 1F).
$^1$H NMR (D$_2$O) δ 6.6 (dm, J$_{FH}$=53 Hz, 1H).
% Water by Karl-Fisher titration: 71 ppm.
Analytical calculation for C$_3$HF$_6$SO$_4$K: C, 12.6: H, 0.4: N, 0.0 Experimental results: C, 12.6: H, 0.0: N, 0.1.
Mp (DSC) 257 degrees C.
TGA (air): 10% wt. loss @ 343 degrees C., 50% wt. loss @ 358 degrees C.
TGA (N$_2$): 10% wt. loss @ 341 degrees C., 50% wt. loss @ 357 degrees C.

(D) Synthesis of sodium 1,1,2,3,3,3-hexafluoropropanesulfonate (HFPS-Na)

A 1-gallon Hastelloy® C reaction vessel was charged with a solution of anhydrous sodium sulfite (25 g, 0.20 mol), sodium bisulfite 73 g, (0.70 mol) and of deionized water (400 ml). The pH of this solution was 5.7. The vessel was cooled to 4 degrees C., evacuated to 0.08 MPa, and then charged with hexafluoropropene (HFP, 120 g, 0.8 mol, 0.43 MPa). The vessel was heated with agitation to 120 degrees C. and kept there for 3 hr. The pressure rose to a maximum of 1.83 MPa and then dropped down to 0.27 MPa within 30 minutes. At the end, the vessel was cooled and the remaining HFP was vented, and the reactor was purged with nitrogen. The final solution had a pH of 7.3.

The water was removed in vacuo on a rotary evaporator to produce a wet solid. The solid was then placed in a vacuum oven (0.02 MPa, 140 degrees C., 48 hr) to produce 219 g of white solid, which contained approximately 1 wt % water. The theoretical mass of total solids was 217 g. The crude HFPS-Na can be further purified and isolated by extraction with reagent grade acetone, filtration, and drying.

$^{19}$F NMR (D$_2$O) δ −74.5 (m, 3F); −113.1, −120.4 (ABq, J=264 Hz, 2F); −211.6 (dm, 1F).
$^1$H NMR (D$_2$O) δ 5.8 (dm, J$_{FH}$=43 Hz, 1H).
Mp (DSC) 126 degrees C.
TGA (air): 10% wt. loss @ 326 degrees C., 50% wt. loss @ 446 degrees C.
TGA (N$_2$): 10% wt. loss @ 322 degrees C., 50% wt. loss @ 449 degrees C.

Preparation of Ionic Liquids

E) Synthesis of 1-butyl-2,3-dimethylimidazolium 1,1,2,2-tetrafluoroethanesulfonate 1-Butyl-2,3-dimethylimidazolium chloride (22.8 g, 0.121 moles) was mixed with reagent-grade acetone (250 ml) in a large round-bottomed flask and stirred vigorously. Potassium 1,1,2,2-tetrafluoroethanesulfonate (TFES-K, 26.6 g, 0.121 moles), was added to reagent grade acetone (250 ml) in a separate round-bottomed flask, and this solution was carefully added to the 1-butyl-2,3-dimethylimidazolium chloride solution. The large flask was lowered into an oil bath and heated at 60 degrees C. under reflux for 10 hours. The reaction mixture was then filtered using a large frit glass funnel to remove the white KCl precipitate formed, and the filtrate was placed on a rotary evaporator for 4 hours to remove the acetone.

The reaction scheme is shown below:

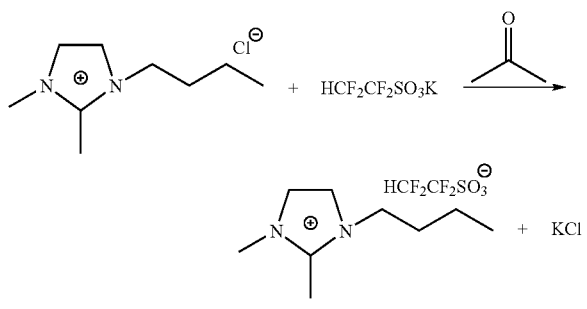

F) Synthesis of 1-butyl-methylimidazolium 1,1,2,2-tetrafluoroethanesulfonate 1-Butyl-3-methylimidazolium chloride (60.0 g) and high purity dry acetone (>99.5%, Aldrich, 300 ml) were combined in a 1 l flask and warmed to reflux with magnetic stirring until the solid completely dissolved. At room temperature in a separate 1 l flask, potassium-1,1,2,2-tetrafluoroethanesulfonte (TFES-K, 75.6 g) was dissolved in high purity dry acetone (500 ml). These two solutions were combined at room temperature and allowed to stir magnetically for 2 hr under positive nitrogen pressure. The stirring was stopped and the KCl precipitate was allowed to settle, then removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was again suction filtered and the acetone removed in vacuo to give a colorless oil. This was further dried at 4 Pa and 25 degrees C. for 6 hr to provide 83.6 g of product.

$^{19}$F NMR (DMSO-d$_6$) δ −124.7. (dt, J=6 Hz, J=8 Hz, 2F); −136.8 (dt, J=53 Hz, 2F).
$^1$H NMR (DMSO-d$_6$) δ 0.9 (t, J=7.4 Hz, 3H); 1.3 (m, 2H); 1.8 (m, 2H); 3.9 (s, 3H); 4.2 (t, J=7 Hz, 2H); 6.3 (dt, J=53 Hz, J=6 Hz, 1H); 7.4 (s, 1H); 7.5 (s, 1H); 8.7 (s, 1H).
% Water by Karl-Fisher titration: 0.14%.
Analytical calculation for C$_9$H$_{12}$F$_6$N$_2$O$_3$S: C, 37.6: H, 4.7: N, 8.8. Experimental Results: C, 37.6: H, 4.6: N, 8.7.
TGA (air): 10% wt. loss @ 380 degrees C., 50% wt. loss @ 420 degrees C.
TGA (N$_2$): 10% wt. loss @ 375 degrees C., 50% wt. loss @ 422 degrees C.

G) Synthesis of 1-ethyl-3-methylimidazolium 1,1,2,2-tetrafluoroethane sulfonate To a 500 ml round bottom flask was added 1-ethyl-3methylimidazolium chloride (Emim-Cl, 98%, 61.0 g) and reagent grade acetone (500 ml). The mixture was gently warmed (50 degrees C.) until almost all of the Emim-Cl dissolved. To a separate 500 ml flask was added potassium 1,1,2,2-tetrafluoroethanesulfonate (TFES-K, 90.2 g) along with reagent grade acetone (350 ml). This second mixture was stirred magnetically at 24 degrees C. until all of the TFES-K dissolved. These solutions were combined in a 1 l flask producing a milky white suspension. The mixture was stirred at 24 degrees C. for 24 hrs. The KCl precipitate was then allowed to settle leaving a clear green solution above it. The reaction mixture was filtered once through a celite/acetone pad and again through a fritted glass funnel to remove the KCl. The acetone was removed in vacuo first on a rotovap and then on a high vacuum line (4 Pa, 25 degrees C.) for 2 hr. The product was a viscous light yellow oil (76.0 g, 64% yield).

The reaction scheme is shown below:

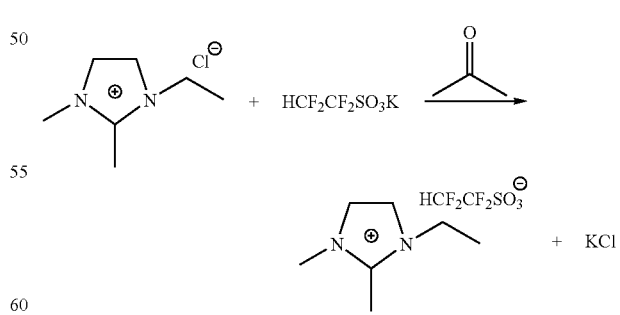

$^{19}$F NMR (DMSO-d$_6$) δ −124.7. (dt, J$_{FH}$=6 Hz, J$_{FF}$=6 Hz, 2F); −138.4 (dt, J$_{FH}$=53 Hz, 2F).
$^1$H NMR (DMSO-d$_6$) δ 1.3 (t, J=7.3 Hz, 3H); 3.7 (s, 3H); 4.0 (q, J=7.3 Hz, 2H); 6.1 (tt, J$_{FH}$=53 Hz, J$_{FH}$=6 Hz, 1H); 7.2 (s, 1H); 7.3 (s, 1H); 8.5 (s, 1H).
% Water by Karl-Fisher titration: 0.18%.

Analytical calculation for $C_8H_{12}N_2O_3F_4S$: C, 32.9: H, 4.1: N, 9.6 Found: C, 33.3: H, 3.7: N, 9.6.

Mp 45-46 degrees C.

TGA (air): 10% wt. loss @ 379 degrees C., 50% wt. loss @ 420 degrees C.

TGA ($N_2$): 10% wt. loss @ 378 degrees C., 50% wt. loss @ 418 degrees C.

H) Synthesis of 1-ethyl-3-methylimidazolium 1,1,2,3,3,3-hexafluoropropanesulfonate To a 1 l round bottom flask was added 1-ethyl-3-methylimidazolium chloride (Emim-Cl, 98%, 50.5 g) and reagent grade acetone (400 ml). The mixture was gently warmed (50 degrees C.) until almost all of the Emim-Cl dissolved. To a separate 500 ml flask was added potassium 1,1,2,3,3,3-hexafluoropropanesulfonate (HFPS-K, 92.2 g) along with reagent grade acetone (300 ml). This second mixture was stirred magnetically at room temperature until all of the HFPS-K dissolved.

These solutions were combined and stirred under positive $N_2$ pressure at 26 degrees C. for 12 hr producing a milky white suspension. The KCl precipitate was allowed to settle overnight leaving a clear yellow solution above it. The reaction mixture was filtered once through a celite/acetone pad and again through a fritted glass funnel. The acetone was removed in vacuo first on a rotovap and then on a high vacuum line (4 Pa, 25 degrees C.) for 2 hr. The product was a viscious light yellow oil (103.8 g, 89% yield).

The reaction scheme is shown below:

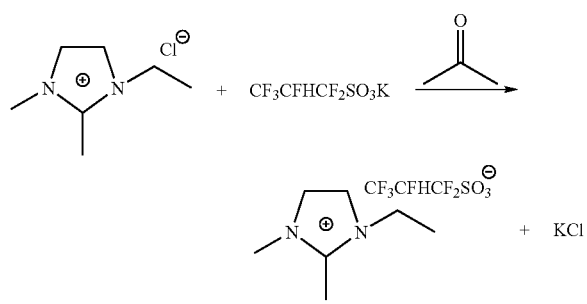

$^{19}$F NMR (DMSO-$d_6$) δ −73.8 (s, 3F); −114.5, −121.0 (ABq, J=258 Hz, 2F); −210.6 (m, 1F, $J_{HF}$=41.5 Hz).

$^1$H NMR (DMSO-$d_6$) δ 1.4 (t, J=7.3 Hz, 3H); 3.9 (s, 3H); 4.2 (q, J=7.3 Hz, 2H,); 5.8 (m, $J_{HF}$=41.5 Hz, 1H,); 7.7 (s, 1H); 7.8 (s, 1H); 9.1 (s, 1H).

% Water by Karl-Fisher titration: 0.12%.

Analytical calculation for $C_9H_{12}N_2O_3F_6S$: C, 31.5: H, 3.5: N, 8.2. Experimental Results: C, 30.9: H, 3.3: N, 7.8.

TGA (air): 10% wt. loss @ 342 degrees C., 50% wt. loss @ 373 degrees C.

TGA ($N_2$): 10% wt. loss @ 341 degrees C., 50% wt. loss @ 374 degrees C.

I) Synthesis of 1-hexyl-3-methylimidazolium 1,1,2,2-tetrafluoroethanesulfonate 1-Hexyl-3-methylimidazolium chloride (10 g, 0.0493 moles) was mixed with reagent-grade acetone (100 ml) in a large round-bottomed flask and stirred vigorously under a nitrogen blanket. Potassium 1,1,2,2-tetrafluoroethane sulfonate (TFES-K, 10 g, 0.0455 moles) was added to reagent grade acetone (100 ml) in a separate round-bottomed flask, and this solution was carefully added to the 1-hexyl-3-methylimidazolium chloride/acetone mixture. The mixture was left to stir overnight. The reaction mixture was then filtered using a large frit glass funnel to remove the white KCl precipitate formed, and the filtrate was placed on a rotary evaporator for 4 hours to remove the acetone.

The reaction scheme is shown below:

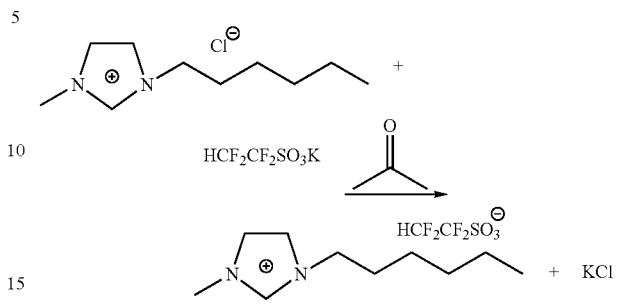

J) Synthesis of 1-dodecyl-3-methylimidazolium 1,1,2,2-tetrafluoroethanesulfonate 1-Dodecyl-3-methylimidazolium chloride (34.16 g, 0.119 moles) was partially dissolved in reagent-grade acetone (400 ml) in a large round-bottomed flask and stirred vigorously. Potassium 1,1,2,2-tetrafluoroethanesulfonate (TFES-K, 26.24 g, 0.119 moles) was added to reagent grade acetone (400 ml) in a separate round-bottomed flask, and this solution was carefully added to the 1-dodecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

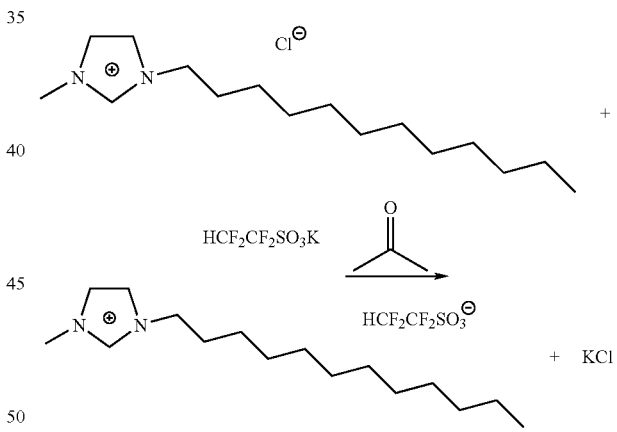

K) Synthesis of 1-hexadecyl-3-methylimidazolium 1,1,2,2-tetrafluoroethanesulfonate 1-Hexadecyl-3-methylimidazolium chloride (17.0 g, 0.0496 moles) was partially dissolved in reagent-grade acetone (100 ml) in a large round-bottomed flask and stirred vigorously. Potassium 1,1,2,2-tetrafluoroethanesulfonate (TFES-K, 10.9 g, 0.0495 moles) was added to reagent grade acetone (100 ml) in a separate round-bottomed flask, and this solution was carefully added to the 1-hexadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

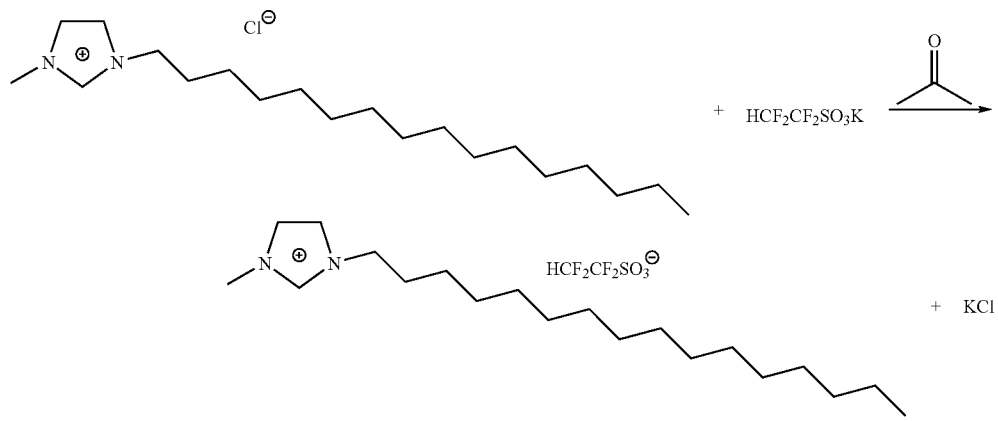

L) Synthesis of 1-octadecyl-3-methylimidazolium 1,1,2,2-tetrafluoroethaneulfonate 1-Octadecyl-3-methylimidazolium chloride (17.0 g, 0.0458 moles) was partially dissolved in reagent-grade acetone (200 ml) in a large round-bottomed flask and stirred vigorously. Potassium 1,1,2,2-tetrafluoroethanesulfonate (TFES-K, 10.1 g, 0.0459 moles), was added to reagent grade acetone (200 ml) in a separate round-bottomed flask, and this solution was carefully added to the 1-octadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

was about 0.72 MPa. As the TFE pressure decreased due to the reaction, more TFE was added in small aliquots (5 g each) to maintain operating pressure roughly between 0.34 MPa and 0.86 MPa. Once 40 g of TFE had been fed, the vessel was vented and cooled to 25 degrees C. The THF was then removed under vacuum and the product was vacuum distilled at 40 degrees C. to yield pure product as shown by $^1H$ and $^{19}F$ NMR (yield 44 g). Iodopropane (16.99 g) was mixed with 1-(1,1,2,2-tetrafluoroethyl)imidazole (16.8 g) in dry acetonitrile (100 ml), and the mixture was refluxed for 3 days. The solvent was removed in vacuo, yielding a yellow waxy solid (yield 29 g). The product, 1-propyl-3-(1,1,2,2-tetrafluoroethyl)imidazolium iodide was confirmed by 1H NMR (in $CD_3CN$) [0.96 (t, 3H); 1.99 (m, 2H); 4.27 (t, 2H); 6.75 (t, 1H); 7.72 (d, 2H); 9.95 (s, 1H)].

Iodide (24 g) was then added to 60 ml of dry acetone, followed by 15.4 g of potassium 1,1,2,2-tetrafluoroethane-

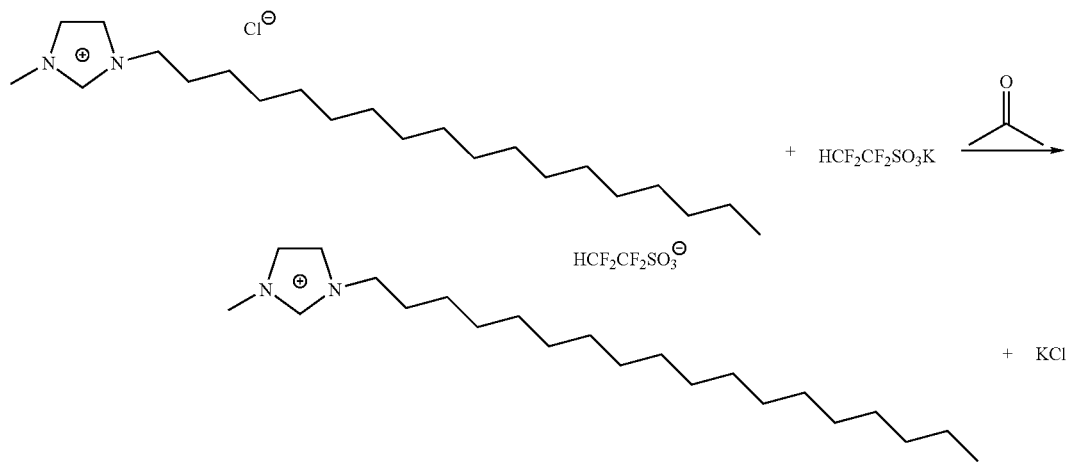

M) Synthesis of 1-propyl-3-(1,1,2,2-TFES) imidazolium 1,1,2,2-tetrafluoroethanesulfonate Imidazole (19.2 g) was added to of tetrahydrofuran (80 mls). A glass shaker tube reaction vessel was filled with the THF-containing imidazole solution. The vessel was cooled to 18° C., evacuated to 0.08 MPa, and purged with nitrogen. The evacuate/purge cycle was repeated two more times. Tetrafluoroethylene (TFE, 5 g) was then added to the vessel, and it was heated to 100 degrees C., at which time the inside pressure sulfonate in 75 ml of dry acetone. The mixture was heated at 60 degrees C. overnight and a dense white precipitate was formed (potassium iodide). The mixture was cooled, filtered, and the solvent from the filtrate was removed using a rotary evaporator. Some further potassium iodide was removed under filtration. The product was further purified by adding 50 g of acetone, 1 g of charcoal, 1 g of celite and 1 g of silica gel. The mixture was stirred for 2 hours, filtered and the solvent removed. This yielded 15 g of a liquid, shown by NMR to be the desired product.

N) Synthesis of 1-butyl-3-methylimidazolium 1,1,2,3,3,3-hexafluoropropanesulfonate (Bmim-HFPS)

1-Butyl-3-methylimidazolium chloride (Bmim-Cl, 50.0 g) and high purity dry acetone (>99.5%, 500 ml) were combined in a 1 l flask and warmed to reflux with magnetic stirring until the solid all dissolved. At room temperature in a separate 1 l flask, potassium-1,1,2,3,3,3-hexafluoropropanesulfonte (HFPS-K) was dissolved in high purity dry acetone (550 ml). These two solutions were combined at room temperature and allowed to stir magnetically for 12 hr under positive nitrogen pressure. The stirring was stopped, and the KCl precipitate was allowed to settle. This solid was removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was suction filtered and the acetone removed in vacuo to give a colorless oil. This was further dried at 4 Pa and 25 degrees C. for 2 hr to provide 68.6 g of product.

$^{19}$F NMR (DMSO-$d_6$) δ −73.8 (s, 3F); −114.5, −121.0 (ABq, J=258 Hz, 2F); −210.6 (m, J=42 Hz, 1F).

$^1$H NMR (DMSO-$d_6$) δ 0.9 (t, J=7.4 Hz, 3H); 1.3 (m, 2H); 1.8 (m, 2H); 3.9 (s, 3H); 4.2 (t, J=7 Hz, 2H); 5.8 (dm, J=42 Hz, 1H); 7.7 (s, 1H); 7.8 (s, 1H); 9.1 (s, 1H).

% Water by Karl-Fisher titration: 0.12%.

Analytical calculation for $C_9H_{12}F_6N_2O_3S$: C, 35.7: H, 4.4: N, 7.6. Experimental Results: C, 34.7: H, 3.8: N, 7.2.

TGA (air): 10% wt. loss @ 340 degrees C., 50% wt. loss @ 367 degrees C.

TGA ($N_2$): 10% wt. loss @ 335 degrees C., 50% wt. loss @ 361 degrees C.

Extractable chloride by ion chromatography: 27 ppm.

O) Synthesis of 1-butyl-3-methylimidazolium 1,1,2-trifluoro-2-(trifluoromethoxy)ethanesulfonate (Bmim-TTES)

1-Butyl-3-methylimidazolium chloride (Bmim-Cl, 10.0 g) and deionized water (15 ml) were combined at room temperature in a 200 ml flask. At room temperature in a separate 200 ml flask, potassium 1,1,2-trifluoro-2-(trifluoromethoxy) ethanesulfonate (TTES-K, 16.4 g) was dissolved in deionized water (90 ml). These two solutions were combined at room temperature and allowed to stir magnetically for 30 min. under positive nitrogen pressure to give a biphasic mixture with the desired ionic liquid as the bottom phase. The layers were separated, and the aqueous phase was extracted with 2×50 ml portions of methylene chloride. The combined organic layers were dried over magnesium sulfate and concentrated in vacuo. The colorless oil product was dried at for 4 hr at 5 Pa and 25 degrees C. to afford 15.0 g of product.

$^{19}$F NMR (DMSO-$d_6$) δ −56.8 (d, $J_{FH}$=4 Hz, 3F); −119.5, −119.9 (subsplit ABq, J=260 Hz, 2F); −142.2 (dm, $J_{FH}$=53 Hz, 1F).

$^1$H NMR (DMSO-$d_6$) δ 0.9 (t, J=7.4 Hz, 3H); 1.3 (m, 2H); 1.8 (m, 2H); 3.9 (s, 3H); 4.2 (t, J=7.0 Hz, 2H); 6.5 (dt, J=53 Hz, J=7 Hz, 1H); 7.7 (s, 1H); 7.8 (s, 1H); 9.1 (s, 1H).

% Water by Karl-Fisher titration: 613 ppm.

Analytical calculation for $C_{11}H_{16}F_6N_2O_4S$: C, 34.2: H, 4.2: N, 7.3. Experimental Results: C, 34.0: H, 4.0: N, 7.1.

TGA (air): 10% wt. loss @ 328 degrees C., 50% wt. loss @ 354 degrees C.

TGA ($N_2$): 10% wt. loss @ 324 degrees C., 50% wt. loss @ 351 degrees C.

Extractable chloride by ion chromatography: <2 ppm.

P) Synthesis of 1-butyl-3-methylimidazolium 1,1,2-trifluoro-2-(perfluoroethoxy)ethanesulfonate (Bmim-TPES)

1-Butyl-3-methylimidazolium chloride (Bmim-Cl, 7.8 g) and dry acetone (150 ml) were combined at room temperature in a 500 ml flask. At room temperature in a separate 200 ml flask, potassium 1,1,2-trifluoro-2-(perfluoroethoxy)ethanesulfonate (TPES-K, 15.0 g) was dissolved in dry acetone (300 ml). These two solutions were combined and allowed to stir magnetically for 12 hr under positive nitrogen pressure. The KCl precipitate was then allowed to settle leaving a colorless solution above it. The reaction mixture was filtered once through a celite/acetone pad and again through a fritted glass funnel to remove the KCl. The acetone was removed in vacuo first on a rotovap and then on a high vacuum line (4 Pa, 25 degrees C.) for 2 hr. Residual KCl was still precipitating out of the solution, so methylene chloride (50 ml) was added to the crude product, which was then washed with deionized water (2×50 ml). The solution was dried over magnesium sulfate, and the solvent was removed in vacuo to give the product as a viscous light yellow oil (12.0 g, 62% yield).

$^{19}$F NMR ($CD_3CN$) δ −85.8 (s, 3F); −87.9, −90.1 (subsplit ABq, $J_{FF}$=147 Hz, 2F); −120.6, −122.4 (subsplit ABq, $J_{FF}$=258 Hz, 2F); −142.2 (dm, $J_{FH}$=53 Hz, 1F).

$^1$H NMR ($CD_3CN$) δ 1.0 (t, J=7.4 Hz, 3H); 1.4 (m, 2H); 1.8 (m, 2H); 3.9 (s, 3H); 4.2 (t, J=7.0 Hz, 2H); 6.5 (dm, J=53 Hz, 1H); 7.4 (s, 1H); 7.5 (s, 1H); 8.6 (s, 1H).

% Water by Karl-Fisher titration: 0.461.

Analytical calculation for $C_{12}H_{16}F_8N_2O_4S$: C, 33.0: H, 3.7. Experimental Results: C, 32.0: H, 3.6.

TGA (air): 10% wt. loss @ 334 degrees C., 50% wt. loss @ 353 degrees C.

TGA ($N_2$): 10% wt. loss @ 330 degrees C., 50% wt. loss @ 365 degrees C.

Q) Synthesis of tetradecyl(tri-n-butyl)phosphonium 1,1,2,3,3,3-hexafluoropropanesulfonate ([4.4.4.14]P-HFPS)

To a 4 l round bottomed flask was added the ionic liquid tetradecyl(tri-n-butyl)phosphonium chloride (Cyphos® IL 167, 345 g) and deionized water (1000 ml). The mixture was magnetically stirred until it was one phase. In a separate 2 l flask, potassium 1,1,2,3,3,3-hexafluoropropanesulfonate (HFPS-K, 214.2 g) was dissolved in deionized water (1100 ml). These solutions were combined and stirred under positive $N_2$ pressure at 26 degrees C. for 1 hr producing a milky white oil. The oil slowly solidified (439 g) and was removed by suction filtration and then dissolved in chloroform (300 ml). The remaining aqueous layer (pH=2) was extracted once with chloroform (100 ml). The chloroform layers were combined and washed with an aqueous sodium carbonate solution (50 ml) to remove any acidic impurity. They were then dried over magnesium sulfate, suction filtered, and reduced in vacuo first on a rotovap and then on a high vacuum line (4 Pa, 100 degrees C.) for 16 hr to yield the final product as a white solid (380 g, 76% yield).

$^{19}$F NMR (DMSO-$d_6$) δ −73.7 (s, 3F); −114.6, −120.9 (ABq, J=258 Hz, 2F); −210.5 (m, $J_{HF}$=41.5 Hz, 1F).

$^1$H NMR (DMSO-$d_6$) δ 0.8 (t, J=7.0 Hz, 3H); 0.9 (t, J=7.0 Hz, 9H); 1.3 (br s, 20H); 1.4 (m, 16H); 2.2 (m, 8H); 5.9 (m, $J_{HF}$=42 Hz, 1H).

% Water by Karl-Fisher titration: 895 ppm.

Analytical calculation for $C_{29}H_{57}F_6O_3PS$: C, 55.2: H, 9.1: N, 0.0. Experimental Results: C, 55.1: H, 8.8: N, 0.0.

TGA (air): 10% wt. loss @ 373 degrees C., 50% wt. loss @ 421 degrees C.

TGA ($N_2$): 10% wt. loss @ 383 degrees C., 50% wt. loss @ 436 degrees C.

R) Synthesis of Tetradecyl(tri-n-hexyl)phosphonium 1,1,2-trifluoro-2-(perfluoroethoxy)ethanesulfonate ([6.6.6.14]P-TPES)

To a 500 ml round bottomed flask was added acetone (Spectroscopic grade, 50 ml) and ionic liquid tetradecyl(trin-hexyl)phosphonium chloride (Cyphos® IL 101, 33.7 g). The mixture was magnetically stirred until it was one phase. In a separate 1 l flask, potassium 1,1,2-trifluoro-2-(perfluoroethoxy)ethanesulfonate (TPES-K, 21.6 g) was dissolved in acetone (400 ml). These solutions were combined and stirred under positive $N_2$ pressure at 26 degrees C. for 12 hr producing a white precipitate of KCl. The precipitate was removed by suction filtration, and the acetone was removed in vacuo on a rotovap to produce the crude product as a cloudy oil (48 g). Chloroform (100 ml) was added, and the solution was washed once with deionized water (50 ml). It was then dried over magnesium sulfate and reduced in vacuo first on a rotovap and then on a high vacuum line (8 Pa, 24 degrees C.) for 8 hr to yield the final product as a slightly yellow oil (28 g, 56% yield).

$^{19}$F NMR (DMSO-$d_6$) δ −86.1 (s, 3F); −88.4, −90.3 (subsplit ABq, $J_{FF}$=147 Hz, 2F); −121.4, −122.4 (subsplit ABq, $J_{FF}$=258 Hz, 2F); −143.0 (dm, $J_{FH}$=53 Hz, 1F).

$^1$H NMR (DMSO-$d_6$) δ 0.9 (m, 12H); 1.2 (m, 16H); 1.3 (m, 16H); 1.4 (m, 8H); 1.5 (m, 8H); 2.2 (m, 8H); 6.3 (dm, $J_{FH}$=54 Hz, 1H).

% Water by Karl-Fisher titration: 0.11.

Analytical calculation for C36H69F8O4PS: C, 55.4: H, 8.9: N, 0.0. Experimental Results: C, 55.2: H, 8.2: N, 0.1.

TGA (air): 10% wt. loss @ 311 degrees C., 50% wt. loss @ 339 degrees C.

TGA ($N_2$): 10% wt. loss @ 315 degrees C., 50% wt. loss @ 343 degrees C.

S) Synthesis of tetradecyl(tri-n-hexyl)phosphonium 1,1,2-trifluoro-2-(trifluoromethoxy)ethanesulfonate ([6.6.6.14]P-TTES)

To a 100 ml round bottomed flask was added acetone (Spectroscopic grade, 50 ml) and ionic liquid tetradecyl(tri-n-hexyl)phosphonium chloride (Cyphos® IL 101, 20.2 g). The mixture was magnetically stirred until it was one phase. In a separate 100 ml flask, potassium 1,1,2-trifluoro-2-(trifluoromethoxy)ethanesulfonate (TTES-K, 11.2 g) was dissolved in acetone (100 ml). These solutions were combined and stirred under positive $N_2$ pressure at 26 degrees C. for 12 hr producing a white precipitate of KCl.

The precipitate was removed by suction filtration, and the acetone was removed in vacuo on a rotovap to produce the crude product as a cloudy oil. The product was diluted with ethyl ether (100 ml) and then washed once with deionized water (50 ml), twice with an aqueous sodium carbonate solution (50 ml) to remove any acidic impurity, and twice more with deionized water (50 ml). The ether solution was then dried over magnesium sulfate and reduced in vacuo first on a rotovap and then on a high vacuum line (4 Pa, 24 degrees C.) for 8 hr to yield the final product as an oil (19.0 g, 69% yield).

$^{19}$F NMR (CD$_2$Cl$_2$) δ −60.2 (d, $J_{FH}$=4 Hz, 3F); −120.8, −125.1 subsplit ABq, J=260 Hz, 2F); −143.7 (dm, $J_{FH}$=53 Hz, 1F). $^1$H NMR (CD$_2$Cl$_2$) δ 0.9 (m, 12H); 1.2 (m, 16H); 1.3 (m, 16H); 1.4 (m, 8H); 1.5 (m, 8H); 2.2 (m, 8H); 6.3 (dm, $J_{FH}$=54 Hz, 1H).

% Water by Karl-Fisher titration: 412 ppm.

Analytical calculation for C35H69F6O4PS: C, 57.5: H, 9.5: N, 0.0. Experimental results: C, 57.8: H, 9.3: N, 0.0.

TGA (air): 10% wt. loss @ 331 degrees C., 50% wt. loss @ 359 degrees C.

TGA ($N_2$): 10% wt. loss @ 328 degrees C., 50% wt. loss @ 360 degrees C.

T) Synthesis of 1-ethyl-3-methylimidazolium 1,1,2, 2-tetrafluoro-2-(pentafluoroethoxy)sulfonate (Emim-TPENTAS)

To a 500 ml round bottomed flask was added 1-ethyl-3-methylimidazolium chloride (Emim-Cl, 98%, 18.0 g) and reagent grade acetone (150 ml). The mixture was gently warmed (50 degrees C.) until all of the Emim-Cl dissolved. In a separate 500 ml flask, potassium 1,1,2,2-tetrafluoro-2-(pentafluoroethoxy)sulfonate (TPENTAS-K, 43.7 g) was dissolved in reagent grade acetone (450 ml).

These solutions were combined in a 1 l flask producing a white precipitate (KCl). The mixture was stirred at 24 degrees C. for 8 hr. The KCl precipitate was then allowed to settle leaving a clear yellow solution above it. The KCl was removed by filtration through a celite/acetone pad. The acetone was removed in vacuo to give a yellow oil, which was then diluted with chloroform (100 ml). The chloroform was washed three times with deionized water (50 ml), dried over magnesium sulfate, filtered, and reduced in vacuo first on a rotovap and then on a high vacuum line (4 Pa, 25 degrees C.) for 8 hr. The product was a light yellow oil (22.5 g).

19F NMR (DMSO-$d_6$) δ −82.9 (m, 2F); −87.3 (s, 3F); −89.0 (m, 2F); −118.9 (s, 2F).

$^1$H NMR (DMSO-$d_6$) δ 1.5 (t, J=7.3 Hz, 3H); 3.9 (s, 3H); 4.2 (q, J=7.3 Hz, 2H); 7.7 (s, 1H); 7.8 (s, 1H); 9.1 (s, 1H).

% Water by Karl-Fisher titration: 0.17%.

Analytical calculation for C10H11N2O4F9S: C, 28.2: H, 2.6: N, 6.6 Experimental results: C, 28.1: H, 2.9: N, 6.6.

TGA (air): 10% wt. loss @ 351 degrees C., 50% wt. loss @ 401 degrees C. TGA ($N_2$): 10% wt. loss @ 349 degrees C., 50% wt. loss @ 406 degrees C.

U) Synthesis of tetrabutylphosphonium 1,1,2-trifluoro-2-(perfluoroethoxy)ethanesulfonate (TBP-TPES)

To a 200 ml round bottomed flask was added deionized water (100 ml) and tetra-n-butylphosphonium bromide (Cytec Canada Inc., 20.2 g). The mixture was magnetically stirred until the solid all dissolved. In a separate 300 ml flask, potassium 1,1,2-trifluoro-2-(perfluoroethoxy)ethanesulfonate (TPES-K, 20.0 g) was dissolved in deionized water (400 ml) heated to 70 degrees C. These solutions were combined and stirred under positive $N_2$ pressure at 26 degrees C. for 2 hr producing a lower oily layer. The product oil layer was separated and diluted with chloroform (30 ml), then washed once with an aqueous sodium carbonate solution (4 ml) to remove any acidic impurity, and three times with deionized water (20 ml). It was then dried over magnesium sulfate and reduced in vacuo first on a rotovap and then on a high vacuum line (8 Pa, 24 degrees C.) for 2 hr to yield the final product as a colorless oil (28.1 g, 85% yield).

$^{19}$F NMR (CD$_2$Cl$_2$) δ −86.4 (s, 3F); −89.0, −90.8 (subsplit ABq, $J_{FF}$=147 Hz, 2F); −119.2, −125.8 (subsplit ABq, $J_{FF}$=254 Hz, 2F); −141.7 (dm, $J_{FH}$=53 Hz, 1F).

$^1$H NMR (CD$_2$Cl$_2$) δ 1.0 (t, J=7.3 Hz, 12H);1.5 (m, 16H); 2.2 (m, 8H); 6.3 (dm, $J_{FH}$=54 Hz, 1H).

% Water by Karl-Fisher titration: 0.29.

Analytical calculation for C20H37F8O4PS: C, 43.2: H, 6.7: N, 0.0. Experimental results: C, 42.0: H, 6.9: N, 0.1.

Extractable bromide by ion chromatography: 21 ppm.

The gas solubility and diffusivity measurements were made using a gravimetric microbalance (Hiden Isochema Ltd, IGA 003, Warrington, UK). The IGA design integrates precise computer-control and measurement of weight change, pressure and temperature to enable fully automatic and reproducible determination of gas adsorption-desorption isotherms and isobars. The microbalance consists of an electrobalance with sample and counterweight components inside a stainless steel pressure-vessel as shown in FIG. 10 and described in Example 14, Table 15. The balance has a weigh range of 0-100 mg with a resolution of 0.1 μg. An enhanced pressure stainless steel (SS316LN) reactor capable of operation to 20.0 bar and 100° C. was installed. Approximately 60 mg of ionic liquid sample was added to the sample container and the reactor was sealed. The sample was dried and degassed by first pulling a course vacuum on the sample with a diaphragm pump (Pfeiffer, model MVP055-3, Asslar, Germany) and then fully evacuating the reactor to $10^{-8}$ bar with a turbopump (Pfeiffer, model TSH-071). While under deep vacuum, the sample was heated to 75° C. for 10 hr with an external water jacket connected to a remote-controlled constant-temperature bath (Huber Ministat, model cc-S3, Offenburg, Germany). A 30 percent ethylene glycol and 70 percent water mixture by volume was used as the recirculating fluid with a temperature range of 5 to 90° C. The sample mass slowly decreased as residual water and gases were removed. Once the mass had stabilized for at least 60 min, the sample dry mass was recorded. The percent weight loss for the various ionic liquids tested was in the range of 1 to 3%.

The IGA003 can operate in both dynamic and static mode. Dynamic mode operation provides a continuous flow of gas (max. 500 cm$^3$ min$^{-1}$) past the sample and the exhaust valve controls the set-point pressure. Static mode operation introduces gas into the top of the balance away from the sample and both the admittance and exhaust valves control the set-point pressure. All absorption measurements were performed in static mode. The sample temperature was measured with a type K thermocouple with an accuracy of ±0.1° C. The thermocouple was located inside the reactor next to the sample container. The water jacket maintained the set-point temperature automatically to within a typical regulation accuracy of ±0.1° C. Four isotherms (at 10, 25, 50, and 75° C.) were measured beginning with 10° C. Once the desired temperature was achieved and stable, the admittance and exhaust valves automatically opened and closed to adjust the pressure to the first set-point. Pressures from $10^{-9}$ to $10^{-1}$ bar were measured using a capacitance manometer (Pfeiffer, model PKR251), and pressures from $10^{-1}$ to 20.0 bar were measured using a piezo-resistive strain gauge (Druck, model PDCR4010, New Fairfield, Conn.). Regulation maintained the reactor pressure set-point to within ±4 to 8 mbar. The pressure ramp rate was set at 200 mbar min$^{-1}$ and the temperature ramp rate was set at 1° C. min$^{-1}$. The upper pressure limit of the stainless steel reactor was 20.0 bar, and several isobars up to 10 bar (i.e., 0.1, 0.5, 1, 4, 7, 10 bar) were measured. To ensure sufficient time for gas-liquid equilibrium, the ionic liquid samples were maintained at set-point for a minimum of 3 hr with a maximum time-out of 8 hr.

The IGA method exploits the relaxation behavior following pressure and temperature changes to simultaneously evaluate the time-dependent absorption and asymptotic uptake. The real-time processor was used to determine the end-point for each isotherm. The percent relaxation used as an end point for the real-time analysis was 99 percent. The minimum weight change for real-time analysis was set at 1 µg, the acceptable average deviation of the model from the acquired data was set at 7 µg, and the target interval for weight acquisition was set at a typical value of 1 µg. The temperature variation during an isotherm was maintained less than 0.1° C. min$^{-1}$.

Safety features of the IGA003 included a pressure relief valve and over-temperature control for the reactor. The factory-installed relief valve was replaced with a DuPont guideline relief valve (Circle-Seal, set-point pressure 24.5 bar; DuPont, Wilmington, Del.). To further protect the microbalance system from over-pressure, additional relief valves were installed on the custom gas manifold and on each gas cylinder; these relief valves were set to open if the pressure exceeded 25 bar. The reactor over-temperature interlock controller that comes standard on the IGA003 was set to turn off the water bath if the temperature exceeded 100° C. Due to the fact that some of the gases tested were flammable (i.e. HFC-32, HFC-143a, and HFC-152a), the IGA003 was mounted inside a custom stainless steel cabinet purged with nitrogen that would minimize the possibility of a flame.

Thermogravimetric measurements were corrected for a number of gravitational balance forces introduced at high pressure as described by Pinkerton, E. P., et al. (High-pressure gravimetric measurement of hydrogen capacity in vapor-grown carbon nanofibers and related materials; Proceedings of the 11$^{th}$ Canadian Hydrogen Conference, Victoria, BC (2001) pages 633-642). These included:
(1) Changes in the buoyant forces due to changes in pressure and temperature.
(2) Aerodynamic drag forces created by the flow of gases.
(3) Changes in the balance sensitivity due to changes in temperature and pressure.
(4) Volumetric changes in the samples due to expansivity.

The gravitational balance forces previously described are often of the same order of magnitude (0.1 to 5 mg) as the overall weight change in the sample and can lead to inaccurate results if not accounted for precisely. Distinguishing mass changes with an accuracy of 0.01 wt. % on small and sometimes limited sample quantities requires knowledge of the sample weight to within about 5 to 10 µg.

The buoyancy correction follows from Archimedes' principal: there is an upward force exerted on an object equivalent to the mass of fluid displaced. The upward force ($C_b$) due to buoyancy is calculated using eq 27 where the mass of the gas displaced is equivalent to the volume of the submersed object ($V_i$) times the density ($\rho_g$) of the gas at a given (T,P) and the gravitational acceleration (g). If the volume of the object remains constant, $V_i$ can be calculated by knowing the mass ($m_i$) and density ($\rho_i$) of the object.

$$C_b = \text{Buoyancy} = gV_i\rho_g(T, P) = g\frac{m_i}{\rho_i}\rho_g(T, P) \qquad (27)$$

Instead of using the gas densities provided in the Hiden Isochema IGA software, the gas density for each gas was calculated using a computer program (Refprop v.7) developed by the National Institute of Standards and Technology (NIST) (Lemmon, E. W.; McLinden, M. O.; Huber, M. L. NIST reference fluid thermodynamic and transport properties—REFPROP, version 7.0, users' guide. U.S. Department of Commerce, Technology Administration, National Institute of Standards and Technology, Standard Reference Data Program, Gaithersburg, Md., 2002).

The buoyancy correction using the IGA003 system involves many additional objects for weighing the sample. Table 15 provides a list of each critical component along with the objects weight, material, density, and temperature. The component arrangement in FIG. 10 leads to a mass balance as shown by eq 28. This expression accounts for the summation of all components as well as the contribution of the absorbed gas mass ($m_a$) and a correction factor ($C_f$) which accounts for the balance sensitivity to T, P. The density of air ($\rho_{air}$) at ambient temperature and pressure was subtracted from $\rho_i$ and $\rho_j$ because the components were initially weighed in air.

$$\sum_{i=1} m_i - \sum_{j=1} m_j - \sum_{i=1} \frac{m_i}{\rho_i}\rho_g(T_i, P) + \sum_{j=1} \frac{m_j}{\rho_j}\rho_g(T_j, P) + m_{IL} + m_a - \qquad (28)$$
$$\frac{m_{IL}}{\rho_s(T_s)}\rho_g(T_s, P) - \frac{m_a}{\rho_a(T_s)}\rho_g(T_s, P) - C_f(T, P) = \text{reading}$$

The largest contributions in eq 28 are typically those of the sample container, sample, and counter weight; the other referenced objects in Table 15 contribute less because of their larger densities (denominators in eq 28). Physical densities of ionic liquids were measured using a Micromeritics Accupyc 1330 helium pycnometer with an accuracy of ±0.001 g cm$^{-3}$ (Micromeritics Instrument Corp., Norcross, Ga.). Initially, the volume ($V_{IL}$) of each sample was calculated from its pycnometric density ($\rho_s$) and dry mass sample weight ($\rho_s$), but volumetric expansion ($\Delta\hat{V}/\hat{V}_0$) due to the gas absorption was later taken into account as described below to more accurately determine the buoyancy effect.

The system was operated in static mode that essentially eliminates any aerodynamic drag forces due to flowing gases. Electrobalances are sensitive to temperature and pressure fluctuations on the beam arm and internal electronics. To minimize this effect, the balance electronics are heated externally with a band heater to a temperature of 45±0.1° C. In addition, the component temperatures provided in Table 15 are measured for the sample ($T_s$) and all others are estimated. Therefore, a correction factor ($C_f$) was determined as a function of T, P by measuring the buoyancy effect without a sample and calculating a least-squares fit to tare the balance. The correction factor was on the order of 0.1 to 0.3 mg and increased as expected with decreasing temperature and increasing pressure.

Initially the ionic liquid sample volume was considered to be constant and the mole fraction solubility calculated without taking into account buoyancy effects due to sample expansivity. In order to make a proper buoyancy correction due to the liquid volume change, a simple mole fraction average for the molar volume, $\tilde{V}_m$, was used.

$$\tilde{V}_m(T,P) = \tilde{V}_{IL}(1-x) + \tilde{V}_g x, \tag{29}$$

where $\tilde{V}_i = MW_i/\rho_i$ and x represents the molar fraction of gas in the solution.

$$V_m(T, P) = \tilde{V}_m(T, P)\left[\left(\frac{m_{IL}}{MW_{IL}}\right) + \left(\frac{m_g}{MW_g}\right)\right] \tag{30}$$

$$\frac{m_s}{\rho_s(T_s)}\rho_g(T_s, P) + \frac{m_a}{\rho_a(T_s)}\rho_g(T_s, P) = V_m(T, P)\rho_g(T, P) \tag{31}$$

As a first approximation, eqs 29 and 30 were used to estimate the change in the liquid sample volume, $V_m$, at the measured T, P conditions. Eq 31 can be substituted into eq 28 to account for the buoyancy change with respect to sample expansivity.

Besides the equilibrium solubility, time-dependent absorption data were also gathered using the Hiden gravimetric microbalance for each T, P set-point. In order to understand the time-dependent behavior of gas dissolving in liquid, we applied a mathematical model based on a simplified mass diffusion process. Imagine a flat-bottom sample container filled with ionic liquid at a certain liquid level height (L). The height is determined by knowing the cylindrical geometry of the sample container, dry sample weight after evacuation and heating, and the ionic liquid density at the proper temperature. After evacuation, the gas is introduced into the Pyrex® sample container with a constant pressure at a given temperature. A small amount of gas will start dissolving into the ionic liquid, and after a sufficient time it will reach a thermodynamic equilibrium, that is the solubility limit of the gas in the ionic liquid at the given T and P. This transient behavior with time will be modeled based on previous work (Shiflett, M. B. and Yokozeki, A. [Ind. Eng. Chem. Res. 2005, 44:4453-4464]; Yokozeki, A. [Intl. J. Refrigeration, 2002, 22:695-704]).

Processes of gas dissolving in liquid may be highly complex phenomena because of a possible evolution of heat of mixing, the subsequent liquid convection due to the local temperature difference, as well as the free convection due to the density difference, and the possible change in thermophysical properties of the liquid. The following assumptions were made for the dissolving gas (Shiflett, M. B. and Yokozeki, A. [Ind. Eng. Chem. Res. 2005, 44:4453-4464]; Yokozeki, A. [Intl. J. Refrigeration, 2002, 22:695-704]):

(1) Gas dissolves through a one-dimensional (vertical) diffusion process, in which there is no convective flow in the liquid.
(2) A thin boundary layer between the gas and liquid phases exists, where the thermodynamic equilibrium is instantly established with the saturation concentration ($C_S$), and where the concentration is constant all the time at a given temperature and pressure.
(3) Temperature and pressure are kept constant.
(4) The gas-dissolved liquid is a highly dilute solution, and so the relevant thermophysical properties of the solution do not change.

The process may then be described by one-dimensional mass diffusion due to the local concentration difference. The governing differential equations are:

$$\frac{\partial C}{\partial t} = D\frac{\partial^2 C}{\partial z^2} \tag{32}$$

Initial Condition: $C=C_0$ when $t=0$ and $0<z<L$ (33)

Boundary Conditions: $C=C_s$ when $t>0$ and $z=0$ (34)

$$\frac{\partial C}{\partial z} = 0 \text{ at } z = L \tag{35}$$

where C is the concentration of a dissolving substance in ionic liquid as a function of time, t and vertical location, z, where L is the depth of ionic liquid in the container, and z=0 corresponds to the vapor-liquid boundary. $C_0$ is an initial homogenous concentration of the dissolving gas, and is zero (initially) or a small finite amount at t>0. D is the diffusion coefficient that is assumed to be constant.

Eq 32 can be solved analytically for the initial and boundary conditions eqs 33-35 by a standard method such as separation variables or Laplace transform and yields:

$$C = C_S\left[1 - 2\left(1 - \frac{C_0}{C_S}\right)\sum_{n=0}^{\infty}\frac{\exp(-\lambda_n^2 Dt)\sin\lambda_n z}{L\lambda_n}\right], \tag{36}$$

where $$\lambda_n = \left(n + \frac{1}{2}\right)\frac{\pi}{L}.$$

An experimentally observed quantity at a specified time is the total concentration (or mass) of dissolved gas in ionic liquid, and not the concentration profile in z. This space-averaged concentration at a given time, <C>, can be calculated from eq 37.

$$<C> = \int_0^L C\,dz/L \tag{37}$$

$$<C> = C_S\left[1 - 2\left(1 - \frac{C_0}{C_S}\right)\sum_{n=0}^{\infty}\frac{\exp(-\lambda_n^2 Dt)}{L^2\lambda_n^2}\right] \tag{38}$$

Although eq 38 contains an infinite summation, only the first few terms, except for initial small time periods, are sufficient in practical applications. In this work, the summation was terminated after ten terms when the numerical contribution to the summation in <C> became less than $10^{-12}$. By analyzing experimental data with this equation, we obtained the saturation concentration ($C_S$) and diffusion constant (D) at given T and P, when $C_0$ was known.

Examples 2-6 and FIGS. 2-6 show solubility and diffusivity results for several hydrofluorocarbons (HFC-32, HFC-125, HFC-134a, HFC-143a, and HFC-152a) in one ionic liquid, [bmim][PF$_6$], at 10, 25, 50, and 75° C. Compositions were prepared that consisted of HFC-32 and [bmim][PF$_6$] from about 0.3 to about 81.2 mole percent of HFC-32 over a temperature range from 10 to 75° C. at a pressure from about 0.1 to 10 bar. Compositions were prepared that consisted of HFC-125 and [bmim][PF$_6$] from about 0.1 to about 65.1 mole percent of HFC-125 over a temperature range from 10 to 75° C. at a pressure from about 0.1 to 10 bar. Compositions were prepared that consisted of HFC-134a and [bmim][PF$_6$] from about 0.1 to about 72.1 mole percent of HFC-134a over a temperature range from 10 to 75° C. at a pressure from about 0.1 to 3.5 bar. Compositions were prepared that consisted of HFC-143a and [bmim][PF$_6$] from about 0.1 to about 26.5 mole percent of HFC-143a over a temperature range from 10 to 75° C. at a pressure from about 0.1 to 7.5 bar. Compositions were prepared that consisted of HFC-152a and [bmim][PF$_6$] from about 0.5 to about 79.7 mole percent of HFC-152a over a temperature range from 10 to 75° C. at a pressure from about 0.1 to 4.5 bar.

Figure 8:
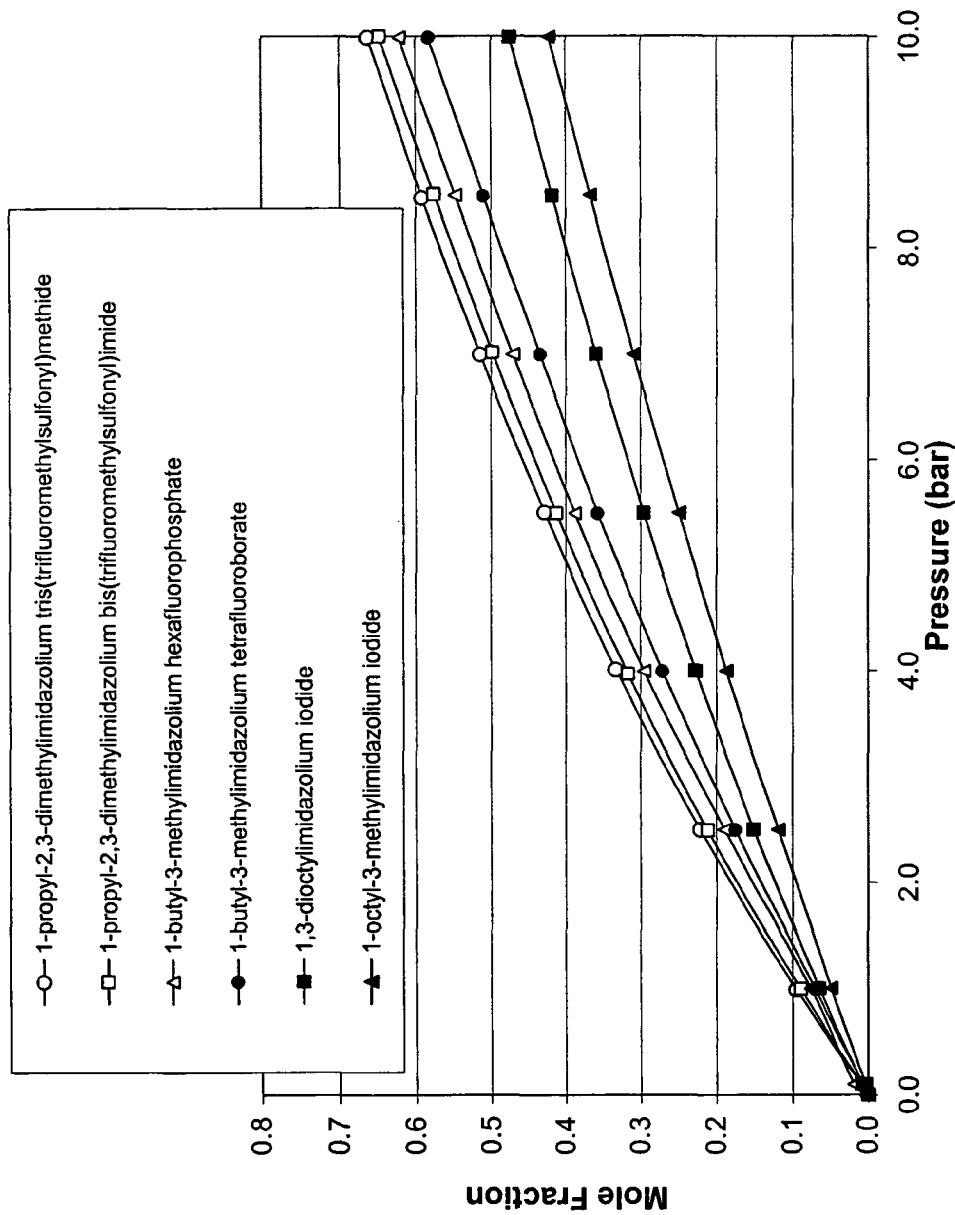
FIG. 8 shows measured isothermal solubility data at 25° C. of the systems HFC-32+six different ionic liquids as a function of pressure for comparison. Open circles (○) represent measured isothermal data for HFC-32+1-propyl-2,3-dimethylimidazolium tris(trifluoromethylsulfonyl)methide at 25° C., open squares (□) represent measured isothermal data for HFC-32+1-propyl-2,3-dimethylimidazolium bis(trifluoromethylsulfonyl)imide at 25° C., open triangles (Δ) represent measured isothermal data for HFC-32+1-butyl-3-methylimidazolium hexafluorophosphate at 25° C., filled circles (●) represent measured isothermal data for HFC-32+1-butyl-3-methylimidazolium tetrafluoroborate at 25° C., filled squares (■) represent measured isothermal data for HFC-32+1,3-dioctylimidazolium iodide at 25° C., and filled triangles (▲) represent measured isothermal data for HFC-32+1-octyl-3-methylimidazolium iodide at 25° C. Solid lines represent data trends.

Examples 7-11 and FIGS. 7 and 8 show solubility and diffusivity results for HFC-32 in several additional ionic liquids ([bmim][BF$_4$], [omim][I], [doim][I], [dmpim][tTFMSmethide], and [dmpim][bTFMSimide]). Compositions were prepared that consisted of HFC-32 and [bmim][BF$_4$] from about 0.1 to about 76.5 mole percent of HFC-32 over a temperature range from 10 to 75° C. at a pressure from about 0.1 to 10 bar. Compositions were prepared that consisted of HFC-32 and [omim][I] from about 0.4 to about 41.6 mole percent of HFC-32 at a temperature of 25° C. and a pressure from about 0.1 to 10 bar. Compositions were prepared that consisted of HFC-32 and [doim][I] from about 0.7 to about 46.8 mole percent of HFC-32 at a temperature of 25° C. and a pressure from about 0.1 to 10 bar. Compositions were prepared that consisted of HFC-32 and [dmpim][tTFMSmethide] from about 0.9 to about 66 mole percent of HFC-32 at a temperature of 25° C. and a pressure from about 0.1 to 10 bar. Compositions were prepared that consisted of HFC-32 and [dmpim][tTFMSimide] from about 0.8 to about 64.5 mole percent of HFC-32 at a temperature of 25° C. and a pressure from about 0.1 to 10 bar.

Figure 9:
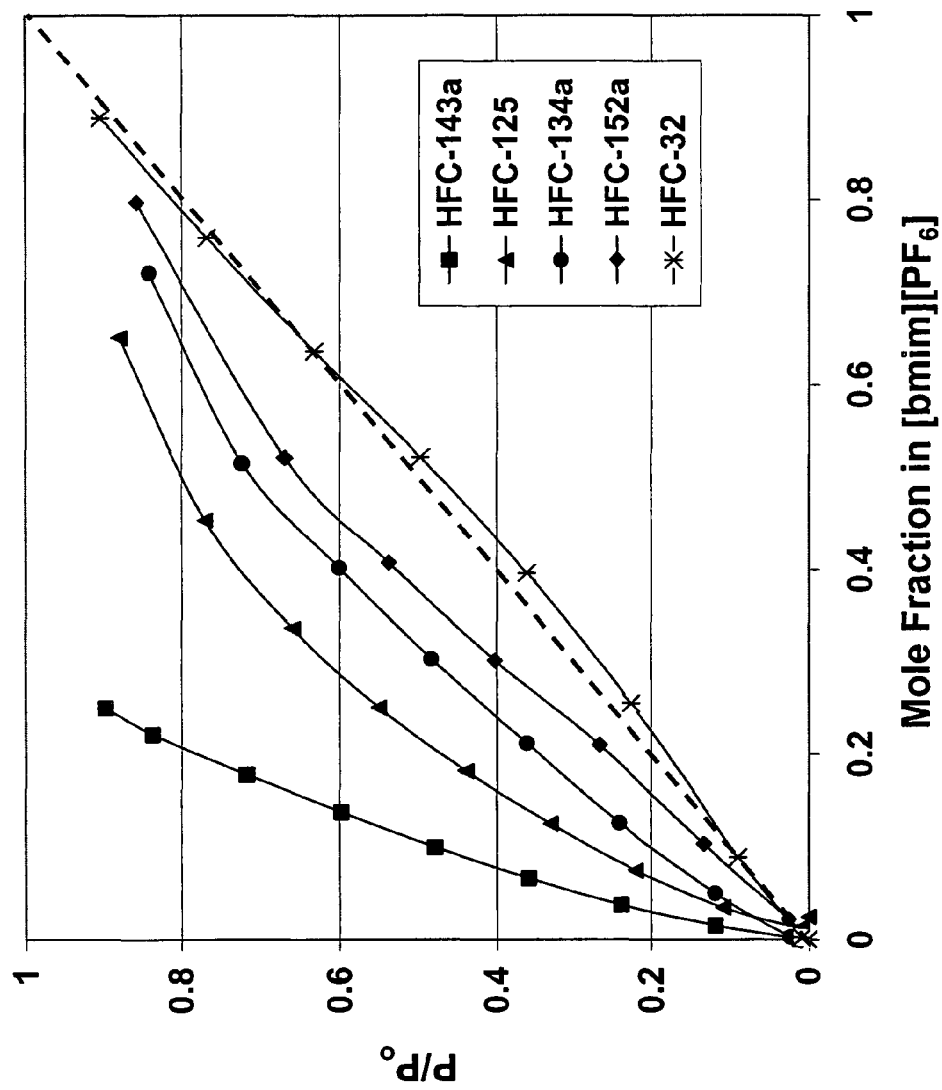
FIG. 9 shows measured isothermal solubility data (in mole fraction) at 10° C. of the systems HFC-32, HFC-152a, HFC-134a, HFC-125, and HFC-143a+[bmim][PF$_6$] in terms of absolute pressure divided by the gas saturation pressure at 10° C. shown by ratio (P/P$_0$). Open cross hatch (x) represents measured isothermal data for HFC-32 at 10° C. with P$_0$=11.069 bar, filled diamonds (♦) represents measured isothermal data for HFC-152a at 10° C. with P$_0$=3.7277 bar, filled circles (●) represent measured isothermal data for HFC-134a at 10° C. with P$_0$=4.1461 bar, filled triangles (▲) represent measured isothermal data for HFC-125 at 10° C. with P$_0$=9.0875 bar, filled squares (■) represent measured isothermal data for HFC-143a at 10° C. with P$_0$=8.3628 bar. Solid lines represent data trend and dashed line represents Raoult's Law.

FIG. 9 shows measured isothermal solubility data (in mole fraction) at 10° C. of the systems HFC-32, HFC-152a, HFC-134a, HFC-125, and HFC-143a+[bmim][PF$_6$] in terms of absolute pressure divided by the gas saturation pressure ($P_0$) at 10° C. shown by ratio (P/$P_0$). The saturation pressures for HFC-32, HFC-125, HFC-134a, HFC-143a, and HFC-152a at 10° C. are $P_0$=11.069 bar, $P_0$=3.7277 bar, $P_0$=4.1461 bar, $P_0$=9.0875, and $P_0$=8.3628 bar, respectively. Negative deviations from Raoult's law (i.e. curvature below the dashed line) are unusual and indicate strong interaction between the refrigerant and the ionic liquid. This in turn translates into high solubility that is ideal for an absorption cycle working fluid. In particular HFC-32 has negative deviation from Raoult's law as shown in FIG. 9. Compositions comprise HFC-32 and [bmim][PF$_6$] from about 0.1 to 63 mole percent of HFC-32 at 10° C. and P/$P_0$ from about 0.1 to about 0.63. Strong positive deviations from Raoult's law (i.e. curvature above the dashed line) are more typical and indicate refrigerant and ionic liquids are less soluble and eventually may form a liquid-liquid phase separation. Compositions comprise HFC-152a and [bmim][PF$_6$] from about 0.1 to about 80 mole percent of HFC-152a at 10° C. and P/$P_0$ from 0.1 to about 0.86. Compositions comprise HFC-134a and [bmim][PF$_6$] from about 0.1 to about 72 mole percent of HFC-134a at 10° C. and P/$P_0$ from about 0.1 to about 0.84. Compositions comprise HFC-125 and [bmim][PF$_6$] from about 0.1 mole to about 65 mole percent of HFC-125 at 10° C. and P/$P_0$ from about 0.1 to about 0.88. Compositions comprise HFC-143a and [bmim][PF$_6$] from about 0.1 to about 25 mole percent at 10° C. and P/$P_0$ from about 0.1 to about 0.90.

Examples 12 and 13 provide a method for preparation of 1,3-dioctylimidazolium iodide [ooim][I] and a method for preparation of 1-methyl-3-dioctylimidazolium iodide [ooim][I]. Example 14 provides a description of the microbalance components. Examples 15-41 show solubility results for various refrigerants in ionic liquids.

EXAMPLE 1

Absorption Cooling Process

TABLE 1

EOS Constants of Pure Refrigerants and Absorbents.

| Compound | Molar Mass | $T_c$ (K) | $P_c$ (kPa) | $\beta_0$ | $\beta_1$ | $\beta_2$ | $\beta_3$ |
|---|---|---|---|---|---|---|---|
| HCFC-22 | 86.47 | 369.17 | 4913 | 1.0011 | 0.43295 | −0.06921 | 0.01501 |
| HFC-32 | 52.02 | 351.56 | 5738 | 1.0019 | 0.48333 | −0.07538 | 0.00673 |
| HFC-125 | 120.22 | 339.19 | 3637 | 1.0001 | 0.47736 | −0.01977 | −0.0177 |
| HFC-134 | 102.03 | 391.97 | 4580 | 1.0012 | 0.48291 | −0.05070 | 0 |
| HFC-134a | 102.03 | 374.25 | 4059 | 1.0025 | 0.50532 | −0.04983 | 0 |
| HFC-143a | 84.04 | 346.20 | 3759 | 1.0006 | 0.45874 | −0.04846 | −0.0143 |
| HFC-152a | 66.05 | 386.44 | 4520 | 1.0012 | 0.48495 | −0.08508 | 0.0146 |
| NH$_3$ | 17.03 | 405.40 | 11333 | 1.0018 | 0.46017 | −0.06158 | 0.00168 |
| H$_2$O | 18.02 | 647.10 | 22064 | 1.0024 | 0.54254 | −0.08667 | 0.00525 |
| [bmim][PF$_6$] | 284.18 | 950 | 2027 | 1 | 0.6571 | 0 | 0 |
| [bmim][BF$_4$] | 226.02 | 950 | 2533 | 1 | 0.8362 | 0 | 0 |
| [emim][BEI] | 491.32 | 782 | 1626 | 1 | 0.60391 | 0 | 0 |
| [bmim][TPES] | 436.32 | 778 | 1631 | 1 | 0.63808 | 0 | 0 |
| [pmpy][BMeI] | 416.4 | 820 | 1809 | 1 | 0.50298 | 0 | 0 |
| [dmpim][TMeM] | 551.45 | 1123 | 1972 | 1 | 0.23836 | 0 | 0 |
| [emim][BMeI] | 391.31 | 809 | 2001 | 1 | 0.59726 | 0 | 0 |
| [bmim][TTES] | 320.3 | 788 | 2198 | 1 | 0.55868 | 0 | 0 |
| [6,6,6,14-P][TPES] | 780.0 | 776 | 681 | 1 | 0.76744 | 0 | 0 |
| [bmim][HFPS] | 370.31 | 848 | 2037 | 1 | 0.79449 | 0 | 0 |
| [4,4,4,14-P][HFPS] | 629.36 | 803 | 872 | 1 | 0.47453 | 0 | 0 |

TABLE 2

Coefficients for Ideal Gas Heat Capacity [J · mol$^{-1}$ · K$^{-1}$] in eq 14.

| Compound | $C_0$ | $C_1$ | $C_2$ | $C_3$ |
|---|---|---|---|---|
| R-22 | 17.30 | 0.16180 | $-1.170 \times 10^{-4}$ | $3.058 \times 10^{-7}$ |
| R-32 | 20.34 | 0.07534 | $1.872 \times 10^{-5}$ | $-3.116 \times 10^{-8}$ |
| R-125 | 16.58 | 0.33983 | $-2.873 \times 10^{-4}$ | $8.870 \times 10^{-8}$ |
| R-134 | 15.58 | 0.28694 | $-2.028 \times 10^{-4}$ | $5.396 \times 10^{-8}$ |
| R-134a | 12.89 | 0.30500 | $-2.342 \times 10^{-4}$ | $6.852 \times 10^{-8}$ |
| R-143a | 5.740 | 0.31388 | $-2.595 \times 10^{-4}$ | $8.410 \times 10^{-8}$ |
| R-152a | 8.670 | 0.2394 | $-1.456 \times 10^{-4}$ | $3.392 \times 10^{-8}$ |
| NH$_3$ | 27.31 | 0.02383 | $1.707 \times 10^{-5}$ | $-1.185 \times 10^{-8}$ |
| H$_2$O | 32.24 | $1.924 \times 10^{-3}$ | $1.055 \times 10^{-5}$ | $-3.596 \times 10^{-9}$ |
| [bmim][PF$_6$] | $-2.214$ | 0.57685 | $-3.854 \times 10^{-4}$ | $9.785 \times 10^{-8}$ |
| [bmim][BF$_4$] | 8.946 | 0.43986 | $-1.881 \times 10^{-4}$ | $1.177 \times 10^{-8}$ |
| [emim][BEI] | $-39.23$ | 1.83633 | $-1.368 \times 10^{-3}$ | $3.569 \times 10^{-7}$ |
| [bmim][TPES] | $-58.16$ | 1.87023 | $-1.335 \times 10^{-3}$ | $3.399 \times 10^{-7}$ |
| [pmpy][BMeI] | $-42.88$ | 1.67703 | $-1.194 \times 10^{-3}$ | $3.027 \times 10^{-7}$ |
| [dmpim][BMeI] | $-46.66$ | 2.08141 | $-1.511 \times 10^{-3}$ | $3.864 \times 10^{-7}$ |
| [emim][BMeI] | $-19.61$ | 1.44867 | $-1.039 \times 10^{-3}$ | $2.633 \times 10^{-7}$ |
| [bmim][TTES] | $-39.39$ | 1.43813 | $-9.730 \times 10^{-4}$ | $2.383 \times 10^{-7}$ |
| [6,6,6,14-P][TPES] | $-225.63$ | 4.60000 | $-2.939 \times 10^{-3}$ | $6.929 \times 10^{-7}$ |
| [bmim][HFPS] | $-49.13$ | 1.63180 | $-1.137 \times 10^{-3}$ | $2.850 \times 10^{-7}$ |
| [4,4,4,14-P][HFPS] | $-168.87$ | 3.63969 | $-2.299 \times 10^{-3}$ | $5.369 \times 10^{-7}$ |

TABLE 3

Binary Interaction Parameters of Refrigerant-Absorbent Pairs Determined from Experimental PTx data shown in Examples 2–11, and 15–41.

| Binary Systems (1)/(2) | $l_{12}$ | $l_{21}$ | $m_{12,21}$ | $\tau_{12,21}$ | $\beta_1$ (absorbent) |
|---|---|---|---|---|---|
| R-22/[bmim][PF$_6$] | $-0.1394$ | $-0.1394$ | 0 | 0 | 0.6263 |
| R-32/[bmim][PF$_6$] | $-0.142$ | $-0.0123$ | 0 | 0 | 0.6571 |
| R-32/[bmim][BF$_4$] | $-0.0474$ | $-0.0474$ | 0 | 0 | 0.8362 |
| R-32/[emim]BEI | 0.0695 | 0.0103 | 0 | 0 | 0.6039 |
| R-32/[pmpy][BMeI] | $3.126 \times 10^{-3}$ | $2.177 \times 10^{-2}$ | 0 | 0 | 0.5030 |
| R-32/[dmpim][TMeM] | 0.0836 | 0.0066 | 0 | 0 | 0.2384 |
| R-32/[emim][BMeI] | $2.718 \times 10^{-3}$ | $6.400 \times 10^{-3}$ | 0 | 0 | 0.5973 |
| R-134/[bmim][PF$_6$] | $-0.0957$ | $-0.1037$ | 0 | 0 | 0.6571 |
| R-134a/[bmim][PF$_6$] | 0.0730 | 0.0187 | 0 | 0 | 0.6571 |
| R-134a/[emim][BEI] | $6.508 \times 10^{-3}$ | 0.0309 | 0 | 0 | 0.6039 |
| R-134a/[bmim][TPES] | 0.0059 | 0.0288 | 0 | 0 | 0.6381 |
| R-134a/[bmim][TTES] | 0.0057 | 0.0363 | 0 | 0 | 0.5587 |
| R-134a/[6,6,6,14-P][TPES] | $-9.072 \times 10^{-5}$ | $-5.540 \times 10^{-4}$ | 0 | 0 | 0.7674 |
| R-134a/[bmim][HFPS] | $5.559 \times 10^{-3}$ | $5.628 \times 10^{-3}$ | 0 | 0 | 0.7945 |
| R-134a/[4,4,4,14-P][HFPS] | $-0.0316$ | $-0.0047$ | 0 | 0 | 0.4745 |
| R-152a/[bmim][PF$_6$] | 0.0483 | 0.0212 | 0 | 0 | 0.6571 |
| R-125/[bmim][PF$_6$] | 0.1575 | 0.0218 | 0 | 0 | 0.6571 |
| NH$_3$/H$_2$O | $-0.316$ | $-0.316$ | $-0.0130$ | 0 | 0.54254 |

TABLE 4

Comparisons of Theoretical Cycle Performances.[a]

| Binary Systems (1)/(2) | $P_{con}$, $P_g$ kPa | $P_{eva}$, $P_a$ kPa | $f$ | $x_g$ Mass % | $x_a$ mass % | $Q_e$ kW | COP |
|---|---|---|---|---|---|---|---|
| R-22/[bmim][PF$_6$] | 1531 | 680 | 5.12 | 89.7 | 72.2 | 160.8 | 0.319 |
| R-32/[bmim][PF$_6$] | 2486 | 1106 | 7.35 | 90.4 | 78.1 | 250.4 | 0.385 |
| R-32/[bmim][BF$_4$] | 2486 | 1106 | 6.41 | 90.2 | 76.1 | 250.4 | 0.330 |
| R-32/[emim]BEI | 2486 | 1106 | 10.56 | 91.4 | 82.8 | 250.4 | 0.386 |
| R-32/[pmpy][BMeI] | 2486 | 1106 | 10.09 | 90.8 | 81.8 | 250.4 | 0.387 |
| R-32/[dmpim][TMeM] | 2486 | 1106 | 11.51 | 92.6 | 84.5 | 250.4 | 0.388 |
| R-32/[emim][BMeI] | 2486 | 1106 | 9.26 | 91.1 | 81.2 | 250.4 | 0.377 |
| R-134/[bmim][PF$_6$] | 810 | 322 | 4.38 | 88.8 | 68.5 | 165.5 | 0.348 |
| R-134a/[bmim][PF$_6$] | 1015 | 414 | 10.66 | 92.4 | 83.7 | 150.8 | 0.254 |
| R-134a/[emim][BEI] | 1015 | 414 | 9.46 | 91.4 | 81.8 | 150.8 | 0.308 |
| R-134a/[bmim][TPES] | 1015 | 414 | 8.57 | 90.5 | 80.0 | 150.8 | 0.306 |
| R-134a/[bmim][TTES] | 1015 | 414 | 7.67 | 89.5 | 77.8 | 150.8 | 0.301 |
| R-134a/[6,6,6,14-P][TPES] | 1015 | 414 | 12.42 | 90.8 | 83.5 | 150.8 | 0.269 |
| R-134a/[bmim][HFPS] | 1015 | 414 | 11.38 | 92.8 | 84.6 | 150.8 | 0.218 |
| R-134a/[4,4,4,14-P][HFPS] | 1015 | 414 | 11.92 | 89.9 | 82.4 | 150.8 | 0.302 |
| R-152a/[bmim][PF$_6$] | 907 | 373 | 13.27 | 94.1 | 87.0 | 247.7 | 0.300 |
| R-125/[bmim][PF$_6$] | 2011 | 909 | 16.49 | 92.2 | 86.6 | 82.4 | 0.128 |
| NH$_3$/H$_2$O | 1548 | 615 | 2.54 | 59.5 | 36.1 | 1112 | 0.646 |
| H$_2$O/LiBr | 7.38 | 1.23 | 4.08 | 66.3 | 50.0 | 2502 | 0.833 |

[a] Cycle conditions: $T_g/T_{con}/T_a/T_{eva}$ = 100/40/30/10° C., and $m_r$ = 1 kg · s$^{-1}$.

EXAMPLE 2

Solubility of difluoromethane (HFC-32) in 1-butyl-3-methylimidazolium hexafluorophosphate ([bmim][PF$_6$])

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 5a, 5b, 5c and 5d provide data for $C_o$, $C_s$, D, $X_{calc}$, and $X_{meas}$ at temperatures of 10, 25, 50 and 75° C., respectively.

TABLE 5a

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 10.0 | 0.0979 | 0.52 | 0.54 | 1.54E-09 | 0.029 | 0.026 |
| 10.0 | 0.9957 | 0.82 | 2.53 | 1.94E-11 | 0.124 | 0.106 |
| 10.0 | 2.4967 | 3.32 | 7.56 | 1.71E-11 | 0.309 | 0.270 |
| 10.0 | 3.9964 | 8.18 | 12.38 | 3.65E-11 | 0.436 | 0.426 |
| 10.0 | 5.4975 | 14.44 | 18.71 | 6.34E-11 | 0.557 | 0.555 |
| 10.0 | 6.9965 | 22.12 | 27.85 | 7.42E-11 | 0.678 | 0.676 |
| 10.0 | 8.4954 | — | — | — | — | 0.812 |

TABLE 5b

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 24.9 | 0.0965 | 0.16 | 0.21 | 1.84E-10 | 0.012 | 0.018 |
| 25.0 | 0.9952 | 0.49 | 1.69 | 2.45E-11 | 0.086 | 0.076 |
| 25.0 | 2.4965 | 2.22 | 4.53 | 2.44E-11 | 0.206 | 0.189 |
| 25.0 | 3.9979 | 5.05 | 7.37 | 3.51E-11 | 0.303 | 0.295 |
| 24.9 | 5.4969 | 8.23 | 10.47 | 5.41E-11 | 0.390 | 0.387 |
| 24.9 | 6.9950 | 11.82 | 14.09 | 6.75E-11 | 0.473 | 0.471 |
| 25.0 | 8.5012 | 15.75 | 18.26 | 8.33E-11 | 0.550 | 0.548 |
| 24.9 | 9.9994 | 20.38 | 23.31 | 8.84E-11 | 0.624 | 0.622 |

TABLE 5c

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 49.6 | 0.0992 | 0.00 | 0.12 | 4.76E-11 | 0.007 | 0.006 |
| 49.9 | 0.9954 | 0.33 | 0.92 | 5.28E-11 | 0.048 | 0.047 |
| 49.9 | 2.4963 | 1.43 | 2.31 | 5.29E-11 | 0.115 | 0.113 |
| 49.9 | 3.9949 | 2.84 | 3.72 | 5.98E-11 | 0.174 | 0.173 |
| 49.9 | 5.4966 | 4.41 | 5.22 | 5.99E-11 | 0.231 | 0.229 |
| 49.9 | 6.9965 | 5.81 | 6.72 | 7.69E-11 | 0.282 | 0.282 |
| 50.0 | 8.4959 | 7.37 | 8.32 | 8.54E-11 | 0.331 | 0.331 |
| 50.0 | 9.9959 | 9.78 | 10.05 | 4.04E-11 | 0.379 | 0.377 |

TABLE 5d

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 75.0 | 0.0988 | 0.00 | 0.06 | 7.12E-11 | 0.003 | 0.003 |
| 75.0 | 0.9968 | 0.30 | 0.56 | 8.19E-11 | 0.030 | 0.029 |
| 75.0 | 2.4950 | 0.96 | 1.38 | 8.14E-11 | 0.071 | 0.069 |
| 75.0 | 3.9944 | 1.74 | 2.19 | 9.82E-11 | 0.109 | 0.108 |
| 74.9 | 5.4983 | 2.60 | 3.03 | 9.70E-11 | 0.146 | 0.145 |
| 74.9 | 6.9966 | 3.42 | 3.89 | 9.58E-11 | 0.181 | 0.180 |
| 75.0 | 8.4958 | 4.28 | 4.77 | 9.56E-11 | 0.215 | 0.212 |
| 75.0 | 9.9989 | 5.12 | 5.62 | 1.18E-10 | 0.245 | 0.244 |

EXAMPLE 3

Solubility of pentafluoroethane (HFC-125) in 1-butyl-3-methylimidazolium hexafluorophosphate ([bmim][PF$_6$])

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 6a, 6b, 6c and 6d provide data for $C_o$, $C_s$, D, $X_{calc}$, and $X_{meas}$ at temperatures of 10, 25, 50 and 75° C., respectively.

TABLE 6a

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 9.9 | 0.0992 | 0.0 | 0.12 | 2.52E-12 | 0.003 | 0.013 |
| 10.0 | 0.9964 | 0.73 | 1.50 | 1.83E-11 | 0.035 | 0.034 |
| 10.1 | 1.9959 | 1.72 | 3.96 | 6.36E-12 | 0.089 | 0.074 |
| 10.0 | 2.9960 | 3.55 | 6.25 | 9.31E-12 | 0.136 | 0.125 |
| 10.1 | 3.9964 | 6.03 | 8.88 | 1.56E-11 | 0.187 | 0.182 |
| 9.9 | 4.9965 | 9.10 | 12.52 | 2.44E-11 | 0.253 | 0.250 |
| 10.0 | 5.9965 | 13.18 | 17.56 | 4.05E-11 | 0.335 | 0.336 |
| 9.9 | 6.9962 | 19.19 | 26.04 | 6.12E-11 | 0.455 | 0.454 |
| 10.0 | 7.9979 | — | — | — | — | 0.651 |

TABLE 6b

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 25.0 | 0.0977 | 0.0 | 0.09 | 3.29E-12 | 0.002 | 0.003 |
| 25.0 | 0.9963 | 0.23 | 0.09 | 1.81E-11 | 0.002 | 0.023 |
| 25.0 | 1.9982 | 1.05 | 2.12 | 1.50E-11 | 0.049 | 0.050 |
| 24.9 | 2.9949 | 2.13 | 3.11 | 2.15E-11 | 0.071 | 0.079 |
| 25.0 | 3.9982 | 3.50 | 4.71 | 2.03E-11 | 0.105 | 0.109 |
| 25.0 | 4.9947 | 4.84 | 6.18 | 2.39E-11 | 0.135 | 0.140 |
| 25.0 | 5.9951 | 6.38 | 7.91 | 2.65E-11 | 0.169 | 0.176 |
| 25.0 | 7.9955 | 8.96 | 12.10 | 4.81E-11 | 0.246 | 0.254 |
| 24.9 | 9.9977 | 14.20 | 18.16 | 7.82E-11 | 0.344 | 0.352 |

TABLE 6c

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 49.9 | 0.1003 | 0.0 | 0.02 | 1.96E-10 | 0.000 | 0.000 |
| 49.9 | 0.9963 | 0.18 | 0.55 | 4.29E-11 | 0.013 | 0.013 |
| 49.9 | 1.9983 | 0.73 | 1.17 | 4.59E-11 | 0.027 | 0.027 |
| 50.0 | 2.9996 | 1.34 | 1.78 | 5.19E-11 | 0.041 | 0.041 |
| 49.9 | 3.9969 | 1.96 | 2.44 | 4.75E-11 | 0.056 | 0.056 |

TABLE 6c-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 4.9993 | 2.60 | 3.10 | 5.38E−11 | 0.070 | 0.070 |
| 49.9 | 5.9961 | 3.29 | 3.80 | 5.14E−11 | 0.086 | 0.085 |
| 49.9 | 7.9970 | 4.38 | 5.25 | 5.55E−11 | 0.116 | 0.116 |
| 49.9 | 9.9958 | 5.85 | 6.82 | 5.87E−11 | 0.148 | 0.148 |

TABLE 6d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.1021 | 0.0 | 0.03 | 6.85E−10 | 0.001 | 0.001 |
| 74.9 | 0.9965 | 0.07 | 0.28 | 7.49E−11 | 0.007 | 0.007 |
| 75.0 | 1.9961 | 0.36 | 0.60 | 9.46E−11 | 0.014 | 0.016 |
| 75.1 | 2.9967 | 0.70 | 0.93 | 7.04E−11 | 0.022 | 0.025 |
| 75.0 | 3.9971 | 1.04 | 1.27 | 7.96E−11 | 0.030 | 0.033 |
| 75.0 | 4.9983 | 1.36 | 1.61 | 9.86E−11 | 0.037 | 0.042 |
| 75.0 | 5.9980 | 1.75 | 1.97 | 7.12E−11 | 0.045 | 0.052 |
| 75.1 | 7.9997 | 2.26 | 2.65 | 1.14E−10 | 0.061 | 0.068 |
| 75.0 | 9.9959 | 3.00 | 3.33 | 8.89E−11 | 0.075 | 0.085 |

EXAMPLE 4

Solubility of 1,1,1-2-tetrafluoroethane (HFC-134a) in 1-butyl-3-methylimidazolium hexafluorophosphate ([bmim][PF$_6$]

A solubility and diffusivity study was made at temperatures of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 7a, 7b, 7c and 7d provide data for $C_o$, $C_s$, D, $X_{calc}$, and $X_{meas}$ at temperatures of 10, 25, 50 and 75° C., respectively.

TABLE 7a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 9.8 | 0.0999 | 0.0 | 0.23 | 4.21E−12 | 0.006 | 0.003 |
| 10.0 | 0.4981 | 0.35 | 2.20 | 6.46E−12 | 0.059 | 0.050 |
| 9.9 | 0.9986 | 2.25 | 5.73 | 5.78E−12 | 0.145 | 0.126 |
| 9.9 | 1.4981 | 5.40 | 9.15 | 1.01E−11 | 0.219 | 0.212 |
| 9.9 | 2.0024 | 9.50 | 13.64 | 1.48E−11 | 0.306 | 0.303 |
| 9.9 | 2.4907 | 14.39 | 19.36 | 2.67E−11 | 0.401 | 0.402 |
| 9.9 | 2.9974 | 20.96 | 27.51 | 5.33E−11 | 0.514 | 0.516 |
| 9.9 | 3.4900 | — | — | — | — | 0.721 |

TABLE 7b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 0.1002 | 0.17 | 0.29 | 4.36E−11 | 0.008 | 0.011 |
| 24.9 | 0.4981 | 0.57 | 1.52 | 1.89E−11 | 0.041 | 0.042 |
| 25.0 | 0.9972 | 1.82 | 3.26 | 1.71E−11 | 0.086 | 0.085 |
| 25.0 | 1.4987 | 3.60 | 5.09 | 2.00E−11 | 0.130 | 0.130 |
| 25.0 | 1.9930 | 5.43 | 7.09 | 2.27E−11 | 0.175 | 0.175 |
| 24.9 | 2.4996 | 7.53 | 9.31 | 2.59E−11 | 0.222 | 0.222 |

TABLE 7b-continued

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 2.9952 | 9.78 | 11.82 | 2.82E−11 | 0.272 | 0.273 |
| 24.9 | 3.5000 | 12.51 | 14.62 | 3.99E−11 | 0.323 | 0.323 |

TABLE 7c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.0992 | 0.07 | 0.13 | 2.44E−11 | 0.004 | 0.004 |
| 50.0 | 0.4984 | 0.25 | 0.75 | 4.39E−11 | 0.021 | 0.021 |
| 49.9 | 0.9971 | 1.00 | 1.57 | 3.94E−11 | 0.043 | 0.043 |
| 49.9 | 1.4989 | 1.79 | 2.42 | 4.48E−11 | 0.064 | 0.065 |
| 50.0 | 1.9895 | 2.65 | 3.28 | 4.38E−11 | 0.086 | 0.086 |
| 50.0 | 2.4900 | 3.75 | 4.23 | 2.33E−11 | 0.110 | 0.108 |
| 50.0 | 2.9897 | 4.43 | 5.10 | 4.90E−11 | 0.130 | 0.130 |
| 50.0 | 3.4933 | 5.39 | 6.06 | 5.00E−11 | 0.152 | 0.152 |

TABLE 7d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0970 | 0.00 | 0.03 | 6.45E−11 | 0.001 | 0.001 |
| 74.9 | 0.4984 | 0.09 | 0.32 | 7.49E−11 | 0.009 | 0.009 |
| 74.9 | 0.9934 | 0.51 | 0.79 | 7.93E−11 | 0.022 | 0.022 |
| 74.9 | 1.5010 | 0.98 | 1.27 | 7.78E−11 | 0.035 | 0.035 |
| 75.0 | 1.9983 | 1.44 | 1.73 | 8.37E−11 | 0.047 | 0.046 |
| 75.0 | 2.5014 | 1.89 | 2.21 | 8.37E−11 | 0.059 | 0.059 |
| 75.0 | 3.0022 | 2.39 | 2.71 | 8.26E−11 | 0.072 | 0.072 |
| 75.0 | 3.4897 | 2.95 | 3.21 | 5.53E−11 | 0.085 | 0.084 |

EXAMPLE 5

Solubility of 1,1,1-trifluoroethane (HFC-143a) in 1-butyl-3-methylimidazolium hexafluorophosphate ([bmim][PF$_6$]

A solubility and diffusivity study was made at temperatures of 10, 25, 50, and 75° C. over a pressure range from 0 to 7.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 8a, 8b, 8c and 8d provide data for $C_o$, $C_s$, D, $X_{calc}$, and $X_{meas}$ at temperatures of 10, 25, 50 and 75° C., respectively.

TABLE 8a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 11.7 | 0.0956 | 0.03 | 0.10 | 8.10E−12 | 0.003 | 0.003 |
| 12.0 | 0.9970 | 0.22 | 0.92 | 8.51E−12 | 0.031 | 0.029 |
| 11.9 | 1.9830 | 0.99 | 1.93 | 8.11E−12 | 0.064 | 0.060 |
| 12.0 | 2.9740 | 1.95 | 2.39 | 3.21E−12 | 0.078 | 0.093 |
| 12.3 | 3.9808 | 3.06 | 4.03 | 1.04E−11 | 0.127 | 0.124 |
| 12.0 | 4.9975 | 4.16 | 5.23 | 1.10E−11 | 0.161 | 0.156 |

TABLE 8a-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 12.0 | 5.9821 | 5.30 | 6.42 | 1.44E−11 | 0.192 | 0.188 |
| 12.2 | 6.9975 | 6.54 | 7.63 | 1.94E−11 | 0.223 | 0.219 |
| 12.2 | 7.4832 | 7.80 | 8.31 | 2.03E−11 | 0.239 | 0.235 |

TABLE 8b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0951 | 0.00 | 0.01 | 1.53E−11 | 0.001 | 0.004 |
| 24.9 | 0.9970 | 0.24 | 0.69 | 2.05E−11 | 0.023 | 0.023 |
| 24.9 | 2.0054 | 0.84 | 1.33 | 2.56E−11 | 0.045 | 0.042 |
| 24.9 | 2.9895 | 1.40 | 2.10 | 1.83E−11 | 0.069 | 0.068 |
| 24.9 | 4.0147 | 2.26 | 2.89 | 1.77E−11 | 0.093 | 0.090 |
| 24.9 | 4.9886 | 2.95 | 3.60 | 2.24E−11 | 0.114 | 0.112 |
| 24.9 | 5.9855 | 3.71 | 4.33 | 2.73E−11 | 0.136 | 0.134 |
| 24.9 | 7.0019 | 4.47 | 5.12 | 2.83E−11 | 0.157 | 0.155 |
| 24.9 | 7.5011 | 5.14 | 5.53 | 3.61E−11 | 0.169 | 0.165 |

TABLE 8c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.1050 | 0.00 | 0.03 | 1.51E−10 | 0.000 | 0.001 |
| 49.9 | 1.0023 | 0.16 | 0.40 | 4.47E−11 | 0.014 | 0.013 |
| 50.1 | 2.0045 | 0.61 | 0.84 | 3.41E−11 | 0.028 | 0.027 |
| 50.0 | 3.0002 | 1.03 | 1.26 | 2.90E−11 | 0.042 | 0.040 |
| 50.0 | 4.0021 | 1.39 | 1.65 | 5.08E−11 | 0.055 | 0.054 |
| 50.0 | 5.0046 | 1.81 | 2.08 | 4.10E−11 | 0.069 | 0.067 |
| 50.0 | 6.0039 | 2.29 | 2.50 | 3.75E−11 | 0.082 | 0.079 |
| 50.0 | 7.0029 | 2.63 | 2.90 | 5.57E−11 | 0.094 | 0.092 |
| 50.0 | 10.0030 | 3.56 | 4.16 | 5.51E−11 | 0.131 | 0.127 |

TABLE 8d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0995 | 0.00 | 0.01 | 3.86E−12 | 0.000 | 0.001 |
| 74.9 | 1.0005 | 0.18 | 0.26 | 7.38E−11 | 0.009 | 0.009 |
| 74.8 | 1.9960 | 0.38 | 0.54 | 1.04E−10 | 0.018 | 0.018 |
| 74.9 | 3.0001 | 0.67 | 0.81 | 1.07E−10 | 0.028 | 0.027 |
| 74.9 | 4.0015 | 0.91 | 1.08 | 1.32E−10 | 0.037 | 0.036 |
| 74.9 | 5.0027 | 1.18 | 1.36 | 1.20E−10 | 0.045 | 0.044 |
| 75.0 | 5.9979 | 1.44 | 1.63 | 1.40E−10 | 0.054 | 0.053 |
| 75.0 | 7.0026 | 1.92 | 1.94 | 3.79E−09 | 0.064 | 0.061 |
| 74.9 | 10.0035 | 2.65 | 2.76 | 1.90E−09 | 0.089 | 0.083 |

EXAMPLE 6

Solubility of 1,1-difluoroethane (HFC-152a) in 1-butyl-3-methylimidazolium hexafluorophosphate ([bmim][PF$_6$]

A solubility and diffusivity study was made at temperatures of 10, 25, 50, and 75° C. over a pressure range from 0 to 4.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 9a, 9b, 9c and 9d provide data for $C_o$, $C_s$, D, $X_{calc}$, and $X_{meas}$ at temperatures of 10, 25, 50 and 75° C., respectively.

TABLE 9a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.0973 | 0.10 | 0.73 | 2.13E−12 | 0.031 | 0.021 |
| 10.0 | 0.4994 | 1.23 | 2.90 | 1.14E−11 | 0.114 | 0.103 |
| 10.0 | 0.9933 | 3.58 | 6.11 | 1.56E−11 | 0.219 | 0.210 |
| 10.0 | 1.4985 | 6.91 | 9.60 | 3.09E−11 | 0.314 | 0.301 |
| 9.9 | 2.0011 | 10.40 | 14.00 | 3.60E−11 | 0.412 | 0.407 |
| 9.9 | 2.4952 | 15.52 | 20.42 | 6.44E−11 | 0.525 | 0.521 |
| 9.9 | 3.1963 | — | — | — | — | 0.797 |

TABLE 9b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.16 | 0.66 | 2.00E−11 | 0.028 | 0.030 |
| 25.0 | 0.5006 | 1.02 | 1.92 | 2.01E−11 | 0.078 | 0.077 |
| 24.9 | 0.9982 | 2.34 | 3.55 | 2.64E−11 | 0.137 | 0.136 |
| 25.0 | 1.4924 | 4.20 | 5.35 | 2.89E−11 | 0.196 | 0.194 |
| 25.0 | 2.4969 | 6.74 | 9.52 | 4.96E−11 | 0.312 | 0.311 |
| 25.0 | 3.4818 | 11.59 | 15.05 | 7.73E−11 | 0.433 | 0.432 |
| 25.0 | 4.5051 | 18.83 | 23.81 | 1.04E−10 | 0.573 | 0.574 |

TABLE 9c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.1 | 0.9921 | 0.03 | 0.15 | 5.73E−11 | 0.007 | 0.007 |
| 50.0 | 1.0017 | 0.88 | 1.46 | 5.52E−11 | 0.060 | 0.060 |
| 50.0 | 1.5020 | 1.63 | 2.22 | 5.94E−11 | 0.089 | 0.089 |
| 50.0 | 2.4969 | 2.72 | 3.81 | 6.43E−11 | 0.145 | 0.145 |
| 50.0 | 4.5051 | 6.31 | 7.33 | 7.88E−11 | 0.254 | 0.254 |

TABLE 9d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1032 | 0.04 | 0.11 | 1.38E−10 | 0.005 | 0.005 |
| 74.9 | 0.5019 | 0.19 | 0.42 | 1.25E−10 | 0.018 | 0.018 |
| 74.9 | 1.0023 | 0.57 | 0.84 | 1.21E−10 | 0.035 | 0.035 |
| 74.9 | 1.5014 | 0.99 | 1.27 | 1.25E−10 | 0.052 | 0.052 |
| 75.0 | 2.4964 | 1.63 | 2.12 | 1.42E−10 | 0.085 | 0.085 |
| 75.0 | 3.4970 | 2.57 | 2.98 | 1.48E−10 | 0.117 | 0.117 |
| 74.8 | 4.5003 | 3.51 | 3.89 | 1.21E−10 | 0.148 | 0.149 |

EXAMPLE 7

Solubility of difluoromethane (HFC-32) in 1-butyl-3-methylimidazolium tetrafluoroborate ([bmim][BF$_4$])

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 10a, 10b, 10c and 10d provide data for $C_o$, $C_s$, D, $X_{calc}$, and $X_{meas}$ at temperatures of 10, 25, 50 and 75° C., respectively.

TABLE 10a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.9 | 0.1002 | 8.35 | 9.20 | 1.76E−11 | 0.008 | 0.009 |
| 9.9 | 0.9985 | 10.08 | 13.74 | 1.72E−11 | 0.100 | 0.108 |
| 10.0 | 2.4995 | 15.10 | 18.94 | 3.29E−11 | 0.239 | 0.254 |
| 10.0 | 3.9954 | 21.28 | 25.08 | 4.53E−11 | 0.376 | 0.396 |
| 9.8 | 5.4992 | 28.16 | 33.17 | 8.48E−11 | 0.499 | 0.519 |
| 9.9 | 6.9988 | 37.79 | 46.86 | 1.08E−10 | 0.625 | 0.636 |
| 9.9 | 8.4966 | 52.61 | 52.61 | 1.01E−10 | 0.766 | 0.765 |

TABLE 10b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0969 | 0.01 | 0.15 | 3.37E−11 | 0.007 | 0.006 |
| 25.0 | 0.9968 | 0.59 | 1.81 | 3.36E−11 | 0.074 | 0.070 |
| 25.0 | 2.4955 | 2.75 | 4.79 | 3.70E−11 | 0.180 | 0.174 |
| 25.0 | 3.9989 | 5.87 | 7.95 | 4.62E−11 | 0.273 | 0.270 |
| 25.0 | 5.4977 | 9.23 | 11.36 | 5.98E−11 | 0.358 | 0.356 |
| 25.0 | 6.9955 | 12.90 | 15.12 | 7.44E−11 | 0.436 | 0.434 |
| 25.0 | 8.4945 | 17.08 | 19.33 | 9.10E−11 | 0.510 | 0.510 |
| 25.0 | 9.9985 | 21.83 | 24.46 | 9.94E−11 | 0.585 | 0.583 |

TABLE 10c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0977 | 0.01 | 0.07 | 8.71E−11 | 0.003 | 0.003 |
| 49.9 | 0.9961 | 0.37 | 0.95 | 7.56E−11 | 0.040 | 0.039 |
| 50.0 | 2.4967 | 1.67 | 2.47 | 7.40E−11 | 0.099 | 0.099 |
| 50.0 | 3.9964 | 3.16 | 4.01 | 8.23E−11 | 0.154 | 0.153 |
| 49.9 | 5.4956 | 4.75 | 5.59 | 8.95E−11 | 0.205 | 0.204 |
| 49.9 | 6.9953 | 6.38 | 7.22 | 9.88E−11 | 0.253 | 0.253 |
| 49.8 | 8.4986 | 8.05 | 8.91 | 1.06E−10 | 0.298 | 0.298 |
| 50.0 | 9.9963 | 9.75 | 10.64 | 1.11E−10 | 0.341 | 0.341 |

TABLE 10d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0971 | 0.0 | 0.03 | 1.26E−10 | 0.001 | 0.001 |
| 74.9 | 0.9956 | 0.26 | 0.54 | 1.28E−10 | 0.023 | 0.023 |
| 74.9 | 2.4948 | 1.03 | 1.40 | 1.25E−10 | 0.058 | 0.058 |
| 75.0 | 3.9950 | 1.92 | 2.27 | 1.22E−10 | 0.092 | 0.091 |
| 74.9 | 5.4951 | 2.75 | 3.14 | 1.45E−10 | 0.124 | 0.123 |
| 75.0 | 6.9955 | 3.64 | 4.03 | 1.59E−10 | 0.154 | 0.154 |
| 74.9 | 8.4964 | 4.54 | 4.94 | 1.42E−10 | 0.184 | 0.183 |
| 74.9 | 9.9994 | 5.44 | 5.82 | 1.89E−10 | 0.212 | 0.212 |

EXAMPLE 8

Solubility of difluoromethane (HFC-32) in 1-octyl-3-methylimidazolium iodide ([omim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 11 provides data for $C_o$, $C_s$, D, $X_{calc}$, and $X_{meas}$ at a temperature of 25° C.

TABLE 11

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1007 | 0.01 | 0.06 | 1.75E−11 | 0.004 | 0.004 |
| 25.2 | 1.0021 | 0.23 | 0.80 | 1.77E−11 | 0.048 | 0.048 |
| 25.0 | 2.4971 | 1.20 | 2.13 | 1.86E−11 | 0.119 | 0.118 |
| 25.0 | 3.9999 | 2.58 | 3.55 | 2.27E−11 | 0.186 | 0.185 |
| 25.0 | 5.5008 | 4.07 | 5.04 | 3.13E−11 | 0.247 | 0.246 |
| 25.0 | 6.9964 | 5.64 | 6.64 | 3.81E−11 | 0.306 | 0.306 |
| 25.0 | 8.5027 | 7.52 | 8.33 | 2.86E−11 | 0.360 | 0.362 |
| 25.0 | 10.0022 | 9.27 | 10.35 | 6.37E−11 | 0.417 | 0.416 |

EXAMPLE 9

Solubility of difluoromethane (HFC-32) in 1,3-dioctylimidazolium iodide ([doim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 12 provides data for $C_o$, $C_s$, D, $X_{calc}$, and $X_{meas}$ at a temperature of 25° C.

TABLE 12

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.03 | 0.11 | 1.78E−11 | 0.009 | 0.007 |
| 25.0 | 1.0010 | 0.29 | 0.87 | 2.11E−11 | 0.066 | 0.064 |
| 25.0 | 2.5003 | 1.29 | 2.17 | 2.35E−11 | 0.152 | 0.150 |
| 25.0 | 4.0024 | 2.62 | 3.51 | 2.91E−11 | 0.227 | 0.225 |
| 25.0 | 5.5024 | 4.03 | 4.93 | 3.54E−11 | 0.295 | 0.293 |
| 25.0 | 7.0010 | 5.51 | 6.43 | 4.25E−11 | 0.357 | 0.355 |
| 24.9 | 8.4988 | 7.12 | 8.07 | 5.00E−11 | 0.415 | 0.413 |
| 25.0 | 10.0024 | 8.83 | 9.85 | 5.77E−11 | 0.469 | 0.468 |

EXAMPLE 10

Solubility of difluoromethane (HFC-32) in 1,2-dimethyl-3-propylimidazolium tris(trifluoromethylsulfonyl)methide ([dmpim][tTFMSmethide] or [dmpim][TMeM])

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 13 provides data for $C_o$, $C_s$, D, $X_{calc}$, and $X_{meas}$ at a temperature of 25° C.

TABLE 13

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0967 | 0.01 | 0.08 | 1.83E−11 | 0.008 | 0.009 |
| 25.0 | 0.9892 | 0.29 | 0.99 | 1.61E−10 | 0.096 | 0.095 |
| 25.0 | 2.4952 | 1.55 | 2.65 | 2.24E−11 | 0.224 | 0.222 |
| 25.0 | 4.0143 | 3.41 | 4.55 | 3.01E−11 | 0.335 | 0.333 |
| 25.0 | 5.5086 | 4.97 | 6.60 | 4.06E−11 | 0.428 | 0.428 |
| 25.0 | 6.9964 | 7.98 | 9.07 | 1.04E−10 | 0.513 | 0.513 |
| 25.0 | 8.4769 | 11.13 | 11.93 | 1.51E−10 | 0.589 | 0.589 |
| 25.0 | 10.0008 | 14.53 | 15.53 | 1.92E−10 | 0.660 | 0.660 |

EXAMPLE 11

Solubility of difluoromethane (HFC-32) in 1,2-dimethyl-3-propylimidazolium bis(trifluoromethylsulfonyl)imide ([dmpim][bTFMSimide] or [dmpim][BMeI])

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 14 provides data for $C_o$, $C_s$, D, $X_{calc}$, and $X_{meas}$ at a temperature of 25° C.

TABLE 14

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0989 | 0.02 | 0.11 | 6.31E−11 | 0.008 | 0.008 |
| 25.0 | 0.9951 | 0.65 | 1.22 | 6.60E−11 | 0.091 | 0.090 |
| 25.0 | 2.4949 | 2.44 | 3.25 | 8.94E−11 | 0.213 | 0.212 |
| 25.0 | 3.9762 | 4.62 | 5.46 | 1.21E−10 | 0.317 | 0.317 |
| 25.0 | 5.5013 | 7.08 | 8.00 | 1.46E−10 | 0.412 | 0.412 |
| 25.0 | 7.0174 | 10.02 | 10.92 | 1.75E−10 | 0.497 | 0.496 |

TABLE 14-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 8.5131 | 13.56 | 14.29 | 2.23E−10 | 0.573 | 0.573 |
| 25.0 | 10.0108 | 17.55 | 18.41 | 2.33E−10 | 0.645 | 0.645 |

EXAMPLE 12

Preparation of 1,3-dioctylimidazolium iodide [ooim][I]

1,3-Dioctylimidazolium iodide [ooim][I] was prepared as described by L. Xu, et al., Journal of Organometallic Chemistry, 2000, 598, 409-416:

Imidazole (2.72 g; 0.04 mmol) and octyl bromide (3.1 g; 0.016 mmol) were dissolved in 55 ml of ethyl acetate. The mixture was refluxed under a nitrogen blanket. Initially, the solution was clear and colorless, however upon refluxing approximately 1 hour the mixture became cloudy with a tannish color. The mixture was allowed to reflux overnight. The mixture was then cooled to room temperature (RT) upon which a white precipitate formed. The mixture was extracted with water (2×: 30 ml). After drying the solvent with magnesium sulfate, the solvent was removed using a vacuum, yielding a tannish oil.

To the oily residue was added 60 ml of toluene followed by 1-iodoctane (4.8 g; 0.02). The mixture was refluxed overnight under a nitrogen blanket, resulting in a dark yellow mixture. The yellow oil was collected via a separation funnel rinsed with toluene (2×: 20 ml) and dried under vacuum.

EXAMPLE 13

Preparation of 1-methyl-3-octylimidazolium iodide [omim][I]

1-Methyl-3-octylimidazolium iodide [omim][I] was prepared as described by L. Xu, et al. (Journal of Organometallic Chemistry, 2000, 598, 409-416):

1-Methylimidazole (1.65 g; 0.02 mmol) and 1-iodoctane (5.31 g; 0.022 mmol) were dissolved in 30 ml of toluene. The reaction was refluxed, whereupon the mixture immediately became yellow in color and cloudy. The mixture was refluxed overnight, during which a yellowish oily precipitate formed. The yellowish oil was collected and dried under vacuum.

EXAMPLE 14

The description of the microbalance components shown in FIG. 10 are provided in Table 15.

TABLE 15

Microbalance Components Contributing to Buoyancy Calculation

| Subscript | Item | Weight (g) | Material | Density (g·cm⁻³) | Temperature (° C.) |
|---|---|---|---|---|---|
| s | Dry sample | $m_s$ | [bmim][PF₆] [bmim][BF₄] | $\rho_s$ | Sample Temp. ($T_s$) |
| a | Interacted gas | $m_a$ | $CO_2$ | $\rho_a$ | ($T_s$) |
| $i_1$ | Sample container | 0.5986 | Pyrex | 2.23 | ($T_s$) |
| $i_2$ | Wire | 0.051 | Tungsten | 21.0 | ($T_s$) |
| $i_3$ | Chain | 0.3205 | Gold | 19.3 | 30 |
| $j_1$ | Counter-weight | 0.8054 | Stainless Steel | 7.9 | 25 |
| $j_2$ | Hook | 0.00582 | Tungsten | 21.0 | 25 |
| $j_3$ | Chain | 0.2407 | Gold | 19.3 | 30 |

EXAMPLE 15

Solubility of difluoromethane (HFC-32) in 1-ethyl-3-methylimidazolium bis(pentafluoroethylsulfonyl)imide [emim][BEI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 16a, 16b, 16c and 16d provide data for $C_o$, $C_s$, D, $X_{calc}$, and $X_{meas}$ at a temperature of 10° C., 25° C., 50° C., and 75° C., respectively.

TABLE 16a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.101 | 0.06 | 0.15 | 3.79E-11 | 0.014 | 0.014 |
| 10.0 | 1.000 | 1.06 | 1.78 | 4.78E-11 | 0.146 | 0.144 |
| 10.0 | 2.495 | 3.58 | 4.83 | 7.37E-11 | 0.324 | 0.323 |
| 10.0 | 3.995 | 7.14 | 8.52 | 1.17E-10 | 0.468 | 0.467 |
| 10.0 | 5.496 | 11.75 | 13.23 | 1.51E-10 | 0.590 | 0.590 |
| 10.0 | 6.994 | 17.76 | 19.75 | 1.72E-10 | 0.699 | 0.699 |
| 10.0 | 8.505 | 26.95 | 30.37 | 1.67E-10 | 0.805 | 0.799 |

TABLE 16b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.096 | 0.03 | 0.11 | 7.5E-11 | 0.010 | 0.010 |
| 25.0 | 0.997 | 0.71 | 1.22 | 7.9E-11 | 0.104 | 0.104 |
| 25.0 | 2.496 | 2.49 | 3.19 | 1.1E-10 | 0.237 | 0.237 |
| 25.0 | 3.996 | 4.61 | 5.33 | 1.3E-10 | 0.347 | 0.347 |
| 25.0 | 5.493 | 7.03 | 7.75 | 1.6E-10 | 0.443 | 0.442 |
| 25.0 | 6.993 | 9.70 | 10.49 | 1.8E-10 | 0.525 | 0.525 |
| 25.0 | 8.503 | 12.87 | 13.71 | 2.1E-10 | 0.600 | 0.598 |
| 25.0 | 10.005 | 16.49 | 17.56 | 1.7E-10 | 0.668 | 0.666 |

TABLE 16c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.100 | 0.00 | 0.04 | 1.66E-10 | 0.004 | 0.004 |
| 50.0 | 0.997 | 0.49 | 0.65 | 1.34E-10 | 0.058 | 0.059 |
| 50.0 | 2.497 | 1.46 | 1.73 | 1.79E-10 | 0.142 | 0.145 |
| 50.0 | 3.996 | 2.61 | 2.83 | 1.92E-10 | 0.216 | 0.219 |
| 50.0 | 5.495 | 3.82 | 3.98 | 2.19E-10 | 0.281 | 0.285 |
| 50.0 | 6.995 | 4.92 | 5.19 | 2.28E-10 | 0.341 | 0.345 |
| 50.0 | 8.504 | 6.20 | 6.46 | 2.73E-10 | 0.395 | 0.399 |
| 50.0 | 9.993 | 7.54 | 7.81 | 1.62E-10 | 0.444 | 0.449 |

TABLE 16d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.101 | 0.00 | 0.01 | 3.92E-10 | 0.001 | 0.001 |
| 74.9 | 1.000 | 0.32 | 0.41 | 2.60E-10 | 0.038 | 0.038 |
| 74.9 | 2.501 | 0.99 | 1.10 | 3.32E-10 | 0.095 | 0.095 |
| 74.9 | 3.992 | 1.72 | 1.79 | 3.96E-10 | 0.147 | 0.146 |
| 74.9 | 5.496 | 2.39 | 2.49 | 3.53E-10 | 0.194 | 0.194 |
| 74.9 | 6.996 | 3.08 | 3.22 | 3.41E-10 | 0.239 | 0.239 |
| 74.9 | 8.504 | 3.87 | 3.96 | 3.48E-10 | 0.280 | 0.280 |
| 74.9 | 9.994 | 4.55 | 4.70 | 1.92E-10 | 0.318 | 0.317 |

EXAMPLE 16

Solubility of difluoromethane (HFC-32) in 3-methyl-1-propylpyridinium bis(trifluoromethylsulfonyl)imide [pmpy][BMeI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 17a, 17b, 17c, and 17d provide data for $C_o$, $C_s$, D, $X_{calc}$, and $X_{meas}$ at a temperature of 10° C., 25° C., 50° C., and 75° C., respectively.

TABLE 17a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1021 | 0.08 | 0.02 | 5.76E-11 | 0.002 | 0.015 |
| 10.0 | 1.0001 | 1.03 | 2.01 | 5.72E-11 | 0.141 | 0.140 |
| 10.0 | 2.4942 | 3.95 | 5.31 | 1.05E-10 | 0.310 | 0.311 |
| 10.0 | 3.9963 | 7.78 | 9.35 | 1.28E-10 | 0.452 | 0.452 |
| 10.0 | 5.4935 | 12.68 | 14.05 | 2.89E-10 | 0.567 | 0.570 |
| 10.0 | 6.9960 | 18.73 | 20.79 | 2.01E-10 | 0.678 | 0.679 |
| 10.0 | 8.4951 | 27.80 | 30.88 | 2.71E-10 | 0.781 | 0.778 |

TABLE 17b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0951 | 0.02 | 0.12 | 9.96E-11 | 0.010 | 0.010 |
| 24.9 | 1.0020 | 0.74 | 1.32 | 1.00E-10 | 0.097 | 0.096 |
| 24.9 | 2.5034 | 2.67 | 3.44 | 1.20E-10 | 0.222 | 0.221 |
| 24.9 | 3.9959 | 4.93 | 5.73 | 1.52E-10 | 0.327 | 0.328 |
| 24.9 | 5.4973 | 7.52 | 8.30 | 1.92E-10 | 0.420 | 0.419 |
| 24.9 | 6.9923 | 10.35 | 11.16 | 2.20E-10 | 0.501 | 0.502 |
| 24.9 | 8.4965 | 13.61 | 14.48 | 2.41E-10 | 0.575 | 0.575 |
| 24.9 | 10.0044 | 17.35 | 18.06 | 6.21E-10 | 0.638 | 0.639 |

TABLE 17c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.1025 | 0.04 | 0.08 | 2.10E-10 | 0.007 | 0.007 |
| 50.0 | 1.0031 | 0.59 | 0.76 | 1.86E-10 | 0.058 | 0.058 |
| 50.0 | 2.4979 | 1.64 | 1.93 | 2.01E-10 | 0.136 | 0.137 |
| 50.0 | 4.0004 | 2.82 | 3.11 | 2.80E-10 | 0.205 | 0.206 |
| 50.0 | 5.4945 | 4.05 | 4.36 | 2.37E-10 | 0.268 | 0.270 |
| 50.0 | 6.9935 | 5.39 | 5.64 | 3.50E-10 | 0.323 | 0.326 |
| 50.0 | 8.5031 | 6.71 | 6.97 | 3.95E-10 | 0.375 | 0.378 |
| 50.0 | 9.9939 | 8.06 | 8.44 | 2.30E-10 | 0.425 | 0.427 |

TABLE 17d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1026 | 0.03 | 0.04 | 3.94E−10 | 0.003 | 0.003 |
| 74.9 | 1.0023 | 0.04 | 0.46 | 3.89E−10 | 0.036 | 0.037 |
| 74.9 | 2.5020 | 1.06 | 1.19 | 3.96E−10 | 0.088 | 0.089 |
| 74.9 | 4.0021 | 1.77 | 1.91 | 4.00E−10 | 0.135 | 0.138 |
| 74.9 | 5.4931 | 2.53 | 2.65 | 3.62E−10 | 0.179 | 0.183 |
| 74.9 | 7.0026 | 3.27 | 3.39 | 4.62E−10 | 0.219 | 0.223 |
| 74.9 | 8.4935 | 4.04 | 4.15 | 4.76E−10 | 0.257 | 0.262 |
| 74.9 | 10.0019 | 4.76 | 4.91 | 5.48E−10 | 0.293 | 0.300 |

EXAMPLE 17

Solubility of trifluoromethane (HFC-23) in 1-butyl-3-methylimidazolium hexafluorophosphate [bmim][PF$_6$]

A solubility and diffusivity study was made at a temperature of 10, 25, 50, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 18a, 18b, 18c, and 18d provide data for $C_o$, $C_s$, D, $X_{calc}$, and $X_{meas}$ at a temperature of 10° C., 25° C., 50° C., and 75° C., respectively.

TABLE 18a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.4 | 0.0962 | — | — | — | — | 0.000 |
| 9.4 | 0.5000 | 0.00 | 0.25 | 1.54E−11 | 0.010 | 0.010 |
| 9.6 | 1.0979 | — | — | — | — | 0.028 |
| 9.5 | 4.0003 | 1.56 | 3.05 | 1.54E−11 | 0.113 | 0.113 |
| 9.4 | 7.0000 | 4.14 | 5.76 | 2.17E−11 | 0.199 | 0.198 |
| 9.5 | 9.9934 | 7.15 | 8.81 | 2.89E−11 | 0.282 | 0.281 |
| 9.5 | 12.9972 | 10.59 | 12.22 | 4.26E−11 | 0.361 | 0.361 |
| 9.5 | 14.9964 | 13.48 | 14.81 | 5.68E−11 | 0.414 | 0.414 |
| 10.0 | 20.0017 | — | — | — | — | 0.528 |

TABLE 18b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0991 | — | — | — | — | 0.000 |
| 24.9 | 0.4972 | 0.03 | 0.19 | 2.56E−11 | 0.008 | 0.008 |
| 24.9 | 0.9994 | 0.24 | 0.44 | 3.22E−11 | 0.018 | 0.018 |
| 24.9 | 3.9934 | 1.17 | 2.08 | 2.37E−11 | 0.080 | 0.079 |
| 24.9 | 6.9953 | 2.86 | 3.79 | 3.01E−11 | 0.138 | 0.137 |
| 24.9 | 10.0041 | 4.68 | 5.59 | 3.95E−11 | 0.194 | 0.193 |
| 24.9 | 13.0056 | 6.66 | 7.52 | 3.89E−11 | 0.248 | 0.247 |
| 25.0 | 15.0000 | 8.09 | 8.80 | 5.73E−11 | 0.281 | 0.281 |
| 24.9 | 19.9990 | 11.36 | 12.49 | 7.12E−11 | 0.367 | 0.367 |

TABLE 18c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0981 | 0.00 | 0.01 | 6.34E−11 | 0.000 | 0.000 |
| 50.0 | 0.4984 | 0.03 | 0.11 | 6.26E−11 | 0.005 | 0.005 |
| 50.0 | 0.9961 | 0.17 | 0.27 | 7.35E−11 | 0.011 | 0.011 |
| 50.0 | 3.9965 | 0.89 | 1.27 | 5.88E−11 | 0.049 | 0.049 |
| 50.0 | 7.0036 | 1.90 | 2.25 | 6.74E−11 | 0.085 | 0.085 |
| 50.0 | 10.0041 | 2.92 | 3.27 | 8.02E−11 | 0.121 | 0.120 |
| 50.0 | 12.9931 | 3.95 | 4.29 | 7.47E−11 | 0.154 | 0.154 |
| 50.0 | 15.0015 | 4.69 | 5.01 | 1.16E−10 | 0.176 | 0.176 |
| 50.0 | 19.9932 | 6.41 | 6.78 | 1.08E−10 | 0.228 | 0.227 |

TABLE 18d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0965 | — | — | — | — | 0.001 |
| 74.9 | 0.4973 | 0.03 | 0.08 | 8.13E−11 | 0.003 | 0.003 |
| 74.9 | 0.9975 | 0.12 | 0.21 | 1.22E−10 | 0.008 | 0.008 |
| 74.9 | 3.9971 | 0.63 | 0.84 | 1.04E−10 | 0.033 | 0.033 |
| 74.9 | 7.0016 | 1.45 | 1.42 | 2.86E−12 | 0.055 | 0.057 |
| 75.0 | 9.9934 | 1.92 | 2.08 | 1.08E−10 | 0.079 | 0.080 |
| 74.9 | 13.0031 | 2.55 | 2.72 | 2.23E−10 | 0.102 | 0.103 |
| 74.9 | 14.9943 | 2.98 | 3.17 | 1.09E−10 | 0.117 | 0.118 |
| 74.9 | 19.9998 | 4.00 | 4.22 | 2.31E−10 | 0.152 | 0.146 |

EXAMPLE 18

Solubility of trifluoromethane (HFC-23) in 1-ethyl-3-methylimidazolium hexafluorophosphate [emim][PF$_6$]

A solubility and diffusivity study was made at a temperature of 60, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 19a and 19b provide data for $C_o$, $C_s$, D, $X_{calc}$, and $X_{meas}$ at a temperature of 60° C., and 75° C., respectively.

TABLE 19a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 59.9 | 0.0992 | — | — | — | — | 0.000 |
| 59.9 | 0.4997 | 0.03 | 0.09 | 1.23E−10 | 0.003 | 0.003 |
| 59.9 | 0.9973 | 0.13 | 0.20 | 1.28E−10 | 0.007 | 0.007 |
| 59.9 | 4.0026 | 0.76 | 0.86 | 1.21E−10 | 0.031 | 0.030 |
| 59.9 | 6.9974 | 1.30 | 1.50 | 1.58E−10 | 0.053 | 0.053 |
| 59.9 | 10.0001 | 2.02 | 2.18 | 1.12E−10 | 0.075 | 0.076 |
| 60.0 | 12.9920 | 2.71 | 2.86 | 2.55E−10 | 0.097 | 0.098 |
| 59.9 | 15.0002 | 3.20 | 3.35 | 1.68E−10 | 0.113 | 0.113 |
| 59.9 | 19.9990 | 4.39 | 4.54 | 3.12E−10 | 0.148 | 0.151 |

TABLE 19b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0965 | 0.02 | 0.02 | 1.12E−10 | 0.001 | 0.001 |
| 74.9 | 0.4982 | — | — | — | — | 0.002 |
| 74.9 | 0.9998 | 0.12 | 0.16 | 1.94E−10 | 0.006 | 0.006 |
| 74.9 | 4.0035 | 0.56 | 0.65 | 2.18E−10 | 0.023 | 0.024 |

TABLE 19b-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 6.9933 | 1.06 | 1.14 | 1.17E−10 | 0.040 | 0.040 |
| 74.9 | 10.0041 | 1.56 | 1.65 | 2.73E−10 | 0.058 | 0.057 |
| 75.0 | 12.9969 | 2.00 | 2.16 | 1.02E−10 | 0.075 | 0.074 |
| 74.9 | 15.0041 | 2.47 | 2.49 | 7.22E−10 | 0.085 | 0.083 |
| 75.0 | 19.9939 | — | — | — | — | 0.116 |

EXAMPLE 19

Solubility of difluoromethane (HFC-32) in 1-ethyl-3-methylimidazolium bis(trifluoroethylsulfonyl)imide [emim][BMeI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 20a, 20b, 20c, and 20d provide data for $C_o$, $C_s$, D, $X_{calc.}$, and $X_{meas}$ at a temperature of 10° C., 25° C., 50° C., and 75° C., respectively.

TABLE 20a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1015 | 0.11 | 0.19 | 6.94E−11 | 0.014 | 0.014 |
| 10.0 | 1.0012 | 1.12 | 2.06 | 8.72E−11 | 0.137 | 0.136 |
| 10.0 | 2.5030 | 4.25 | 5.55 | 1.18E−10 | 0.306 | 0.305 |
| 10.0 | 3.9929 | 8.20 | 9.58 | 1.50E−10 | 0.444 | 0.446 |
| 10.0 | 5.4925 | 13.38 | 14.83 | 1.78E−10 | 0.567 | 0.567 |
| 10.0 | 7.0043 | 19.75 | 21.63 | 2.36E−10 | 0.675 | 0.668 |
| 10.0 | 8.4935 | 27.92 | 31.92 | 1.24E−10 | 0.779 | 0.785 |

TABLE 20b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0959 | 0.09 | 0.13 | 8.36E−11 | 0.010 | 0.010 |
| 25.0 | 0.9981 | 0.86 | 1.38 | 1.22E−10 | 0.095 | 0.095 |
| 25.0 | 2.5024 | 2.88 | 3.56 | 1.61E−10 | 0.217 | 0.217 |
| 25.0 | 3.9937 | 5.27 | 5.97 | 1.56E−10 | 0.323 | 0.323 |
| 25.0 | 5.4940 | 7.90 | 8.60 | 2.00E−10 | 0.414 | 0.414 |
| 25.0 | 6.9946 | 10.77 | 11.53 | 2.33E−10 | 0.495 | 0.495 |
| 25.0 | 8.4952 | 14.06 | 14.80 | 3.24E−10 | 0.566 | 0.565 |
| 25.0 | 9.9967 | 17.74 | 18.58 | 3.20E−10 | 0.632 | 0.637 |

TABLE 20c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.1022 | 0.04 | 0.07 | 3.03E−10 | 0.005 | 0.005 |
| 50.0 | 1.0029 | 0.55 | 0.77 | 2.18E−10 | 0.055 | 0.055 |
| 50.0 | 2.4972 | 1.71 | 1.98 | 2.19E−10 | 0.132 | 0.132 |
| 50.0 | 4.0011 | 2.95 | 3.21 | 2.86E−10 | 0.199 | 0.199 |
| 50.0 | 5.4949 | 4.22 | 4.50 | 2.47E−10 | 0.261 | 0.262 |
| 50.0 | 7.0033 | 5.52 | 5.80 | 3.97E−10 | 0.316 | 0.316 |
| 50.0 | 8.5044 | 6.93 | 7.20 | 2.90E−10 | 0.368 | 0.364 |
| 50.0 | 10.0038 | 8.22 | 8.51 | 3.43E−10 | 0.411 | 0.412 |

TABLE 20d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1028 | 0.01 | 0.03 | 6.36E−10 | 0.002 | 0.002 |
| 74.9 | 0.9981 | 0.36 | 0.46 | 3.41E−10 | 0.034 | 0.034 |
| 74.9 | 2.4971 | 1.09 | 1.21 | 4.21E−10 | 0.084 | 0.084 |
| 74.9 | 3.9948 | 1.82 | 1.96 | 5.11E−10 | 0.130 | 0.130 |
| 74.9 | 5.5026 | 2.60 | 2.71 | 5.24E−10 | 0.173 | 0.173 |
| 74.9 | 6.9919 | 3.37 | 3.49 | 3.22E−10 | 0.213 | 0.213 |
| 74.9 | 8.5039 | 4.16 | 4.28 | 4.63E−10 | 0.252 | 0.251 |
| 74.9 | 10.0045 | 5.10 | 5.10 | 4.75E−09 | 0.288 | 0.284 |

EXAMPLE 20

Solubility of difluoromethane (HFC-32) in 1-butyl-3-methylpyridinium bis(trifluoromethylsulfonyl)imide [bmpy][BMeI]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 21.

TABLE 21

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0961 | 0.04 | 0.12 | 6.81E−11 | 0.010 | 0.010 |
| 25.0 | 0.9950 | 0.66 | 1.32 | 7.82E−11 | 0.097 | 0.100 |
| 25.0 | 2.4949 | 2.58 | 3.38 | 1.21E−10 | 0.219 | 0.223 |
| 25.0 | 3.9948 | 4.76 | 5.59 | 1.49E−10 | 0.321 | 0.329 |
| 25.0 | 5.4962 | 7.25 | 8.10 | 1.53E−10 | 0.414 | 0.424 |
| 25.0 | 7.0055 | — | — | — | — | 0.505 |
| 25.0 | 8.5057 | 13.03 | 14.47 | 1.15E−11 | 0.575 | 0.580 |
| 25.0 | 10.0002 | 17.06 | 18.28 | 2.31E−10 | 0.642 | 0.648 |

EXAMPLE 21

Solubility of difluoromethane (HFC-32) in 1-ethyl-3-methylimidazolium 1,1,2,2-tetrafluoroethanesulfonate [emim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 22.

TABLE 22

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0987 | 0.01 | 0.10 | 4.12E−11 | 0.006 | 0.006 |
| 24.9 | 0.9910 | 0.40 | 1.03 | 3.25E−11 | 0.055 | 0.054 |
| 24.9 | 2.4841 | 2.48 | 2.65 | 2.94E−11 | 0.133 | 0.132 |
| 24.9 | 3.9945 | 3.66 | 4.45 | 4.93E−11 | 0.207 | 0.207 |
| 24.9 | 5.4957 | 5.78 | 6.37 | 5.92E−11 | 0.276 | 0.277 |
| 24.9 | 7.0221 | — | — | — | — | 0.344 |
| 24.9 | 8.4832 | 9.79 | 10.90 | 1.04E−10 | 0.407 | 0.407 |
| 24.9 | 10.0160 | 12.55 | 13.66 | 1.21E−10 | 0.470 | 0.471 |

EXAMPLE 22

Solubility of difluoromethane (HFC-32) in 1-butyl-3-methylimidazolium 1,1,2,2-tetrafluoroethanesulfonate [bmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 23.

TABLE 23

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0967 | 0.02 | 0.12 | 2.37E−11 | 0.007 | 0.007 |
| 25.0 | 0.9986 | 0.99 | 1.29 | 1.47E−11 | 0.075 | 0.072 |
| 25.0 | 2.4997 | 2.19 | 3.31 | 2.67E−11 | 0.174 | 0.171 |
| 25.0 | 3.9716 | 4.33 | 5.40 | 3.95E−11 | 0.260 | 0.261 |
| 25.0 | 5.4838 | 6.84 | 7.78 | 4.76E−11 | 0.342 | 0.342 |
| 25.0 | 6.9946 | 8.98 | 10.39 | 7.75E−11 | 0.416 | 0.416 |
| 25.0 | 8.4811 | 11.98 | 13.27 | 8.73E−11 | 0.485 | 0.485 |
| 25.0 | 9.9886 | 15.07 | 16.62 | 1.35E−10 | 0.551 | 0.550 |

EXAMPLE 23

Solubility of difluoromethane (HFC-32) in 1-dodecyl-3-methylimidazolium 1,1,2,2-tetrafluoroethanesulfonate [dmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 24.

TABLE 24

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0963 | 0.00 | 0.06 | 5.01E−11 | 0.005 | 0.006 |
| 25.0 | 0.9950 | 0.35 | 0.95 | 4.72E−11 | 0.072 | 0.074 |
| 25.0 | 2.5100 | 1.63 | 2.56 | 5.06E−11 | 0.175 | 0.178 |
| 25.0 | 3.9971 | 4.15 | 4.30 | 3.01E−11 | 0.266 | 0.271 |
| 25.0 | 5.4807 | 6.06 | 6.16 | 4.74E−11 | 0.346 | 0.353 |
| 25.0 | 7.0007 | 7.98 | 8.29 | 6.81E−11 | 0.421 | 0.429 |
| 25.0 | 8.5003 | 10.50 | 10.66 | 8.17E−11 | 0.490 | 0.497 |
| 25.0 | 10.0101 | 12.09 | 13.39 | 1.25E−10 | 0.555 | 0.562 |

EXAMPLE 24

Solubility of difluoromethane (HFC-32) in 1-heptyl-3-methylimidazolium 1,1,2,2-tetrafluoroethanesulfonate [hmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 25.

TABLE 25

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0988 | 0.01 | 0.11 | 3.86E−11 | 0.008 | 0.008 |
| 25.0 | 1.0023 | 0.47 | 1.25 | 3.87E−11 | 0.081 | 0.081 |
| 25.0 | 2.5100 | 2.18 | 3.30 | 4.35E−11 | 0.192 | 0.190 |
| 25.0 | 3.9884 | 4.39 | 5.44 | 5.84E−11 | 0.286 | 0.286 |
| 25.0 | 5.4973 | 7.25 | 7.82 | 6.41E−11 | 0.371 | 0.371 |
| 25.0 | 6.9871 | 9.99 | 10.43 | 9.01E−11 | 0.448 | 0.448 |
| 25.0 | 8.4785 | 12.28 | 13.40 | 1.30E−10 | 0.518 | 0.518 |
| 25.0 | 9.9795 | 15.45 | 16.83 | 1.56E−10 | 0.585 | 0.586 |

EXAMPLE 25

Solubility of difluoromethane (HFC-32) in 1-butyl-3-methylimidazolium acetate

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 26.

TABLE 26

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.1 | 0.0985 | 0.09 | 0.25 | 2.19E−11 | 0.010 | 0.010 |
| 25.0 | 0.9968 | 0.72 | 2.17 | 2.64E−11 | 0.078 | 0.077 |
| 25.0 | 2.4979 | 3.25 | 5.30 | 4.05E−11 | 0.176 | 0.174 |
| 25.0 | 4.0040 | 6.59 | 8.59 | 5.64E−11 | 0.264 | 0.258 |
| 25.0 | 5.4984 | 9.83 | 11.70 | 1.02E−10 | 0.335 | 0.333 |
| 25.0 | 6.9974 | 13.24 | 15.00 | 1.46E−10 | 0.402 | 0.397 |
| 24.9 | 8.5016 | 16.74 | 18.36 | 1.83E−10 | 0.462 | 0.456 |
| 25.0 | 10.0044 | 20.30 | 21.89 | 2.10E−10 | 0.516 | 0.511 |

EXAMPLE 26

Solubility of difluoromethane (HFC-32) in 1-butyl-3-methylimidazolium 2-(1,2,2,2-tetrafluoroethoxy)-1,1,2,2-tetrafluoroethanesulfonate [bmim][FS]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 27.

TABLE 27

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0999 | 0.02 | 0.11 | 4.30E-11 | 0.009 | 0.009 |
| 25.0 | 0.9966 | 0.82 | 1.20 | 4.29E-11 | 0.092 | 0.092 |
| 25.0 | 2.5009 | 2.29 | 3.17 | 5.44E-11 | 0.215 | 0.213 |
| 25.0 | 4.0040 | 4.16 | 5.26 | 9.11E-11 | 0.318 | 0.317 |
| 25.0 | 5.4999 | 6.53 | 7.68 | 1.04E-10 | 0.411 | 0.411 |
| 25.0 | 6.9963 | 9.19 | 10.36 | 1.49E-10 | 0.492 | 0.493 |
| 25.0 | 8.4944 | 12.24 | 13.24 | 1.26E-09 | 0.561 | 0.565 |
| 25.0 | 10.0048 | 15.74 | 17.00 | 2.78E-10 | 0.632 | 0.632 |

EXAMPLE 27

Solubility of difluoromethane (HFC-32) in 1-butyl-3-methylimidazolium 1,1,2,3,3,3-hexafluoropropanesulfonate [bmim][HFPS]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 28.

TABLE 28

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0945 | 0.02 | 0.11 | 3.33E-11 | 0.010 | 0.010 |
| 25.0 | 0.9999 | 0.56 | 1.25 | 3.17E-11 | 0.106 | 0.104 |
| 25.0 | 2.4976 | 2.29 | 3.29 | 3.90E-11 | 0.242 | 0.241 |
| 25.0 | 3.9945 | 4.34 | 5.40 | 6.98E-11 | 0.349 | 0.347 |
| 25.0 | 5.4949 | 6.56 | 7.79 | 6.98E-11 | 0.443 | 0.443 |
| 25.0 | 6.9975 | 9.29 | 10.45 | 1.11E-10 | 0.523 | 0.523 |
| 25.0 | 8.4943 | 12.16 | 13.60 | 1.04E-10 | 0.597 | 0.599 |
| 25.0 | 10.0042 | 15.98 | 17.43 | 1.67E-10 | 0.665 | 0.664 |

EXAMPLE 28

Solubility of difluoromethane (HFC-32) in 1-butyl-3-methylimidazolium methyl sulfonate A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 29.

TABLE 29

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0993 | 0.12 | 0.24 | 2.08E-11 | 0.012 | 0.012 |
| 25.0 | 1.0010 | 0.53 | 1.48 | 2.67E-11 | 0.068 | 0.068 |
| 25.0 | 2.4982 | 2.15 | 3.65 | 3.04E-11 | 0.154 | 0.155 |
| 25.0 | 3.9954 | 4.41 | 5.87 | 4.15E-11 | 0.231 | 0.232 |
| 25.1 | 5.5009 | 6.87 | 8.16 | 5.23E-11 | 0.299 | 0.302 |
| 25.0 | 6.9953 | 9.24 | 10.77 | 6.24E-11 | 0.367 | 0.369 |
| 25.0 | 8.5005 | 11.97 | 13.33 | 9.89E-11 | 0.425 | 0.427 |
| 25.0 | 10.0059 | 14.75 | 16.32 | 1.20E-10 | 0.484 | 0.482 |

Solubility of difluoromethane (HFC-32) in 1-butyl-3-methylimidazolium thiocyanate A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 30.

TABLE 30

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0947 | 0.02 | 0.10 | 8.08E-11 | 0.004 | 0.004 |
| 25.0 | 1.0031 | 0.45 | 1.11 | 8.57E-11 | 0.041 | 0.041 |
| 25.0 | 2.5033 | 1.90 | 2.84 | 1.03E-10 | 0.100 | 0.099 |
| 25.0 | 3.9958 | 3.66 | 4.68 | 1.11E-10 | 0.157 | 0.156 |
| 25.0 | 5.4999 | — | — | — | — | 0.212 |
| 25.0 | 6.9966 | 7.62 | 8.73 | 1.42E-10 | 0.266 | 0.267 |
| 25.0 | 8.4947 | 9.93 | 11.01 | 1.83E-10 | 0.319 | 0.320 |
| 25.0 | 9.9919 | 12.30 | 13.55 | 2.05E-10 | 0.373 | 0.373 |

EXAMPLE 30

Solubility of difluoromethane (HFC-32) in 1-butyl-3-methylimidazolium 1,1,2-trifluoro-2-(perfluoroethoxy)ethanesulfonate [bmim][TPES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 31.

TABLE 31

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 25.0 | 0.0951 | 0.02 | 0.12 | 4.46E−11 | 0.010 | 0.010 |
| 25.0 | 1.0007 | 0.58 | 1.35 | 5.27E−11 | 0.103 | 0.102 |
| 25.0 | 2.4964 | 2.43 | 3.56 | 6.70E−11 | 0.236 | 0.236 |
| 25.0 | 3.9947 | 4.81 | 5.94 | 9.64E−11 | 0.346 | 0.346 |
| 25.0 | 5.4938 | 7.52 | 8.62 | 1.20E−10 | 0.442 | 0.442 |
| 25.0 | 6.9941 | 10.49 | 11.65 | 1.49E−10 | 0.525 | 0.525 |
| 25.0 | 8.4946 | 13.93 | 15.15 | 1.78E−10 | 0.600 | 0.599 |
| 25.0 | 9.9937 | 18.00 | 19.36 | 2.06E−10 | 0.668 | 0.668 |

EXAMPLE 31

Solubility of difluoromethane (HFC-32) in 1-butyl-3-methylimidazolium 1,1,2-trifluoro-2-(trifluoromethoxy)ethanesulfonate [bmim][TTES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 32.

TABLE 32

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 25.0 | 0.0947 | 0.02 | 0.13 | 4.26E−11 | 0.010 | 0.010 |
| 25.0 | 1.0031 | 0.57 | 1.42 | 4.51E−11 | 0.097 | 0.096 |
| 25.0 | 2.5033 | 2.40 | 3.71 | 5.83E−11 | 0.222 | 0.222 |
| 25.0 | 3.9958 | 4.92 | 6.28 | 7.11E−11 | 0.332 | 0.332 |
| 25.0 | 5.4999 | 7.79 | 9.04 | 9.96E−11 | 0.425 | 0.424 |
| 25.0 | 6.9966 | 10.71 | 12.12 | 1.23E−10 | 0.506 | 0.506 |
| 25.0 | 8.4947 | 14.21 | 15.63 | 1.59E−10 | 0.579 | 0.578 |
| 25.0 | 9.9919 | 18.20 | 19.62 | 2.51E−10 | 0.644 | 0.644 |

EXAMPLE 32

Solubility of 1,1,1,2-tetrafluoroethane (HFC-134a) in 1-butyl-3-methylimidazolium 1,1,2-trifluoro-2-(trifluoromethoxy)ethanesulfonate [bmim][TTES]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 33a, 33b, 33c, and 33d provide data for $C_o$, $C_s$, D, $X_{calc.}$, and $X_{meas.}$ at a temperature of 10° C., 25° C., 50° C., and 75° C., respectively.

TABLE 33a

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 10.0 | 0.1025 | 0.08 | 0.66 | 1.04E−11 | 0.025 | 0.026 |
| 10.0 | 0.5002 | 0.97 | 3.29 | 1.25E−11 | 0.114 | 0.117 |
| 10.0 | 1.0027 | 4.03 | 7.05 | 1.62E−11 | 0.223 | 0.225 |
| 10.0 | 1.5018 | 7.93 | 11.31 | 2.16E−11 | 0.326 | 0.326 |
| 9.9 | 2.0022 | 12.23 | 16.25 | 3.26E−11 | 0.424 | 0.424 |
| 10.0 | 2.5048 | 17.58 | 22.11 | 5.31E−11 | 0.518 | 0.514 |
| 10.0 | 2.9946 | 23.87 | 30.15 | 5.28E−11 | 0.620 | 0.628 |
| 10.0 | 3.5047 | 36.32 | 44.43 | 7.71E−11 | 0.752 | 0.745 |

TABLE 33b

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 24.9 | 0.1018 | 1.51 | 0.35 | 1.19E−11 | 0.013 | 0.017 |
| 24.9 | 0.5032 | 0.77 | 2.07 | 2.17E−11 | 0.074 | 0.075 |

TABLE 33b-continued

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 25.1 | 1.0024 | 2.52 | 4.22 | 2.60E−11 | 0.143 | 0.143 |
| 24.8 | 1.5015 | 4.77 | 6.52 | 3.00E−11 | 0.209 | 0.208 |
| 25.0 | 2.0032 | 7.17 | 9.00 | 3.27E−11 | 0.272 | 0.271 |
| 25.0 | 2.5035 | 9.59 | 11.56 | 4.43E−11 | 0.331 | 0.331 |
| 24.9 | 3.0013 | 12.31 | 14.44 | 5.05E−11 | 0.390 | 0.389 |
| 24.8 | 3.5010 | 15.87 | 17.69 | 4.50E−11 | 0.449 | 0.450 |

TABLE 33c

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 50.0 | 0.1048 | 0.17 | 0.25 | 5.76E−11 | 0.009 | 0.009 |
| 50.0 | 0.5031 | 0.47 | 1.06 | 5.35E−11 | 0.039 | 0.039 |
| 50.0 | 1.0023 | 1.37 | 2.11 | 5.79E−11 | 0.076 | 0.076 |
| 50.0 | 1.5021 | 2.43 | 3.19 | 6.35E−11 | 0.111 | 0.111 |
| 50.0 | 2.0026 | 3.50 | 4.28 | 6.64E−11 | 0.145 | 0.145 |
| 50.0 | 2.5033 | 4.67 | 5.41 | 6.97E−11 | 0.178 | 0.179 |
| 50.0 | 3.0035 | 5.81 | 6.58 | 7.24E−11 | 0.211 | 0.211 |
| 50.0 | 3.5016 | 7.22 | 7.78 | 6.89E−11 | 0.242 | 0.243 |

TABLE 33d

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 75.0 | 0.1031 | 0.06 | 0.13 | 1.04E−10 | 0.005 | 0.005 |
| 74.9 | 0.5054 | 0.31 | 0.62 | 1.18E−10 | 0.023 | 0.023 |
| 74.9 | 1.0049 | 0.85 | 1.23 | 1.22E−10 | 0.045 | 0.045 |
| 74.9 | 1.5029 | 1.49 | 1.85 | 1.21E−10 | 0.067 | 0.067 |
| 74.9 | 2.0041 | 2.10 | 2.46 | 1.25E−10 | 0.087 | 0.087 |
| 74.9 | 2.5042 | 2.71 | 3.08 | 1.26E−10 | 0.107 | 0.108 |
| 74.9 | 3.0024 | 3.33 | 3.72 | 1.38E−10 | 0.128 | 0.128 |
| 74.9 | 3.5039 | 4.19 | 4.36 | 1.09E−10 | 0.147 | 0.147 |

EXAMPLE 33

Solubility of 1,1,1,2-tetrafluoroethane (HFC-134a) in 1-butyl-3-methylimidazolium 1,1,2-trifluoro-2-(perfluoroethoxy)ethanesulfonate [bmim][TPES]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 34a, 34b, 34c, and 34d provide data for $C_o$, $C_s$, D, $X_{calc.}$, and $X_{meas}$ at a temperature of 10° C., 25° C., 50° C., and 75° C., respectively.

TABLE 34a

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 10.0 | 0.1024 | 0.06 | 0.66 | 9.33E−12 | 0.028 | 0.028 |
| 10.0 | 0.5038 | 1.01 | 3.39 | 1.15E−11 | 0.131 | 0.132 |
| 10.0 | 1.0043 | 4.05 | 7.26 | 1.71E−11 | 0.251 | 0.253 |
| 9.9 | 1.5033 | 8.17 | 11.65 | 2.53E−11 | 0.361 | 0.362 |
| 10.0 | 2.0022 | 12.78 | 16.90 | 3.67E−11 | 0.465 | 0.464 |
| 10.0 | 2.5024 | 18.33 | 23.30 | 5.37E−11 | 0.565 | 0.566 |
| 10.0 | 3.0041 | 25.90 | 32.36 | 7.06E−11 | 0.672 | 0.670 |
| 9.9 | 3.5039 | 38.42 | 47.48 | 6.49E−11 | 0.794 | 0.796 |

TABLE 34b

| T (° C.) | P (bar) | $C_o$ (mass %) | $C_s$ (mass %) | $D_{eff.}$ (m$^2$/sec) | $X_{calc.}$ (mol. fraction) | $X_{meas.}$ (mol. fraction) |
|---|---|---|---|---|---|---|
| 24.9 | 0.1026 | 0.11 | 0.45 | 1.80E−11 | 0.019 | 0.018 |
| 24.9 | 0.5031 | 0.72 | 2.09 | 2.32E−11 | 0.084 | 0.084 |
| 24.9 | 1.0018 | 2.62 | 4.33 | 2.59E−11 | 0.162 | 0.162 |

TABLE 34b-continued

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 24.9 | 1.5015 | 4.92 | 6.70 | 3.23E−11 | 0.235 | 0.235 |
| 24.9 | 2.0029 | 7.33 | 9.23 | 4.14E−11 | 0.303 | 0.303 |
| 24.9 | 2.5038 | 9.92 | 11.93 | 4.99E−11 | 0.367 | 0.366 |
| 24.9 | 3.0034 | 12.73 | 14.93 | 5.74E−11 | 0.429 | 0.428 |
| 24.9 | 3.5012 | 16.44 | 18.40 | 4.94E−11 | 0.491 | 0.490 |

TABLE 34c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1036 | 0.20 | 0.26 | 8.37E−11 | 0.011 | 0.011 |
| 50.0 | 0.5032 | 0.47 | 1.10 | 5.99E−11 | 0.045 | 0.045 |
| 50.0 | 1.0023 | 1.52 | 2.20 | 5.66E−11 | 0.088 | 0.087 |
| 50.0 | 1.5021 | 2.55 | 3.32 | 6.59E−11 | 0.128 | 0.128 |
| 50.0 | 2.0025 | 3.69 | 4.47 | 6.87E−11 | 0.167 | 0.167 |
| 50.0 | 2.5035 | 4.90 | 5.66 | 7.37E−11 | 0.204 | 0.204 |
| 50.0 | 3.0042 | 6.08 | 6.87 | 8.56E−11 | 0.240 | 0.240 |
| 50.0 | 3.5035 | 7.49 | 8.10 | 8.02E−11 | 0.274 | 0.274 |

TABLE 34d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 74.9 | 0.1051 | 0.11 | 0.15 | 1.09E−10 | 0.006 | 0.006 |
| 74.9 | 0.5052 | 0.34 | 0.65 | 1.19E−10 | 0.027 | 0.027 |
| 74.9 | 1.0054 | 0.92 | 1.29 | 1.22E−10 | 0.053 | 0.053 |
| 75.0 | 1.5046 | 1.90 | 1.93 | 1.93E−09 | 0.078 | 0.078 |
| 74.7 | 2.0056 | 2.25 | 2.59 | 1.05E−10 | 0.102 | 0.102 |
| 74.9 | 2.5053 | 2.88 | 3.22 | 1.50E−10 | 0.124 | 0.125 |
| 74.9 | 3.0041 | 3.56 | 3.90 | 1.30E−10 | 0.148 | 0.148 |
| 74.9 | 3.5051 | 4.34 | 4.56 | 1.42E−10 | 0.170 | 0.170 |

EXAMPLE 34

Solubility of 1,1,1,2-tetrafluoroethane (HFC-134a) in 1-ethyl-3-methylimidazolium bis(pentafluoroethylsulfonyl)imide [emim][BEI]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 35a, 35b, 35c, and 35d provide data for $C_o$, $C_s$, D, $X_{calc}$, and $X_{meas}$ at a temperature of 10° C., 25° C., 50° C., and 75° C., respectively.

TABLE 35a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 10.0 | 0.1031 | 0.09 | 0.61 | 1.92E−11 | 0.029 | 0.024 |
| 10.0 | 0.5039 | 1.21 | 2.51 | 4.25E−07 | 0.110 | 0.120 |
| 10.0 | 1.0027 | 4.05 | 6.65 | 2.95E−11 | 0.255 | 0.239 |
| 10.0 | 1.5024 | 7.74 | 10.72 | 3.68E−11 | 0.366 | 0.354 |
| 10.0 | 2.0011 | 12.01 | 15.61 | 4.88E−11 | 0.471 | 0.464 |
| 10.0 | 2.5009 | 17.79 | 21.74 | 6.58E−11 | 0.572 | 0.569 |
| 10.0 | 3.0043 | 24.67 | 30.25 | 8.67E−11 | 0.676 | 0.668 |
| 10.0 | 3.5049 | 37.47 | 44.30 | 6.14E−11 | 0.793 | 0.793 |

TABLE 35b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 24.9 | 0.1054 | 0.21 | 0.42 | 2.60E−11 | 0.020 | 0.019 |
| 24.9 | 0.5052 | 0.82 | 1.92 | 3.76E−11 | 0.086 | 0.086 |
| 24.9 | 1.0046 | 2.55 | 3.90 | 4.22E−11 | 0.163 | 0.163 |
| 24.9 | 1.5040 | 4.69 | 6.02 | 4.77E−11 | 0.236 | 0.235 |
| 24.9 | 2.0037 | 6.73 | 8.29 | 5.70E−11 | 0.303 | 0.304 |
| 24.9 | 2.5031 | 9.15 | 10.79 | 6.65E−11 | 0.368 | 0.368 |
| 24.9 | 3.0043 | 11.73 | 13.53 | 7.90E−11 | 0.430 | 0.429 |
| 24.9 | 3.5054 | 15.15 | 16.56 | 7.29E−11 | 0.489 | 0.488 |

TABLE 35c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1046 | 0.14 | 0.23 | 5.84E−11 | 0.011 | 0.011 |
| 50.0 | 0.5050 | 0.58 | 1.00 | 6.72E−11 | 0.046 | 0.046 |
| 50.0 | 1.0043 | 1.42 | 1.99 | 8.15E−11 | 0.089 | 0.089 |
| 50.0 | 1.5046 | 2.48 | 3.00 | 7.67E−11 | 0.130 | 0.130 |
| 50.0 | 2.0037 | 3.46 | 4.04 | 8.44E−11 | 0.168 | 0.168 |
| 50.0 | 2.5033 | 4.51 | 5.10 | 8.82E−11 | 0.205 | 0.205 |
| 50.0 | 3.0034 | 5.57 | 6.19 | 9.36E−11 | 0.241 | 0.241 |
| 50.0 | 3.5040 | 6.98 | 7.32 | 8.24E−11 | 0.275 | 0.276 |

TABLE 35d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 74.9 | 0.1044 | 0.10 | 0.13 | 1.30E-10 | 0.006 | 0.006 |
| 74.9 | 0.5057 | 0.37 | 0.58 | 1.36E-10 | 0.027 | 0.027 |
| 74.9 | 1.0042 | 0.87 | 1.16 | 1.35E-10 | 0.053 | 0.053 |
| 74.9 | 1.5043 | 1.48 | 1.73 | 1.32E-10 | 0.078 | 0.078 |
| 74.9 | 2.0041 | 2.01 | 2.30 | 1.49E-10 | 0.102 | 0.102 |
| 74.9 | 2.4957 | 2.60 | 2.88 | 1.42E-10 | 0.125 | 0.125 |
| 74.9 | 3.0049 | 3.22 | 3.47 | 1.69E-10 | 0.148 | 0.147 |
| 74.9 | 3.5027 | 3.89 | 4.06 | 1.17E-10 | 0.169 | 0.169 |

EXAMPLE 35

Solubility of 1,1,1,2-tetrafluoroethane (HFC-134a) in 1-butyl-3-methylimidazolium 1,1,2,3,3-hexafluoropropanesulfonate [bmim][HFPS]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 36a, 36b, 36c, and 36d provide data for $C_o$, $C_s$, D, $X_{calc}$, and $X_{meas}$ at a temperature of 10° C., 25° C., 50° C., and 75° C., respectively.

TABLE 36a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 10.0 | 0.0993 | 0.00 | 0.41 | 1.09E-11 | 0.015 | 0.015 |
| 9.9 | 0.5012 | 0.62 | 2.43 | 8.91E-12 | 0.083 | 0.082 |
| 10.0 | 1.0001 | 2.78 | 5.36 | 1.13E-11 | 0.170 | 0.172 |
| 10.0 | 1.4989 | 5.94 | 8.89 | 1.38E-11 | 0.261 | 0.264 |
| 9.9 | 1.9997 | 9.63 | 12.82 | 2.42E-11 | 0.348 | 0.350 |
| 10.0 | 2.4950 | 13.70 | 18.23 | 2.42E-11 | 0.447 | 0.447 |
| 10.0 | 3.0010 | 19.60 | 24.78 | 4.81E-11 | 0.545 | 0.550 |
| 10.1 | 3.4937 | 27.72 | 36.37 | 7.13E-11 | 0.675 | 0.677 |

TABLE 36b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 24.9 | 0.1007 | -0.02 | 0.26 | 1.61E-11 | 0.009 | 0.011 |
| 24.9 | 0.5000 | 0.50 | 1.75 | 2.46E-11 | 0.061 | 0.055 |
| 24.9 | 1.0002 | 1.80 | 3.22 | 1.51E-11 | 0.108 | 0.109 |
| 24.9 | 1.4995 | 3.60 | 5.07 | 1.50E-11 | 0.162 | 0.163 |
| 24.9 | 1.9931 | 5.36 | 7.12 | 1.78E-11 | 0.218 | 0.220 |
| 25.0 | 2.5041 | 7.52 | 9.10 | 2.66E-11 | 0.267 | 0.269 |
| 24.9 | 3.0042 | 9.65 | 11.44 | 2.46E-11 | 0.319 | 0.322 |
| 24.9 | 3.5020 | 12.23 | 13.92 | 3.10E-11 | 0.370 | 0.374 |

TABLE 36c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1007 | 0.01 | 0.16 | 3.94E-11 | 0.006 | 0.006 |
| 50.0 | 0.5006 | 0.28 | 0.81 | 3.51E-11 | 0.029 | 0.029 |
| 50.0 | 0.9997 | 1.11 | 1.69 | 2.84E-11 | 0.059 | 0.059 |
| 50.0 | 1.4987 | 1.93 | 2.58 | 3.30E-11 | 0.088 | 0.088 |
| 50.0 | 1.9941 | 2.87 | 3.53 | 2.73E-11 | 0.117 | 0.118 |
| 50.0 | 2.5040 | 3.73 | 4.42 | 4.20E-11 | 0.144 | 0.145 |
| 50.0 | 2.9997 | 4.65 | 5.37 | 4.79E-11 | 0.171 | 0.172 |
| 50.0 | 3.5040 | 5.64 | 6.32 | 4.79E-11 | 0.197 | 0.198 |

TABLE 36d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 74.9 | 0.0989 | 0.04 | 0.10 | 5.08E-11 | 0.003 | 0.004 |
| 74.9 | 0.5015 | 0.21 | 0.46 | 2.62E-10 | 0.016 | 0.018 |
| 74.9 | 1.0009 | 0.69 | 1.01 | 6.65E-11 | 0.036 | 0.036 |
| 74.9 | 1.5002 | 1.17 | 1.51 | 7.55E-11 | 0.053 | 0.053 |
| 74.9 | 2.0006 | 1.67 | 2.03 | 6.73E-11 | 0.070 | 0.070 |
| 74.9 | 2.4996 | 2.18 | 2.53 | 8.11E-11 | 0.086 | 0.087 |
| 74.9 | 3.0020 | 2.70 | 3.06 | 8.14E-11 | 0.103 | 0.104 |

EXAMPLE 36

Solubility of 1,1,1,2-tetrafluoroethane (HFC-134a) in tetradecyl(trihexyl) phosphonium 1,1,2-trifluoro-2-(perfluoroethoxy)ethanesulfonate[6,6,6,14-P][TPES]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 37a, 37b, 37c, and 37d provide data for $C_o$, $C_s$, D, $X_{calc}$, and $X_{meas}$ at a temperature of 10° C., 25° C., 50° C., and 75° C., respectively.

TABLE 37a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 10.0 | 0.0993 | 0.10 | 0.52 | 1.65E-11 | 0.038 | 0.038 |
| 9.7 | 0.5001 | 0.87 | 2.99 | 2.04E-11 | 0.190 | 0.190 |
| 9.9 | 1.0005 | 3.55 | 6.26 | 2.72E-11 | 0.338 | 0.338 |
| 9.8 | 1.4988 | 7.01 | 9.95 | 3.28E-11 | 0.458 | 0.452 |
| 10.1 | 1.9940 | 10.46 | 13.72 | 5.63E-11 | 0.549 | 0.551 |
| 9.8 | 2.4956 | 14.69 | 18.30 | 1.01E-10 | 0.631 | 0.634 |
| 9.7 | 2.9998 | 19.78 | 24.52 | 1.23E-10 | 0.713 | 0.718 |
| 9.6 | 3.4947 | 26.93 | 34.29 | 2.24E-10 | 0.800 | 0.799 |

TABLE 37b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 24.9 | 0.1000 | -0.01 | 0.26 | 2.82E-11 | 0.019 | 0.018 |
| 24.9 | 0.5002 | 0.50 | 1.75 | 4.18E-11 | 0.120 | 0.121 |
| 25.0 | 0.9998 | 2.14 | 3.73 | 4.58E-11 | 0.229 | 0.228 |
| 24.9 | 1.4991 | 4.13 | 5.79 | 5.46E-11 | 0.320 | 0.320 |
| 24.9 | 2.0001 | 6.22 | 7.90 | 6.55E-11 | 0.396 | 0.397 |
| 24.9 | 2.5034 | 8.35 | 10.05 | 8.92E-11 | 0.461 | 0.462 |
| 24.9 | 3.0041 | 10.54 | 12.31 | 9.57E-11 | 0.518 | 0.520 |
| 24.9 | 3.5040 | 12.92 | 14.84 | 1.11E-10 | 0.571 | 0.574 |

TABLE 37c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1013 | 0.21 | 0.09 | 1.08E−11 | 0.007 | 0.011 |
| 50.0 | 0.5011 | 0.34 | 0.94 | 9.52E−11 | 0.068 | 0.068 |
| 50.0 | 1.0012 | 1.24 | 1.97 | 9.91E−11 | 0.133 | 0.134 |
| 50.0 | 1.4996 | 2.29 | 3.01 | 1.07E−10 | 0.192 | 0.193 |
| 50.0 | 2.0006 | 3.37 | 4.07 | 9.79E−11 | 0.245 | 0.246 |
| 50.0 | 2.5005 | 4.37 | 5.10 | 1.22E−10 | 0.291 | 0.294 |
| 50.0 | 2.9997 | 5.44 | 6.19 | 1.19E−10 | 0.335 | 0.339 |
| 50.1 | 3.4970 | 6.68 | 7.33 | 1.14E−10 | 0.377 | 0.381 |

TABLE 37d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 74.9 | 0.1011 | 0.00 | 0.03 | 1.84E−10 | 0.002 | 0.003 |
| 74.9 | 0.5019 | 0.22 | 0.52 | 1.81E−10 | 0.039 | 0.039 |
| 74.9 | 1.0009 | 0.77 | 1.16 | 1.97E−10 | 0.082 | 0.083 |
| 74.9 | 1.4959 | 1.41 | 1.77 | 2.08E−10 | 0.121 | 0.122 |
| 74.9 | 2.0012 | 2.03 | 2.40 | 2.27E−10 | 0.158 | 0.160 |
| 74.9 | 2.5033 | 2.65 | 3.03 | 2.28E−10 | 0.193 | 0.194 |
| 74.9 | 3.0034 | 3.30 | 3.65 | 2.05E−10 | 0.225 | 0.227 |
| 74.9 | 3.5051 | 3.96 | 4.27 | 2.13E−10 | 0.254 | 0.256 |

EXAMPLE 37

Solubility of 1,1,1,2-tetrafluoroethane (HFC-134a) in tributyl(tetradecyl)phosphonium 1,1,2,3,3,3-hexafluoropropanesulfonate[4,4,4,14-P][HFPS]

A solubility and diffusivity study was made at a temperature of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 38a, 38b, 38c, and 38d provide data for $C_o$, $C_s$, D, $X_{calc}$, and $X_{meas}$ at a temperature of 10° C., 25° C., 50° C., and 75° C., respectively.

TABLE 38a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 10.2 | 0.0991 | 0.08 | 0.49 | 2.23E−11 | 0.029 | 0.032 |
| 9.9 | 0.5001 | 0.72 | 2.95 | 1.30E−11 | 0.158 | 0.152 |
| 10.2 | 0.9998 | 3.17 | 6.30 | 1.74E−11 | 0.293 | 0.289 |
| 10.0 | 1.4999 | 6.59 | 9.78 | 2.67E−11 | 0.401 | 0.403 |
| 10.0 | 1.9996 | 10.48 | 13.80 | 4.77E−11 | 0.497 | 0.494 |
| 10.0 | 2.5034 | 14.41 | 18.75 | 5.41E−11 | 0.587 | 0.587 |
| 10.0 | 3.0020 | 19.66 | 24.79 | 1.49E−10 | 0.670 | 0.672 |
| 10.1 | 3.4928 | 27.70 | 34.01 | 2.02E−10 | 0.761 | 0.763 |

TABLE 38b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 0.0998 | 0.05 | 0.34 | 1.70E−11 | 0.021 | 0.019 |
| 24.9 | 0.5001 | 0.50 | 1.83 | 2.56E−11 | 0.103 | 0.104 |
| 24.9 | 0.9994 | 2.11 | 3.76 | 3.19E−11 | 0.194 | 0.194 |
| 25.0 | 1.4988 | 4.06 | 5.79 | 3.71E−11 | 0.275 | 0.273 |
| 24.9 | 2.0017 | 6.03 | 8.06 | 3.60E−11 | 0.351 | 0.350 |
| 25.0 | 2.5003 | 8.43 | 10.48 | 4.88E−11 | 0.419 | 0.418 |
| 25.0 | 2.9990 | 10.82 | 12.84 | 7.38E−11 | 0.476 | 0.478 |
| 25.0 | 3.5021 | 13.55 | 15.47 | 1.01E−10 | 0.530 | 0.530 |

TABLE 38c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1009 | 0.00 | 0.17 | 6.85E−11 | 0.010 | 0.010 |
| 50.0 | 0.5001 | 0.32 | 0.96 | 6.65E−11 | 0.056 | 0.056 |
| 50.0 | 0.9994 | 1.20 | 1.99 | 6.73E−11 | 0.111 | 0.110 |
| 50.0 | 1.4992 | 2.24 | 3.04 | 6.51E−11 | 0.162 | 0.161 |
| 50.0 | 2.0003 | 3.31 | 4.09 | 7.46E−11 | 0.208 | 0.209 |
| 50.0 | 2.4945 | 4.29 | 5.16 | 8.18E−11 | 0.251 | 0.254 |
| 50.0 | 2.9994 | 5.46 | 6.22 | 1.11E−10 | 0.290 | 0.293 |
| 50.0 | 3.4964 | 7.54 | 8.32 | 7.36E−11 | 0.359 | 0.333 |

TABLE 38d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 75.0 | 0.1006 | 0.08 | 0.14 | 1.36E−10 | 0.009 | 0.009 |
| 74.9 | 0.5041 | 0.30 | 0.63 | 1.39E−10 | 0.037 | 0.037 |
| 74.9 | 1.0014 | 0.83 | 1.25 | 1.37E−10 | 0.072 | 0.072 |
| 74.9 | 1.5002 | 1.47 | 1.87 | 1.43E−10 | 0.105 | 0.105 |
| 74.9 | 2.0014 | 2.07 | 2.47 | 1.63E−10 | 0.135 | 0.136 |
| 74.9 | 2.5044 | 2.66 | 3.08 | 1.70E−10 | 0.164 | 0.165 |
| 74.9 | 3.0037 | 2.75 | 3.15 | 1.51E−10 | 0.167 | 0.194 |
| 74.9 | 3.5039 | 3.44 | 3.79 | 1.70E−10 | 0.196 | 0.221 |

EXAMPLE 38

Solubility of 1,1,2,2-tetrafluoroethane (HFC-134) in 1-butyl-3-methylimidazolium hexafluorophosphate [bmim][PF$_6$]

A solubility study was made at a temperature of 10, 25, 50, and 75° C. over a pressure range from 0 to 3.5 bar where the solubilities ($X_{meas.}$) were measured using a gravimetric microbalance. Tables 39a, 39b, 39c, and 39d provide data for $X_{meas}$ at a temperature of 10° C., 25° C., 50° C., and 75° C., respectively.

TABLE 39a

| T (° C.) | P (bar) | $X_{meas.}$ (mol. Fraction) |
|---|---|---|
| 10.0 | 0.10 | 0.029 |
| 10.0 | 0.50 | 0.176 |
| 10.0 | 1.00 | 0.357 |
| 10.0 | 1.50 | 0.528 |
| 10.0 | 2.00 | 0.686 |
| 10.0 | 2.50 | 0.814 |
| 10.0 | 3.00 | 0.974 |

TABLE 39b

| T (° C.) | P (bar) | $X_{meas.}$ (mol. Fraction) |
|---|---|---|
| 25.0 | 0.10 | 0.024 |
| 25.0 | 0.50 | 0.116 |
| 25.0 | 1.00 | 0.225 |
| 25.0 | 1.50 | 0.330 |
| 25.0 | 2.00 | 0.428 |
| 25.0 | 2.50 | 0.522 |
| 25.0 | 3.00 | 0.611 |
| 25.0 | 3.50 | 0.689 |

TABLE 39c

| T (° C.) | P (bar) | $X_{meas.}$ (mol. fraction) |
|---|---|---|
| 50.0 | 0.10 | 0.006 |
| 50.0 | 0.50 | 0.049 |
| 50.0 | 1.00 | 0.103 |
| 50.0 | 1.50 | 0.155 |
| 50.0 | 2.00 | 0.205 |
| 50.0 | 2.50 | 0.255 |
| 50.0 | 3.00 | 0.302 |
| 50.0 | 3.50 | 0.346 |

TABLE 39d

| T (° C.) | P (bar) | $X_{meas.}$ (mol. fraction) |
|---|---|---|
| 75.0 | 0.10 | 0.006 |
| 75.0 | 0.50 | 0.029 |
| 75.0 | 1.00 | 0.058 |
| 75.0 | 1.50 | 0.087 |
| 75.0 | 2.00 | 0.114 |
| 75.0 | 2.50 | 0.141 |
| 75.0 | 3.00 | 0.167 |
| 75.0 | 3.50 | 0.196 |

EXAMPLE 39

Solubility of fluoroethane (HFC-161) in 1-butyl-3-methylimidazolium hexafluorophosphate [bmim][$PF_6$]

A solubility study was made at a temperature of 10, 25, 50, and 75° C. over a pressure range from 0 to 7.0 bar where the solubilities ($X_{meas.}$) were measured using a gravimetric microbalance. Tables 40a, 40b, 40c, and 40d provide data for $X_{meas}$ at a temperature of 10° C., 25° C., 50° C., and 75° C., respectively.

TABLE 40a

| T (° C.) | P (bar) | $X_{meas.}$ (mol. Fraction) |
|---|---|---|
| 10.0 | 0.10 | 0.009 |
| 10.0 | 1.00 | 0.107 |
| 10.0 | 2.00 | 0.221 |
| 10.0 | 3.00 | 0.329 |
| 10.0 | 4.00 | 0.443 |
| 10.0 | 5.00 | 0.575 |

TABLE 40b

| T (° C.) | P (bar) | $X_{meas.}$ (mol. Fraction) |
|---|---|---|
| 25.0 | 0.10 | 0.007 |
| 25.0 | 1.00 | 0.073 |
| 25.0 | 2.00 | 0.144 |
| 25.0 | 3.00 | 0.215 |
| 25.0 | 4.00 | 0.283 |
| 25.0 | 5.00 | 0.351 |
| 25.0 | 6.00 | 0.420 |
| 25.0 | 7.00 | 0.496 |

TABLE 40c

| T (° C.) | P (bar) | $X_{meas.}$ (mol. fraction) |
|---|---|---|
| 50.0 | 0.10 | 0.005 |
| 50.0 | 1.00 | 0.041 |
| 50.0 | 2.00 | 0.082 |
| 50.0 | 3.00 | 0.122 |
| 50.0 | 4.00 | 0.160 |
| 50.0 | 5.00 | 0.198 |
| 50.0 | 6.00 | 0.235 |
| 50.0 | 7.00 | 0.270 |

TABLE 40d

| T (° C.) | P (bar) | $X_{meas.}$ (mol. fraction) |
|---|---|---|
| 75.0 | 0.10 | 0.003 |
| 75.0 | 1.00 | 0.025 |
| 75.0 | 2.00 | 0.051 |
| 75.0 | 3.00 | 0.076 |
| 75.0 | 4.00 | 0.100 |
| 75.0 | 5.00 | 0.124 |
| 75.0 | 6.00 | 0.147 |
| 75.0 | 7.00 | 0.170 |

EXAMPLE 40

Solubility of fluoromethane (HFC-41) in 1-butyl-3-methylimidazolium hexafluorophosphate [bmim][$PF_6$]

A solubility study was made at a temperature of 10, 25, 50, and 75° C. over a pressure range from 0 to 20 bar where the solubilities ($X_{meas.}$) were measured using a gravimetric microbalance. Tables 41a, 41b, 41c, and 41d provide data for $X_{meas}$ at a temperature of 10° C., 25° C., 50° C., and 75° C., respectively.

TABLE 41a

| T (° C.) | P (bar) | $X_{meas.}$ (mol. Fraction) |
|---|---|---|
| 10.0 | 0.10 | 0.002 |
| 10.0 | 0.50 | 0.021 |
| 10.0 | 1.00 | 0.044 |
| 10.0 | 4.00 | 0.172 |
| 10.0 | 7.00 | 0.282 |
| 10.0 | 10.0 | 0.378 |
| 10.0 | 13.0 | 0.463 |
| 10.0 | 15.0 | 0.513 |
| 10.0 | 20.0 | 0.637 |

TABLE 41b

| T (° C.) | P (bar) | $X_{meas.}$ (mol. Fraction) |
|---|---|---|
| 25.0 | 0.10 | 0.000 |
| 25.0 | 0.50 | 0.014 |
| 25.0 | 1.00 | 0.031 |
| 25.0 | 4.00 | 0.126 |
| 25.0 | 7.00 | 0.211 |
| 25.0 | 10.0 | 0.286 |
| 25.0 | 13.0 | 0.353 |
| 25.0 | 15.0 | 0.392 |
| 25.0 | 20.0 | 0.484 |

TABLE 41c

| T (° C.) | P (bar) | $X_{meas.}$ (mol. fraction) |
|---|---|---|
| 50.0 | 0.10 | 0.000 |
| 50.0 | 0.50 | 0.006 |
| 50.0 | 1.00 | 0.017 |
| 50.0 | 4.00 | 0.079 |
| 50.0 | 7.00 | 0.135 |
| 50.0 | 10.0 | 0.187 |
| 50.0 | 13.0 | 0.235 |
| 50.0 | 15.0 | 0.264 |
| 50.0 | 20.0 | 0.332 |

TABLE 41d

| T (° C.) | P (bar) | $X_{meas.}$ (mol. fraction) |
|---|---|---|
| 75.0 | 0.10 | 0.002 |
| 75.0 | 0.50 | 0.006 |
| 75.0 | 1.00 | 0.014 |
| 75.0 | 4.00 | 0.056 |
| 75.0 | 7.00 | 0.095 |
| 75.0 | 10.0 | 0.131 |
| 75.0 | 13.0 | 0.166 |
| 75.0 | 15.0 | 0.187 |
| 75.0 | 20.0 | 0.238 |

EXAMPLE 41

Solubility of chlorodifluoromethane (HCFC-22) in 1-butyl-3-methylimidazolium hexafluorophosphate [bmim][$PF_6$]

A solubility study was made at a temperature of 10, 25, 50, and 75° C. over a pressure range from 0 to 4.0 bar where the solubilities ($X_{meas.}$) were measured using a gravimetric microbalance. Tables 42a, 42b, 42c, and 42d provide data for $X_{meas}$ at a temperature of 10° C., 25° C., 50° C., and 75° C., respectively.

TABLE 42a

| T (° C.) | P (bar) | $X_{meas.}$ (mol. Fraction) |
|---|---|---|
| 10.0 | 0.10 | 0.014 |
| 10.0 | 0.50 | 0.076 |
| 10.0 | 1.00 | 0.158 |
| 10.0 | 2.00 | 0.321 |
| 10.0 | 3.00 | 0.465 |
| 10.0 | 4.00 | 0.600 |

TABLE 42b

| T (° C.) | P (bar) | $X_{meas.}$ (mol. Fraction) |
|---|---|---|
| 25.0 | 0.10 | 0.012 |
| 25.0 | 0.50 | 0.053 |
| 25.0 | 1.00 | 0.104 |
| 25.0 | 2.00 | 0.204 |
| 25.0 | 3.00 | 0.299 |
| 25.0 | 4.00 | 0.390 |

TABLE 42c

| T (° C.) | P (bar) | $X_{meas.}$ (mol. fraction) |
|---|---|---|
| 50.0 | 0.10 | 0.005 |
| 50.0 | 0.50 | 0.026 |
| 50.0 | 1.00 | 0.053 |
| 50.0 | 2.00 | 0.106 |
| 50.0 | 3.00 | 0.157 |
| 50.0 | 4.00 | 0.207 |

TABLE 42d

| T (° C.) | P (bar) | $X_{meas.}$ (mol. fraction) |
|---|---|---|
| 75.0 | 0.10 | 0.000 |
| 75.0 | 0.50 | 0.012 |
| 75.0 | 1.00 | 0.028 |
| 75.0 | 2.00 | 0.059 |
| 75.0 | 3.00 | 0.090 |

Where a composition, apparatus or process of this invention is stated or described as comprising, including, containing, having, being composed of or being constituted by certain features, components or steps, it is to be understood, unless the statement or description explicitly provides to the contrary, that one or more features, components or steps in addition to those explicitly stated or described may be present in the composition, apparatus or process. In an alternative embodiment, however, the composition, apparatus or process of this invention may be stated or described as consisting essentially of certain features, components or steps, in which embodiment features, components or steps that would materially alter the principle of operation or the distinguishing characteristics of the composition, apparatus or process are not present therein. In a further alternative embodiment, the composition of this invention may be stated or described as consisting of certain features or components, in which embodiment features other than named and components other than impurities are not present therein. In a further alternative embodiment, the apparatus or process of this invention may be stated or described as consisting of certain features, components or steps, in which embodiment features, components or steps other than as named are not present therein.

Where the indefinite article "a" or "an" is used with respect to a statement or description of the presence of a feature, component or step in a composition, apparatus or process of this invention, it is to be understood, unless the statement or description explicitly provides to the contrary, that the use of such indefinite article does not limit the presence of the feature, component or step in the composition, apparatus or process to one in number.

A refrigerant for use herein may be any one or more of all the members of the total group of refrigerants disclosed herein. The refrigerant may also, however, be any one or more of those members of a subgroup of the total group of refrigerants disclosed herein, where the subgroup is formed by excluding any one or more other members from the total group. As a result, the refrigerant in such instance may not only be any one or more of the refrigerants in any subgroup of any size that may be selected from the total group of refrigerants in all the various different combinations of individual members of the total group, but the members in any subgroup may thus be used in the absence of one or more of the members of the total group that have been excluded to form the subgroup. The subgroup formed by excluding various members from the total group of refrigerants may, moreover, be an individual member of the total group such that that refrigerant is used in the absence of all other members of the total group except the selected individual member.

A ionic liquid for use herein may be any one or more of all the members of the total group of ionic liquids disclosed herein. The ionic liquid may also, however, be any one or more of those members of a subgroup of the total group of ionic liquids disclosed herein, where the subgroup is formed by excluding any one or more other members from the total group. As a result, the ionic liquid in such instance may not only be any one or more of the ionic liquids in any subgroup of any size that may be selected from the total group of ionic liquids in all the various different combinations of individual members of the total group, but the members in any subgroup may thus be used in the absence of one or more of the members of the total group that have been excluded to form the subgroup. The subgroup formed by excluding various members from the total group of ionic liquids may, moreover, be an individual member of the total group such that that ionic liquid is used in the absence of all other members of the total group except the selected individual member.

What is claimed is:

1. A composition of matter comprising a refrigerant absorbed in an ionic liquid, wherein the refrigerant is selected from one or more of the members of the group consisting of hydrofluorocarbons and $NH_3$.

2. The composition of claim 1 wherein the hydrofluorocarbons are selected from the group consisting of: difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), and fluoroethane (HFC-161).

3. The composition of claim 1 wherein the ionic liquid comprises a cation selected from the group consisting of:

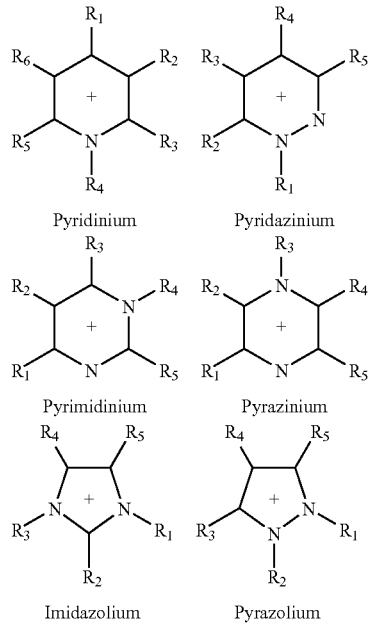

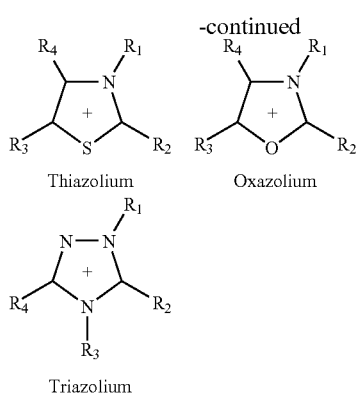

wherein $R_1$, $R_2$, $R_3$, $R_4$, $R_5$ and $R_6$ are independently selected from the group consisting of:
(i) H
(ii) F
(iii) $CH_3$, $C_2H_5$, or a $C_3$ to $C_{12}$ straight-chain, branched or cyclic alkane or alkene group, optionally substituted with $Cl^-$, $Br^-$, $F^-$, $I^-$, $OH^-$, $NH_2^-$ or $SH^-$;
(iv) $CH_3$, $C_2H_5$, or a $C_3$ to $C_{12}$ straight-chain, branched or cyclic alkane or alkene group comprising one to three heteroatoms selected from the group consisting of O, N, Si and S, and optionally substituted with $Cl^-$, $Br^-$, $F^-$, $I^-$, $OH^-$, $NH_2^-$ or $SH^-$;
(v) $C_6$ to $C_{20}$ unsubstituted aryl or heteroaryl group, wherein one to three heteroatoms are independently selected from the group consisting of O, N, Si and S;
(vi) $C_6$ to $C_{20}$ substituted aryl or heteroaryl group, wherein one to three heteroatoms are independently selected from the group consisting of O, N, Si and S; and one to three substituents are independently selected from the group consisting of
1) $CH_3$, $C_2H_5$, or a $C_3$ to $C_{12}$ straight-chain, branched or cyclic alkane or alkene group, optionally substituted with $Cl^-$, $Br^-$, $F^-$, $I^-$, $OH^-$, $NH_2^-$ or $SH^-$,
2) $OH^-$,
3) $NH^{2-}$ and
4) $SH^-$; and
wherein, optionally, at least two of $R_1$, $R_2$, $R_3$, $R_4$, $R_5$ and $R_6$ can together form a cyclic or bicyclic alkanyl or alkenyl group.

4. The composition of claim 3 wherein at least one of $R_1$, $R_2$, $R_3$, $R_4$, $R_5$ and $R_6$ comprises F—.

5. The composition of claim 1, 2 or 3 wherein the ionic liquid comprises an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion.

6. The composition of claim 4 wherein the ionic liquid comprises an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, and any fluorinated anion.

7. The composition of claim 5 wherein the any fluorinated anion is selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

8. The composition of claim 1 or claim 3 wherein the ionic liquid comprises an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3SO_2)_3C]^-$, $[CF_3CO_2]^-$, and $F^-$.

9. The composition of claim 4 wherein the ionic liquid comprises an anion selected from the group consisting of

[BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClCF$_2$SO$_3$]$^-$, [(CF$_3$SO$_2$)$_2$N]$^-$, [(CF$_3$SO$_2$)$_3$C]$^-$, [CF$_3$CO$_2$]$^-$, and F$^-$.

10. The composition of claim 3 wherein the ionic liquid comprises an imidazolium cation and an anion selected from the group consisting of [BF$_4$]$^-$, [PF$_6$]$^-$, [SbF$_6$]$^-$, [HCF$_2$CF$_2$SO$_3$]$^-$, [CF$_3$SO$_3$]$^-$, [CF$_3$HFCCF$_2$SO$_3$]$^-$, [HCClCF$_2$SO$_3$]$^-$, [(CF$_3$SO$_2$)$_2$N]$^-$, [(CF$_3$SO$_2$)$_3$C]$^-$ and [CF$_3$CO$_2$]$^-$.

11. The composition of claim 3 wherein the ionic liquid comprises a 1-butyl-3-methylimidazolium cation and an anion selected from the group consisting of [BF$_4$]$^-$, [PF$_6$]$^-$, [SbF$_6$]$^-$, [HCF$_2$CF$_2$SO$_3$]$^-$, [CF$_3$SO$_3$]$^-$, [CF$_3$HFCCF$_2$SO$_3$]$^-$, [HCClCF$_2$SO$_3$]$^-$, [(CF$_3$SO$_2$)$_2$N]$^-$, [(CF$_3$SO$_2$)$_3$C]$^-$ and [CF$_3$CO$_2$]$^-$.

12. The composition of claim 3 wherein the ionic liquid comprises a 1-butyl-3-methylimidazolium cation and an anion selected from the group consisting of [BF$_4$]$^-$, and [PF$_6$]$^-$.

13. The composition of claim 3 wherein the ionic liquid comprises a 1-propyl-2,3-dimethylimidazolium cation and an anion selected from the group consisting of [(CF$_3$SO$_2$)$_2$N]$^-$ and [(CF$_3$SO$_2$)$_3$C]$^-$.

14. The composition of claim 3 wherein the ionic liquid comprises the cation selected from the group consisting of 1,3-dioctylimidazolium and 1-octyl-3-methylimidazolium, and a [I]$^-$ as the anion.

15. The composition of matter comprising at least one refrigerant selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), in admixture with at least one ionic liquid that is comprised of the cation according to claim 3 and the anion according to claim 5; wherein the composition is comprised of about 0.05 to about 99.95 mole percent of the at least one refrigerant over a temperature range from the triple point temperature to the critical point temperature of the refrigerant at a pressure from vacuum to the critical pressure of the refrigerant.

16. The composition of claim 15 wherein an ionic liquid comprises at least one of the cation or anion comprise at least one F$^-$.

17. The composition of claim 15 wherein, in an ionic liquid, both the cation and anion comprise at least one F$^-$.

18. The composition comprising HFC-32 and at least one ionic liquid that is comprised of the cation according to claim 3, and the anion according to claim 5, wherein the composition comprises from about 0.1 to about 99.9 mole percent of HFC-32 over a temperature range from about −136.8 to about 78.1° C. at a pressure from about vacuum to about 57.8 bar.

19. The composition comprising HFC-125 and at least one ionic liquid that is comprised of the cation according to claim 3, and the anion according to claim 5, wherein the composition comprises from about 0.1 to about 99.9 mole percent of HFC-125 over a temperature range from about −100.6 to about 66° C. at a pressure from about vacuum to about 36.2 bar.

20. The composition comprising HFC-134a and at least one ionic liquid that is comprised of the cation according to claim 3, and the anion according to claim 5, wherein the composition comprises from about 0.1 to about 99.9 mole percent of HFC-134a over a temperature range from about −103.3 to about 101° C. at a pressure from about vacuum to about 40.6 bar.

21. The composition comprising HFC-143a and at least one ionic liquid that is comprised of the cation according to claim 3, and the anion according to claim 5, wherein the composition comprises from about 0.1 to about 99.9 mole percent of HFC-143a over a temperature range from about −111.8 to about 72.7° C. at a pressure from about vacuum to about 37.6 bar.

22. The composition comprising HFC-152a and at least one ionic liquid that is comprised of the cation according to claim 3, and the anion according to claim 5, wherein the composition comprises from about 0.1 to about 99.9 mole percent of HFC-152a over a temperature range from about −118.6 to about 113.3° C. at a pressure from about vacuum to about 45.2 bar.

23. The composition of claim 18 wherein the ionic liquid is [bmim][PF$_6$], and the composition comprises from about 0.3 to about 81.2 mole percent of HFC-32 over a temperature range from about 10 to about 75° C. at a pressure from about 0.1 to about 10 bar.

24. The composition of claim 19 wherein the ionic liquid is [bmim][PF$_6$], and the composition comprises from about 0.1 to about 65.1 mole percent of HFC-125 over a temperature range from about 10 to about 75° C. at a pressure from about 0.1 to about 10 bar.

25. The composition of claim 20 wherein the ionic liquid is [bmim][PF$_6$], and the composition comprises from about 0.1 to about 72.1 mole percent of HFC-134a over a temperature range from about 10 to about 75° C. at a pressure from about 0.1 to about 3.5 bar.

26. The composition of claim 21 wherein the ionic liquid is [bmim][PF$_6$], and the composition comprises from about 0.1 to about 26.5 mole percent of HFC-143a over a temperature range from about 10 to about 75° C. at a pressure from about 0.1 to about 7.5 bar.

27. The composition of claim 22 wherein the ionic liquid is [bmim][PF$_6$], and the composition comprises from about 0.5 to about 79.7 mole percent of HFC-152a over a temperature range from about 10 to about 75° C. at a pressure from about 0.1 to about 4.5 bar.

28. The composition of claim 18 wherein the ionic liquid is [bmim][BF$_4$], and the composition comprises from about 0.1 to about 76.5 mole percent of HFC-32 over a temperature range from about 10 to about 75° C. at a pressure from about 0.1 to about 10 bar.

29. The composition of claim 18 wherein the ionic liquid is [omim][I], and the composition comprises from about 0.4 to about 41.6 mole percent of HFC-32 at a temperature of about 25° C. and a pressure from about 0.1 to about 10 bar.

30. The composition of claim 18 wherein the ionic liquid is [doim][I], and the composition comprises from about 0.7 to about 46.8 mole percent of HFC-32 at a temperature of about 25° C. and a pressure from about 0.1 to about 10 bar.

31. The composition of claim 18 wherein the ionic liquid is [dmpim][tTFMSmethide], and the composition comprises from about 0.9 to about 66 mole percent of HFC-32 at a temperature of about 25° C. and a pressure from about 0.1 to about 10 bar.

32. The composition of claim 18 wherein the ionic liquid is [dmpim][tTFMSimide], and the composition comprises from about 0.8 to about 64.5 mole percent of HFC-32 at a temperature of about 25° C. and a pressure from about 0.1 to about 10 bar.

33. The composition of claim 18 wherein the ionic liquid is [bmim][PF$_6$], and the composition comprises from about 0.1 to 63 mole percent of HFC-32 at about 10° C. and P/P$_0$ from about 0.1 to about 0.63.

34. The composition of claim 19 wherein the ionic liquid is [bmim][PF$_6$], and the composition comprises from about 0.1 to about 65 mole percent of HFC-125 at about 10° C. and P/P$_0$ from about 0.1 to about 0.88.

35. The composition of claim 20 wherein the ionic liquid is [bmim][PF$_6$], and the composition comprises from about 0.1 to about 72 mole percent of HFC-134a at about 10° C. and P/P$_0$ from about 0.1 to about 0.84.

36. The composition of claim 21 wherein the ionic liquid is [bmim][PF$_6$], and the composition comprises from about 0.1 to about 25 mole percent of HFC-143a at about 10° C. and P/P$_0$ from about 0.1 to about 0.90.

37. The composition of claim 22 wherein the ionic liquid is [bmim][PF$_6$], and the composition comprises from about 0.1 to about 80 mole percent of HFC-152a at about 10° C. and P/P$_0$ from about 0.1 to about 0.86.

38. The composition of claim 1 wherein ionic liquid comprises a cation comprising at least one fluorine.

39. The composition of claim 2 wherein the ionic liquid comprises a cation comprising at least one fluorine.

40. The composition of claim 1, 38 or 39 wherein the ionic liquid comprises an anion comprising at least one fluorine.

41. The composition of claim 40 wherein the ionic liquid comprises the anion selected from the group consisting of: [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$ and [CF$_3$CO$_2$]$^-$.

42. The composition of claim 40 wherein the ionic liquid comprises an imidazolium cation, and the anion selected from the group consisting of ([BF$_4$]$^-$, [PF$_6$]$^-$, [SbF$_6$]$^-$, [HCF$_2$CF$_2$SO$_3$]$^-$, [CF$_3$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$ and [CF$_3$CO$_2$]$^-$).

43. The composition of claim 40 wherein the ionic liquid comprises a 1-butyl-3-methylimidazolium cation, and the anion selected from the group consisting of ([BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$ and [CF$_3$CO$_2$]$^-$).

44. The composition of claim 40 wherein the ionic liquid comprises a 1-butyl-3-methylimidazolium cation, and the anion selected from the group consisting of [BF$_4$]$^-$, and [PF$_6$]$^-$.

45. The composition of claim 40 wherein the ionic liquid comprises a 1-propyl-2,3-dimethylimidazolium cation, and the anion selected from the group consisting of [(CF$_3$SO$_2$)$_2$N]$^-$ and [(CF$_3$SO$_2$)$_3$C]$^-$.

46. The composition of claim 1 wherein the ionic liquid comprises a cation selected from the group consisting of 1,3-dioctylimidazolium and 1-octyl-3-methylimidazolium; and ([I]$^-$ as an anion.

47. The composition of claim 1 wherein the refrigerant comprises the hydrofluorocarbon, and the ionic liquid comprises a fluorinated cation or anion.

48. The composition of claim 1 wherein the refrigerant comprises HFC-32 and/or HFC-134.

49. A composition of matter comprising one or more refrigerants absorbed in an ionic liquid, wherein a refrigerant is selected from the group consisting of hydrofluorocarbons, N$_2$, O$_2$, CO$_2$, NH$_3$, Ar, and H2.; and wherein the ionic liquid comprises a cation selected from the group consisting of 1-propyl-2,3-dimethylimidazolium cation, 1,3-dioctylimidazolium cation, 1-dodecyl-3-methylimidazolium cation, tetradecyl(trihexyl)phosphonium cation, tributyl(tetradecyl)phosphonium cation; and cations represented by the following structural formulae, to-wit:

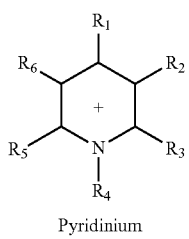
Pyridinium

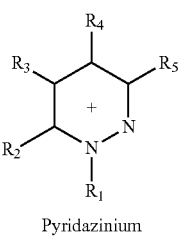
Pyridazinium

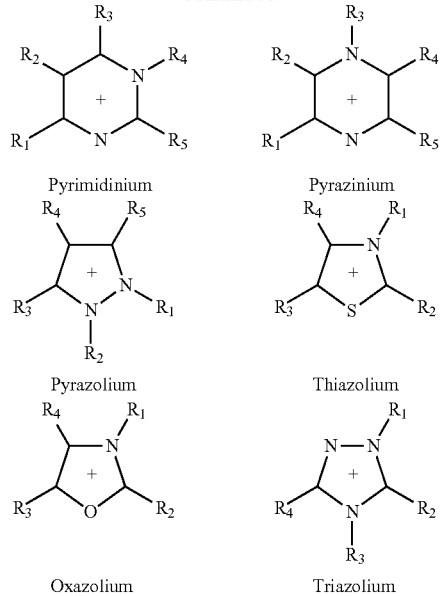

wherein R$_1$, R$_2$, R$_3$, R$_4$, R$_5$ and R$_6$ are independently selected from the group consisting of:
(i) H
(ii) F
(iii) CH$_3$, C$_2$H$_5$, or a C$_3$ to C$_{12}$ straight-chain, branched or cyclic alkane or alkene group, optionally substituted with Cl$^-$, Br$^-$, F$^-$, I$^-$, OH$^-$, NH$_2^-$ or SH$^-$;
(iv) CH$_3$, C$_2$H$_5$, or a C$_3$ to C$_{12}$ straight-chain, branched or cyclic alkane or alkene group comprising one to three heteroatoms selected from the group consisting of O, N, Si and S, and optionally substituted with Cl$^-$, Br$^-$, F$^-$, I$^-$, OH$^-$, NH$_2^-$ or SH$^-$;
(v) C$_6$ to C$_{20}$ unsubstituted aryl or heteroaryl group, wherein one to three heteroatoms are independently selected from the group consisting of O, N, Si and S;
(vi) C$_6$ to C$_{20}$ substituted aryl or heteroaryl group, wherein one to three heteroatoms are independently selected from the group consisting of O, N, Si and S; and one to three substituents are independently selected from the group consisting of 1) CH$_3$, C$_2$H$_5$, or a C$_3$ to C$_{12}$ straight-chain, branched or cyclic alkane or alkene group, optionally substituted with Cl$^-$, Br$^-$, F$^-$, I$^-$, OH$^-$, NH$_2^-$ or SH$^-$, 2) OH$^-$, 3) NH$^{2-}$ and
4) SH$^-$; and
wherein, optionally, at least two of R$_1$, R$_2$, R$_3$, R$_4$, R$_5$ and R$_6$ can together form a cyclic or bicyclic alkanyl or alkenyl group.

50. The composition according to claim 49 wherein at least one of R$_1$, R$_2$, R$_3$, R$_4$, R$_5$ and R$_6$ comprises F—.

51. The composition according to claim 49 or claim 50 wherein the ionic liquid comprises an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, and any fluorinated anion.

52. The composition according to claim 49 or claim 50 wherein the ionic liquid comprises an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, [CF$_3$CO$_2$]$^-$, and F$^-$.

53. The composition according to claim 49 wherein a refrigerant comprises the hydrofluorocarbon, and the ionic liquid comprises a fluorinated cation and/or anion.

54. The composition according to claim 49 wherein the refrigerant is selected from the group consisting of: difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), chlorodifluoromethane (HCFC-22), dichlorodifluoromethane (CFC-12), perfluoromethane (FC-14) and perfluoroethane (FC-116).

55. A composition of matter comprising one or more refrigerants absorbed in an ionic liquid, wherein a refrigerant is selected from the group consisting of hydrofluorocarbons, $N_2$, $O_2$, $CO_2$, $NH_3$, Ar, and $H_2$.; and wherein an ionic liquid comprises an imidazolium cation, and an anion selected from the group consisting of $[HCF_2CF_2SO_3]^-$, $[CF_3HFCCF_2SO_3]^-$, $[HCClFCF_2SO_3]^-$, $[(CF_3SO_2)_3C]^-$, and $F^-$.

56. The composition according to claim 55 wherein the refrigerant comprises the hydrofluorocarbon, and the ionic liquid comprises the fluorinated anion.

57. The composition according to claim 55 wherein the refrigerant is selected from the group consisting of: difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), chlorodifluoromethane (HCFC-22), dichlorodifluoromethane (CFC-12), perfluoromethane (FC-14) and perfluoroethane (FC-116).

\* \* \* \* \*